INVENTORS
RODERIC A. DAVIS
ROBERT M. GUSTAFSON
STEPHEN HNAT

AGENT

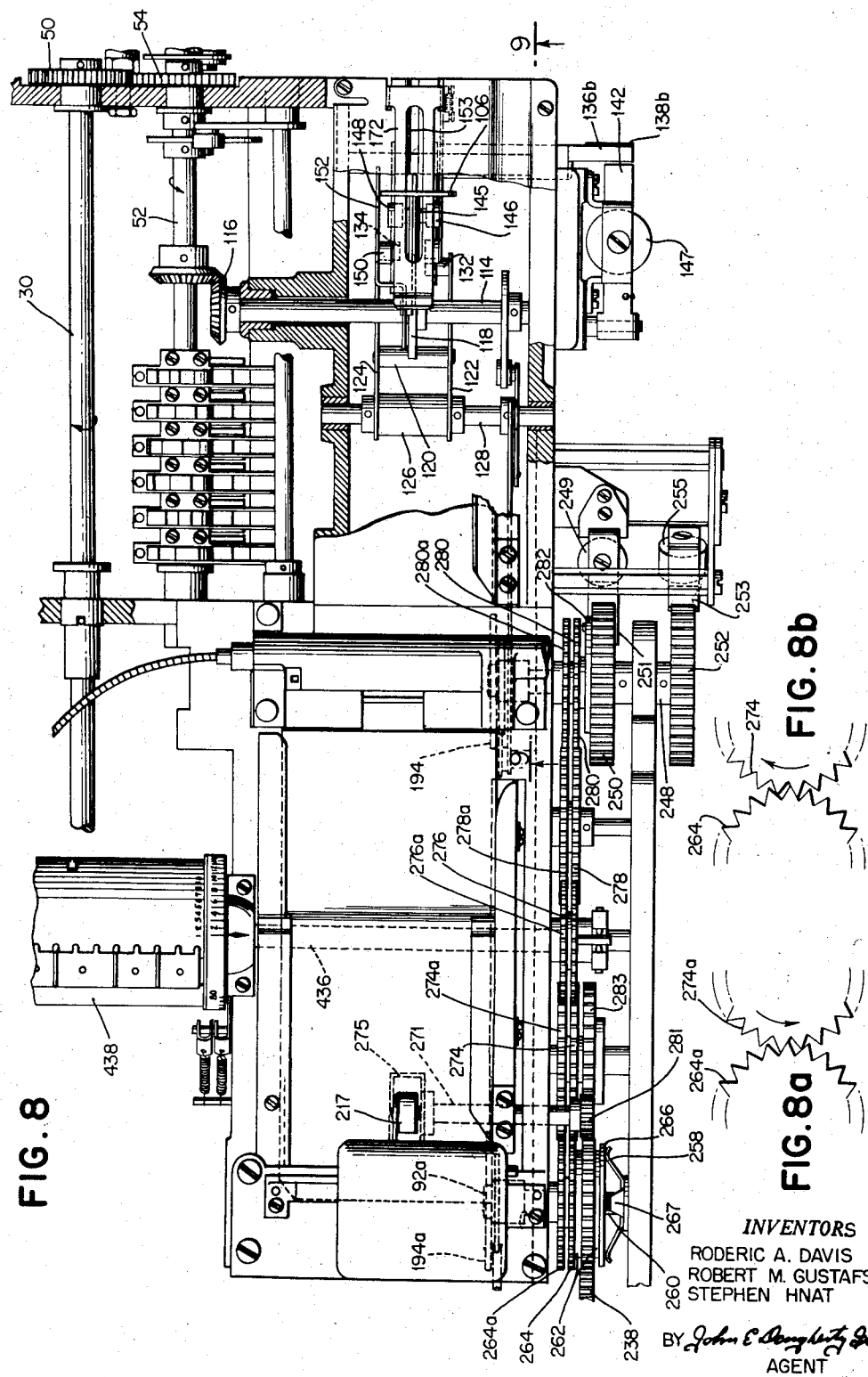

April 7, 1959  R. A. DAVIS ET AL  2,880,932
RECORD CARD ACCOUNTING MACHINE
Filed May 19, 1955  49 Sheets-Sheet 9

INVENTORS
RODERIC A. DAVIS
ROBERT M. GUSTAFSON
STEPHEN HNAT
BY
AGENT

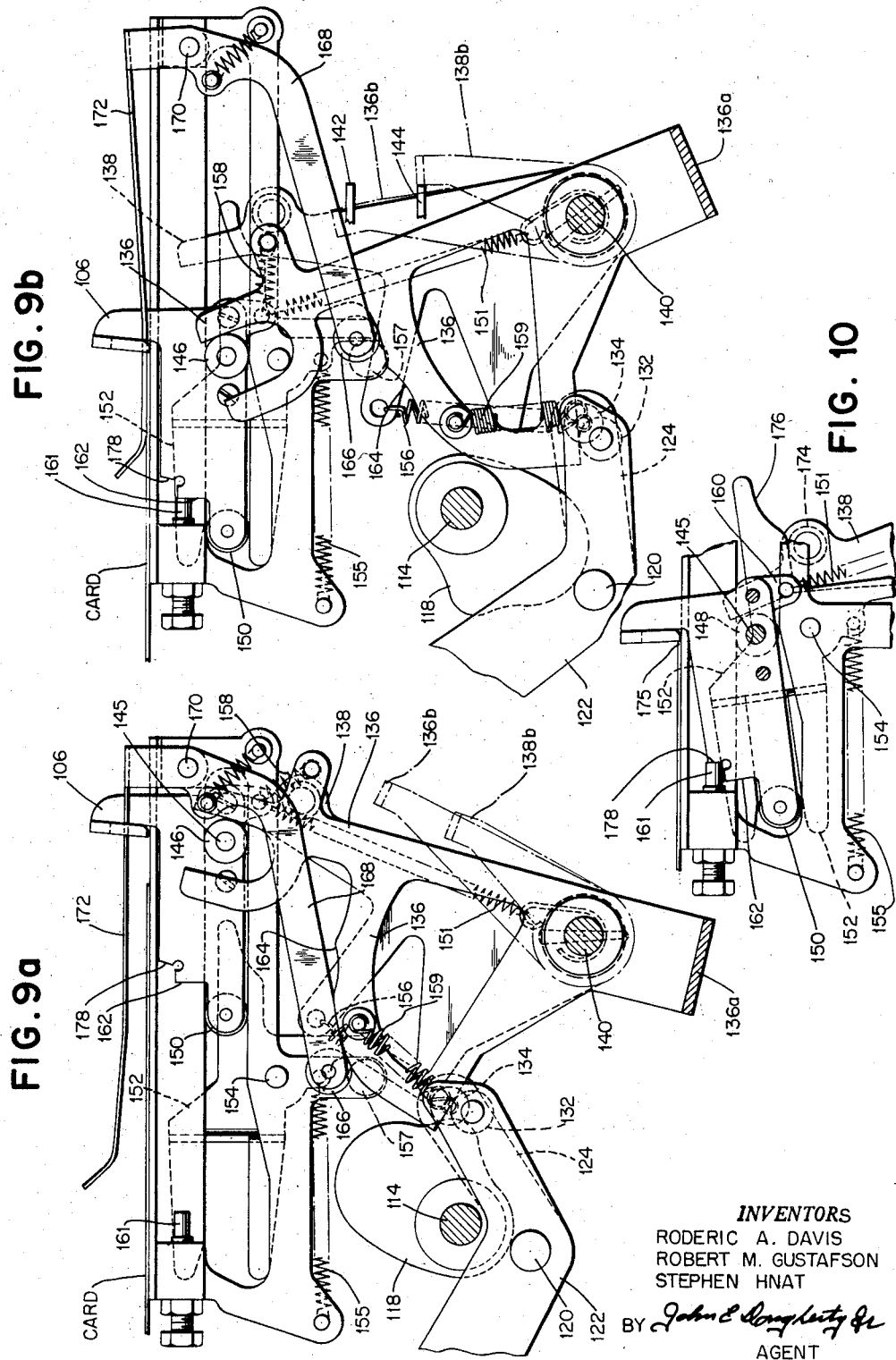

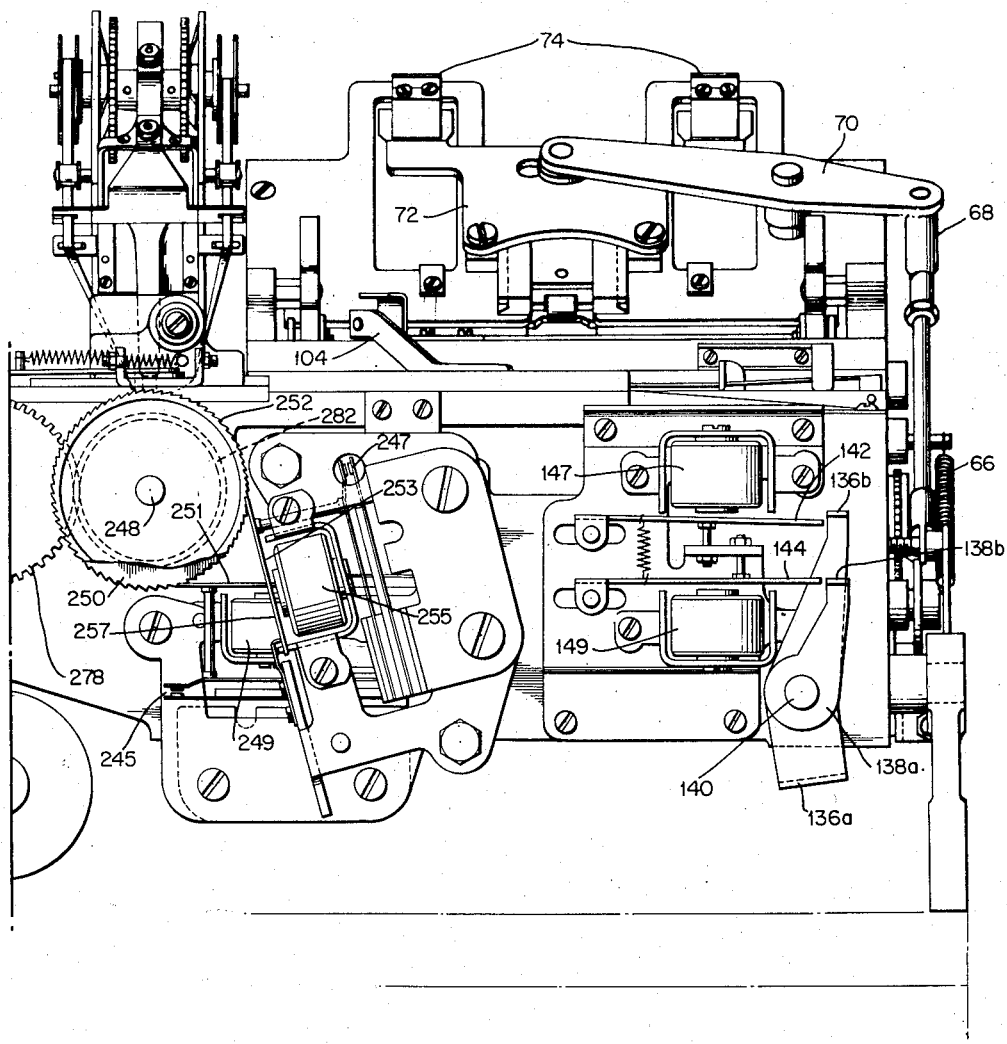

April 7, 1959

R. A. DAVIS ET AL 2,880,932

RECORD CARD ACCOUNTING MACHINE

Filed May 19, 1955

INVENTORS
RODERIC A. DAVIS
ROBERT M. GUSTAFSON
STEPHEN HNAT

BY

AGENT

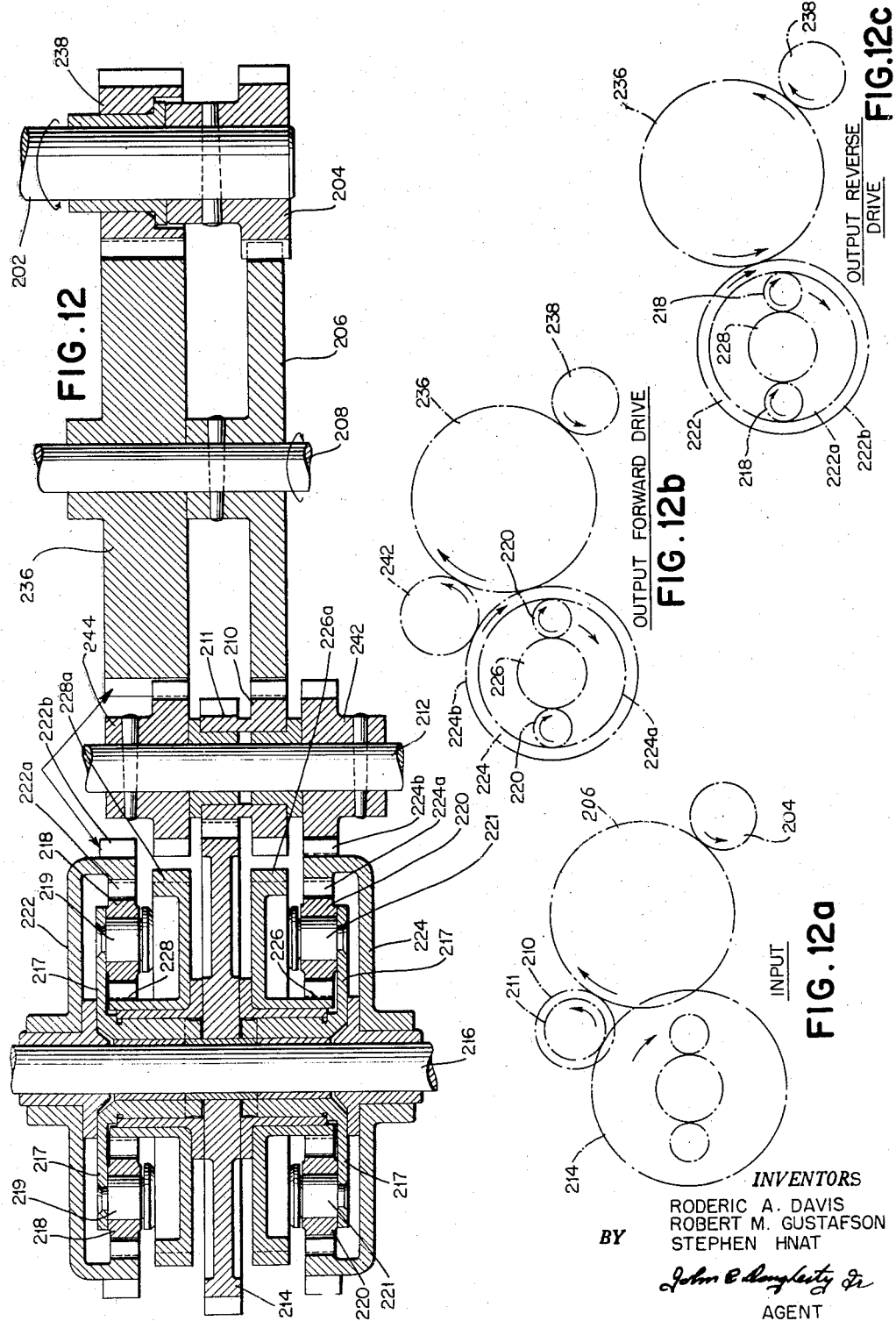

April 7, 1959  R. A. DAVIS ET AL  2,880,932
RECORD CARD ACCOUNTING MACHINE
Filed May 19, 1955  49 Sheets-Sheet 14

INVENTORS
RODERIC A. DAVIS
ROBERT M. GUSTAFSON
STEPHEN HNAT
BY John E. Daugherty Jr.
AGENT

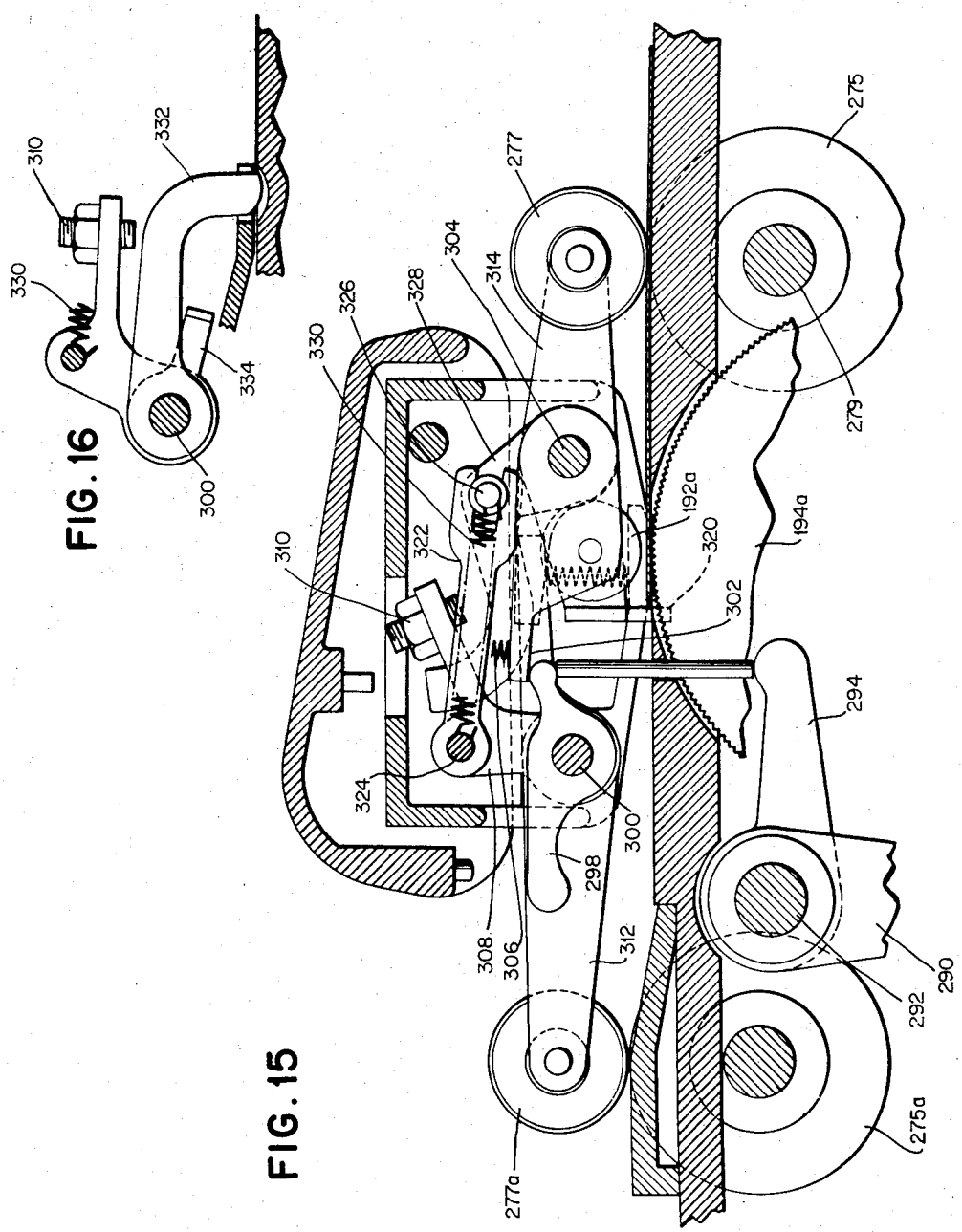

April 7, 1959  R. A. DAVIS ET AL  2,880,932
RECORD CARD ACCOUNTING MACHINE
Filed May 19, 1955  49 Sheets-Sheet 16

INVENTORS
RODERIC A. DAVIS
ROBERT M. GUSTAFSON
STEPHEN HNAT
BY
AGENT

INVENTORS
RODERIC A. DAVIS
ROBERT M. GUSTAFSON
STEPHEN HNAT
BY
AGENT

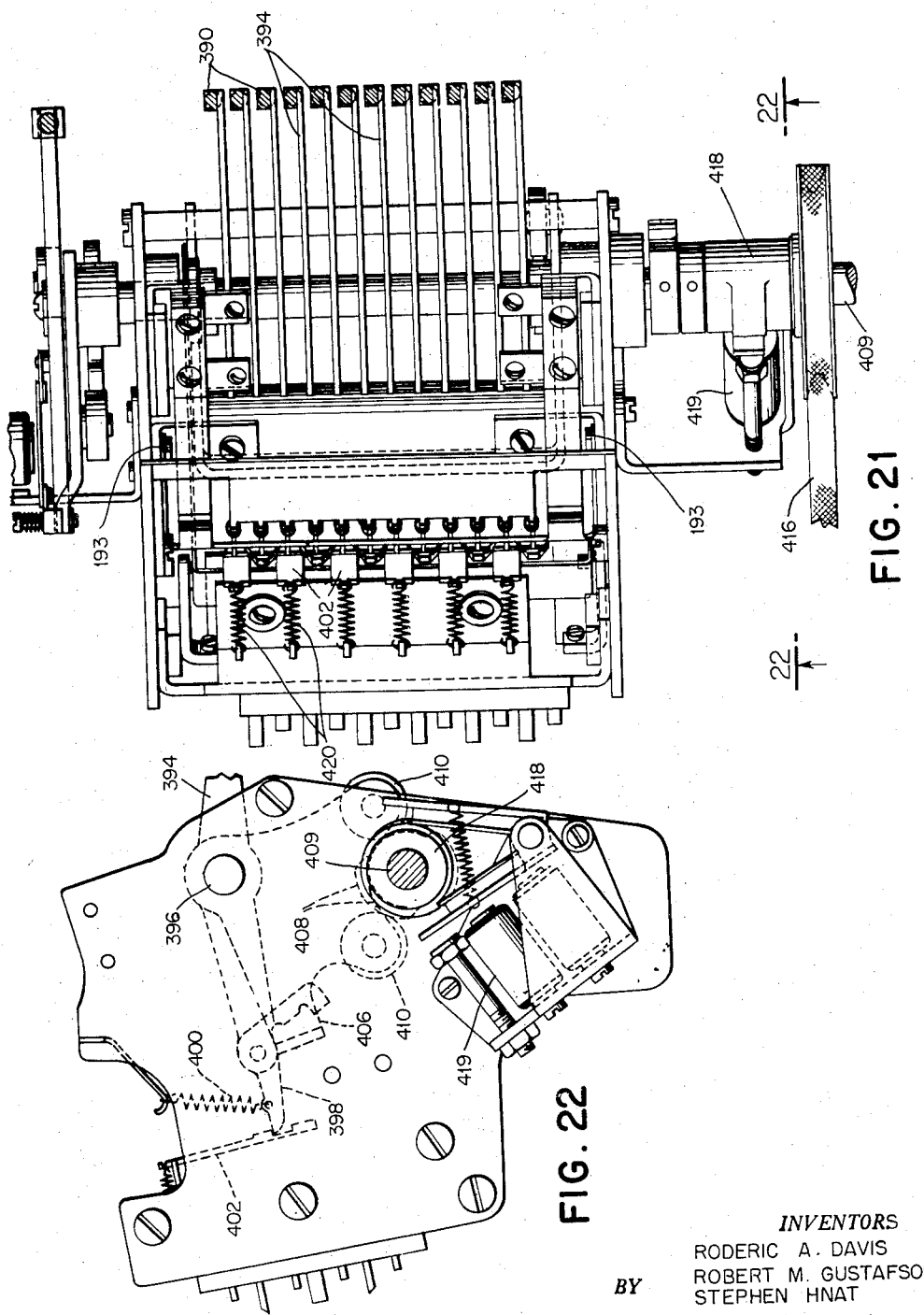

INVENTORS
RODERIC A. DAVIS
ROBERT M. GUSTAFSON
STEPHEN HNAT
BY
AGENT

INVENTORS
RODERIC A. DAVIS
ROBERT M. GUSTAFSON
STEPHEN HNAT

BY

AGENT

April 7, 1959   R. A. DAVIS ET AL   2,880,932
RECORD CARD ACCOUNTING MACHINE
Filed May 19, 1955   49 Sheets-Sheet 25
FIG. 29
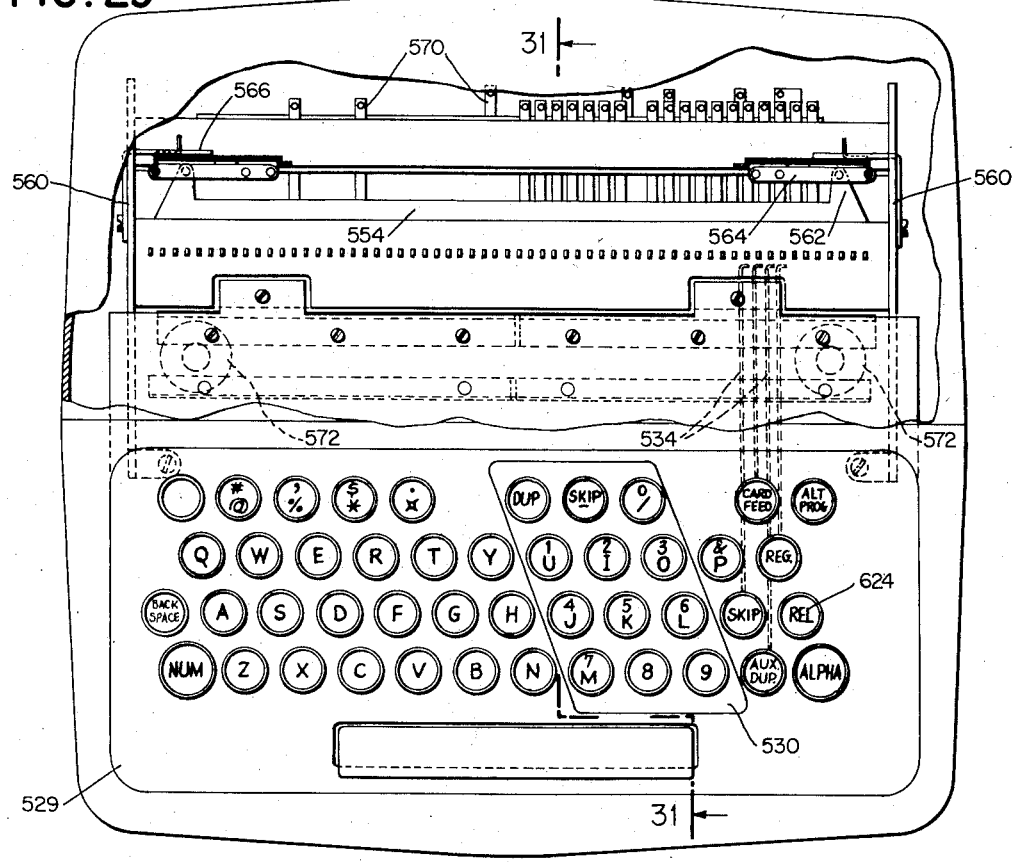
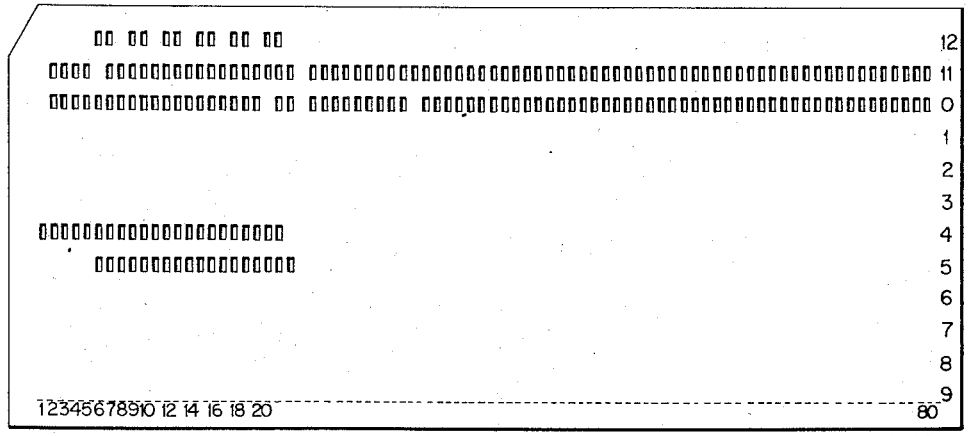
PROGRAM CARD
FIG. 30
INVENTORS
RODERIC A. DAVIS
ROBERT M. GUSTAFSON
STEPHEN HNAT
BY John E. Daugherty Jr.
AGENT April 7, 1959   R. A. DAVIS ET AL   2,880,932
RECORD CARD ACCOUNTING MACHINE
Filed May 19, 1955   49 Sheets-Sheet 26
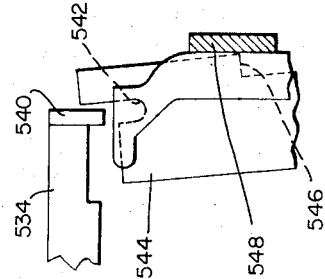
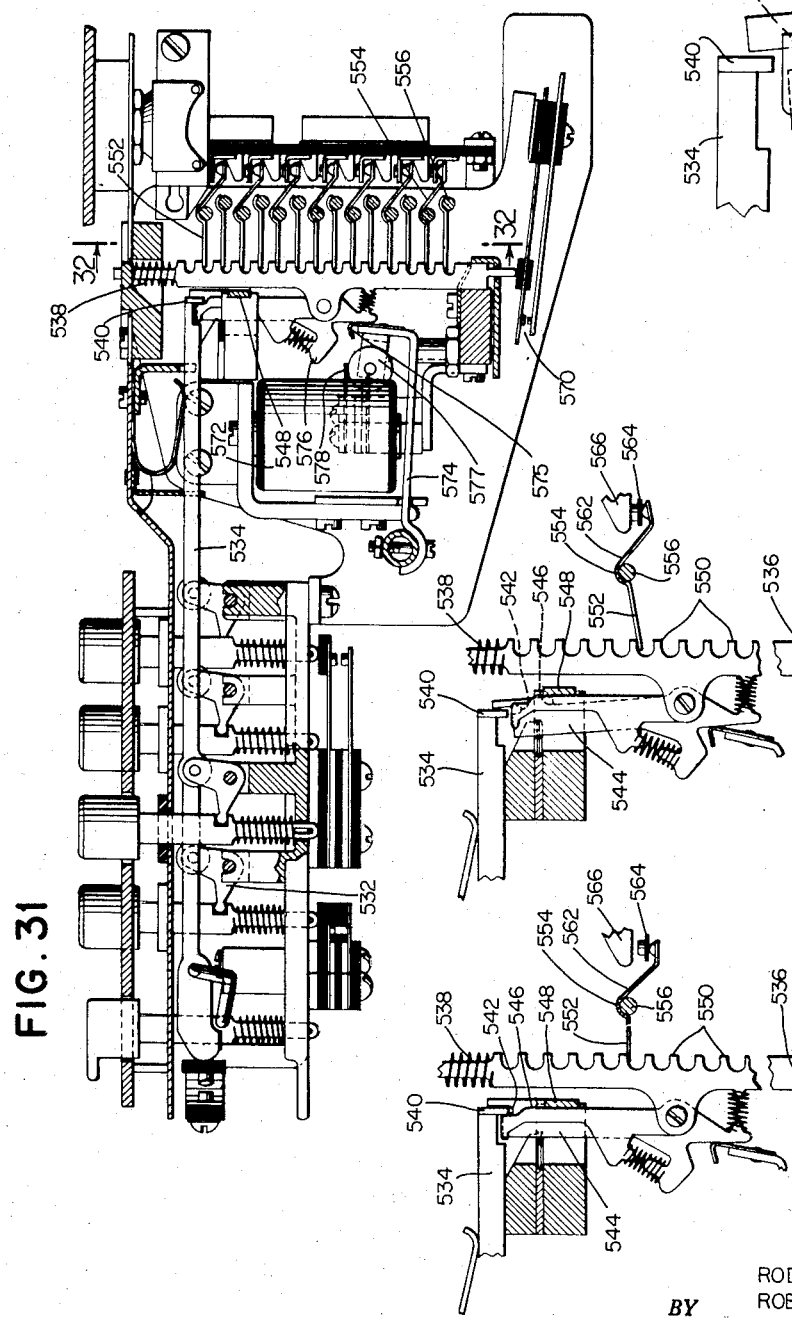
INVENTORS
RODERIC A. DAVIS
ROBERT M. GUSTAFSON
STEPHEN HNAT
BY
AGENT April 7, 1959

R. A. DAVIS ET AL 2,880,932

RECORD CARD ACCOUNTING MACHINE

Filed May 19, 1955

INVENTORS
RODERIC A. DAVIS
ROBERT M. GUSTAFSON
STEPHEN HNAT

BY

AGENT

April 7, 1959     R. A. DAVIS ET AL     2,880,932
RECORD CARD ACCOUNTING MACHINE
Filed May 19, 1955

INVENTORS
RODERIC A. DAVIS
ROBERT M. GUSTAFSON
STEPHEN HNAT
AGENT

INVENTORS
RODERIC A. DAVIS
ROBERT M. GUSTAFSON
STEPHEN HNAT

AGENT

April 7, 1959

R. A. DAVIS ET AL 2,880,932

RECORD CARD ACCOUNTING MACHINE

Filed May 19, 1955

*INVENTORS*
RODERIC A. DAVIS
ROBERT M. GUSTAFSON
STEPHEN HNAT

BY

AGENT

United States Patent Office 2,880,932
Patented Apr. 7, 1959

2,880,932
RECORD CARD ACCOUNTING MACHINE

Roderic A. Davis, Hopewell Junction, Robert M. Gustafson, Poughkeepsie, and Stephen Hnat, New York, N.Y., assignors to International Business Machines Corporation, New York, N.Y., a corporation of New York Application May 19, 1955, Serial No. 509,505

26 Claims. (Cl. 235—61.7)

This invention relates to a record card machine and more particularly to a serially operable perforating machine adapted to be used in the application of record card accounting to ordinary inventory keeping problems.

It has become a practice among many users of record card accounting equipment to maintain their stock inventory data in punched card form. A common procedure where this application is practiced is to maintain a separate stock level card bearing recordings representative of pertinent stock information for each item of stock. In order that such records may be maintained on a current basis, it is necessary upon the completion of any transaction relative to a particular item of stock to prepare a new stock level card bearing recordings representative of the stock information as affected by the particular transaction.

Thus an object of the invention is to provide a relatively inexpensive accounting machine capable of maintaining stock inventory data in punched card form on a current basis.

In carrying out the broad object of the invention, the machine is provided with a supply hopper in which cards to be punched are placed, a punch station, a read station, and two separate card stacking stations. A key actuated storage keyboard and a key operated direct control keyboard are provided for entering new information into the machine.

After the first card has been advanced from the supply hopper to the punch station and information relative to a particular current transaction has been entered into the keyboard storage unit, the stock level card containing the recordings representative of the present status of the item involved in the transaction may be manually inserted in the machine at the read station. The two records are then fed past the respective stations a controllable distance in a forward direction at which time the direction of feeding is reversed in order to present the columns of the records starting with the units order column in succession to the respective stations. During this reverse feeding certain of the balances recorded in the existing balance card are serially combined with the transaction balance and the result punched as it is combined into the new balance record being fed past the punch station.

Provision is also made to store a check balance in the machine and to effect serial comparison between this check balance and a selected one of the combined balances as they are combined. It is also possible during this reverse feeding to duplicate control the machine to duplicate selected fields of information directly from the existing old balance card into the new balance card at the punch station. Upon completion of all functional operation pertaining to the punching of the new balance card, both card is fed past the read station. Provision is made the respective stations, the old balance card being stacked and the new balance card just punched being advanced to the read station.

Another blank card is then advanced to the punch station and fed in a forward direction past this station in conjunction with the feeding of the new balance card past the read station. The machine is controllable to continue this operation of advancing a card from the supply hopper to the punch station and then feeding that card past the punch station as the previously advanced card is fed past the read station. Provision is made to control the machine during these forward feeding operations to selectively read various fields of information both from the card at the read station and from the keyboard storage unit and to punch the information, read, into the card at the punch station. In this manner it is possible to produce one or more cards bearing recordings representative both of the stock level of the item involved in the transaction and of the particular transaction itself.

Thus it becomes an object of the invention to provide a machine in which separate cards may be concurrently fed in either of two opposite directions past a sensing station and a punching station respectively and sensed and punched during feeding in either direction.

A further object of the invention is to provide for control mechanism advanceable in conjunction with the record cards in either direction and operable to control the direction and extent of feeding in either direction.

A further object of the invention lies in the provision in the machine for serially combining various balances and contemporaneously comparing the combined balance, as it is combined, with a check balance.

A further object of the invention lies in the provision of an improved inventory keeping machine in which various fields of information representative of present stock levels recorded in the old balance card may be selectively combined with a particular transaction balance to prepare a new balance card bearing recordings of like fields of information adjusted to represent the stock levels as affected by the particular transaction.

Another object of the invention is to provide mechanism for maintaining proper alignment of cards being fed in either direction past the punching station in order that punching effected during feeding in either direction will be properly registered in the column of the cards.

Other objects of the invention will be pointed out in the following description and claims and illustrated in the accompanying drawings, which disclose, by way of example, the principle of the invention and the best mode, which has been contemplated, of applying that principle.

In the drawings:

Fig. 4a is a detail of the clutch mechanism shown in Fig. 4.

Fig. 8 is a plan view of the right end of the machine as viewed in Fig. 1 with upper mechanism broken away to show internal construction.

Figs. 8a and 8b are detail views showing the relationship of the teeth for driving gears shown in Fig. 8.

Figs. 9a and 9b illustrate the operation of the card pusher mechanism shown in Fig. 9 as operated for normal feeding of the card to the punch station.

Fig. 10 is a detail view of the pusher mechanism shown as operated to feed a card to the column 2 registration position at the punch station.

Fig. 11a is a front elevation looking in the direction of lines 11a—11a of Fig. 1.

Figs. 11a and 11b are so arranged that when placed together they form a continuous front elevation of the entire machine.

Fig. 12 is a layout view of the planetary gearing and associated driving mechanism.

Figs. 12a, 12b and 12c are diagrammatic illustrations of the direction of rotation of the gearing shown in Fig. 12 under different operating conditions.

Fig. 15 is a detail elevation of the card ejecting mechanism.

Fig. 16 is an enlarged detail view of parts shown in Fig. 15.

Fig. 21 is a plan view of the punch control mechanism taken on lines 21—21 of Fig. 20.

Fig. 22 is a section on lines 22—22 of Fig. 21.

Fig. 29 is a plan view of the typewriter control keyboard.

Fig. 30 is a specimen of a program card.

Fig. 31 is a sectional elevation of the control keyboard taken on lines 31—31 of Fig. 29.

Figs. 31a, 31b and 31c are positional views of parts shown in Fig. 31.

Fig. 37 is a specimen of an old balance card.

Fig. 38 is a specimen of a new balance card.

Fig. 39 is a specimen of a transaction card.

Figs. 41a, 41b, 41c, 41d, 41e, 41f, 41g, 41h, 41j, 41k, 41m, 41n, 41p, 41r, 41s and 41t taken together side-by-side constitute a wiring diagram of the electrical circuits of the machine.

In the following, the individual components of the machine will be separately described after which the complete operation of the machine will be set forth in connection with a consideration of a particular problem.

*General arrangement*

Figure 1:
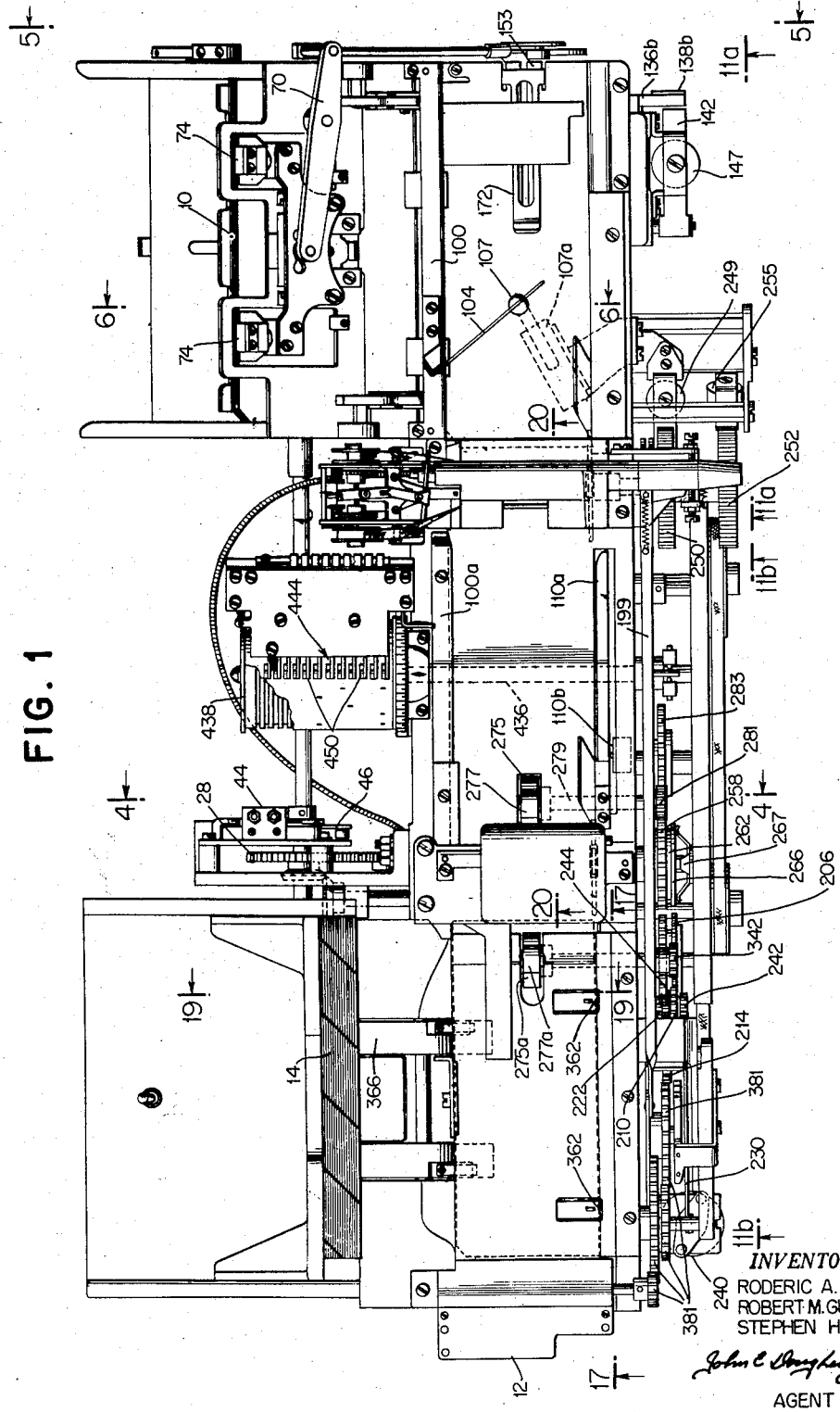
Fig. 1 is a plan view of the complete machine with the exception of the storage and control keyboards.
Figure 2:
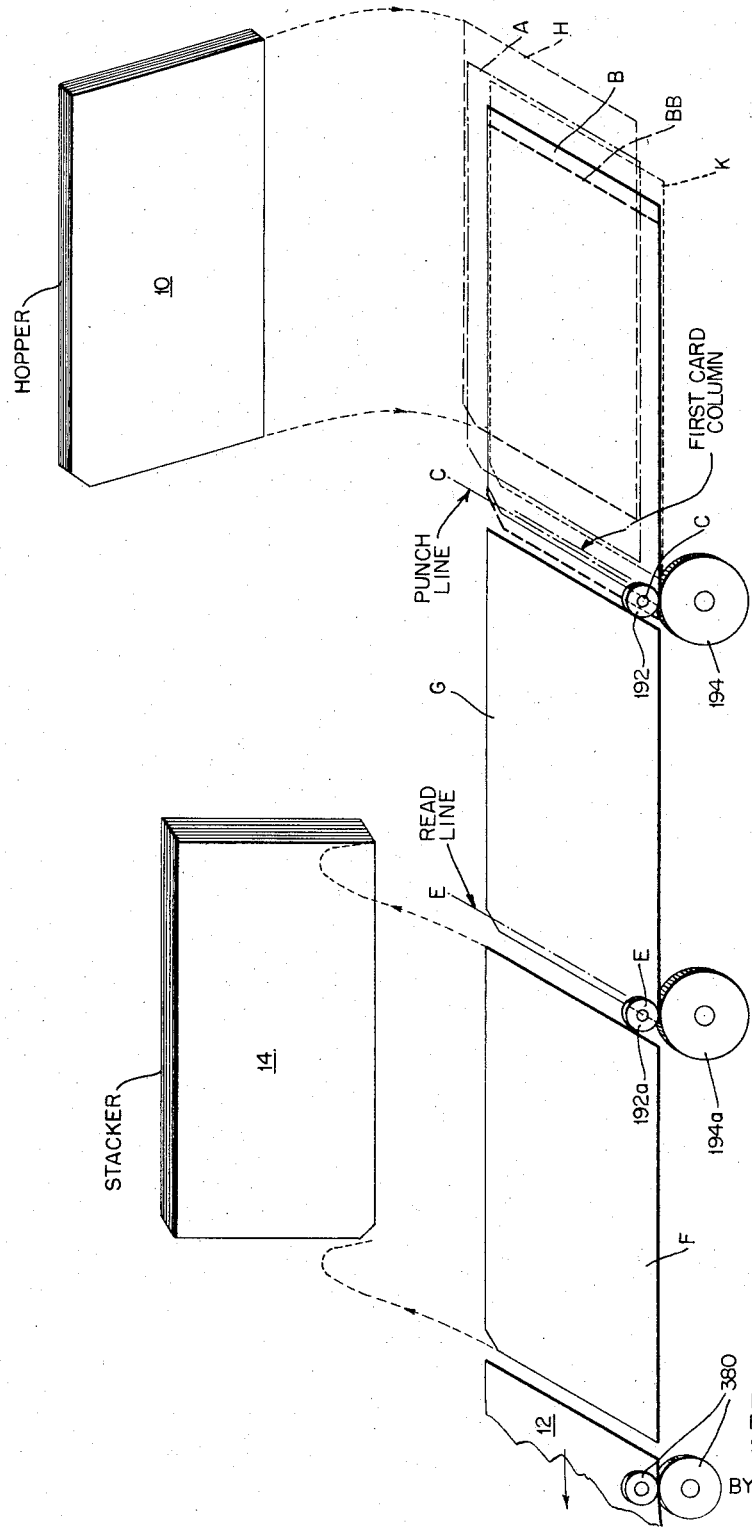
Fig. 2 is a diagrammatic view showing the path of the cards from the supply hopper to the stackers.

In Fig. 1 there are illustrated certain of the components of the machine and their physical relationship to each other. There is provided a card feed magazine 10 into which cards to be processed in the machine may be placed. Referring to Fig. 2, the cards placed in the card feed magazine are fed singly through the intermediate position H to the position A which position may be called a punch pre-registration station. From this position the card is moved through the intermediate position K to the position B which position may be designated as the punch station. From the position B the card may be advanced past the punch line C—C to a position G or reading station and past the reading line generally designated E—E to a position F. From the position F the card may be moved in a continuous line to the stacker 12 or at right angles to the stacker 14. In the usual operation of the machine when the cards are being advanced along the above described path each successive card fed follows the preceding card so that when the initial card fed is being advanced past the read line E—E, the next card is being advanced past the punched line C—C. The normal operation is to advance these cards in a step-by-step manner, reading and punching the cards as they are advanced and the structure is such that when a card has been advanced to read station G the first column of that card will be coincident with the read line E—E. The next fed card at this time will be at the punch station B and column 1 of this card will be one step or a column spaced to the right of the punch line C—C.

Another possible path of the card through the machine is utilized when the card is sought to be punched in a reverse direction, thus traveling from left to right past the punch station as viewed in Fig. 2. When this function is desired the card is fed to the punch pre-registration station A as before but is then advanced to the station BB in which position column 2 of the card is coincident with the punch line C—C. This operation does not affect the proceding card at the station G and as before the first column of that card will be coincident with the read line E—E. The cards at the stations G and BB for this operation are then advanced together from right to left past the read and punch lines, respectively, a predetermined selective distance, at which time provision is made to reverse the driving mechanism to cause these records to be fed backwards in a left to right sense past the read and punch lines in a step-by-step manner for effecting the reading and punching of the cards in a reverse direction.

It should be noted concerning the above, that whether operating in a forward or reverse direction the card at the read station is one column ahead of the card at the punch station in the direction of advance. This is so because, as will be later described, the column of the card is read at the read station and then both cards are advanced a column before that information is punched at the punch station. This is a continuous operation so that, for example, in forward or normal operation when column 10 of the card is being read at the read station, column 9 of the card at the punch station is being punched and on reverse operation when column 10 of the card is being read, column 11 of the card at the punch station is being punched.

Figure 34:
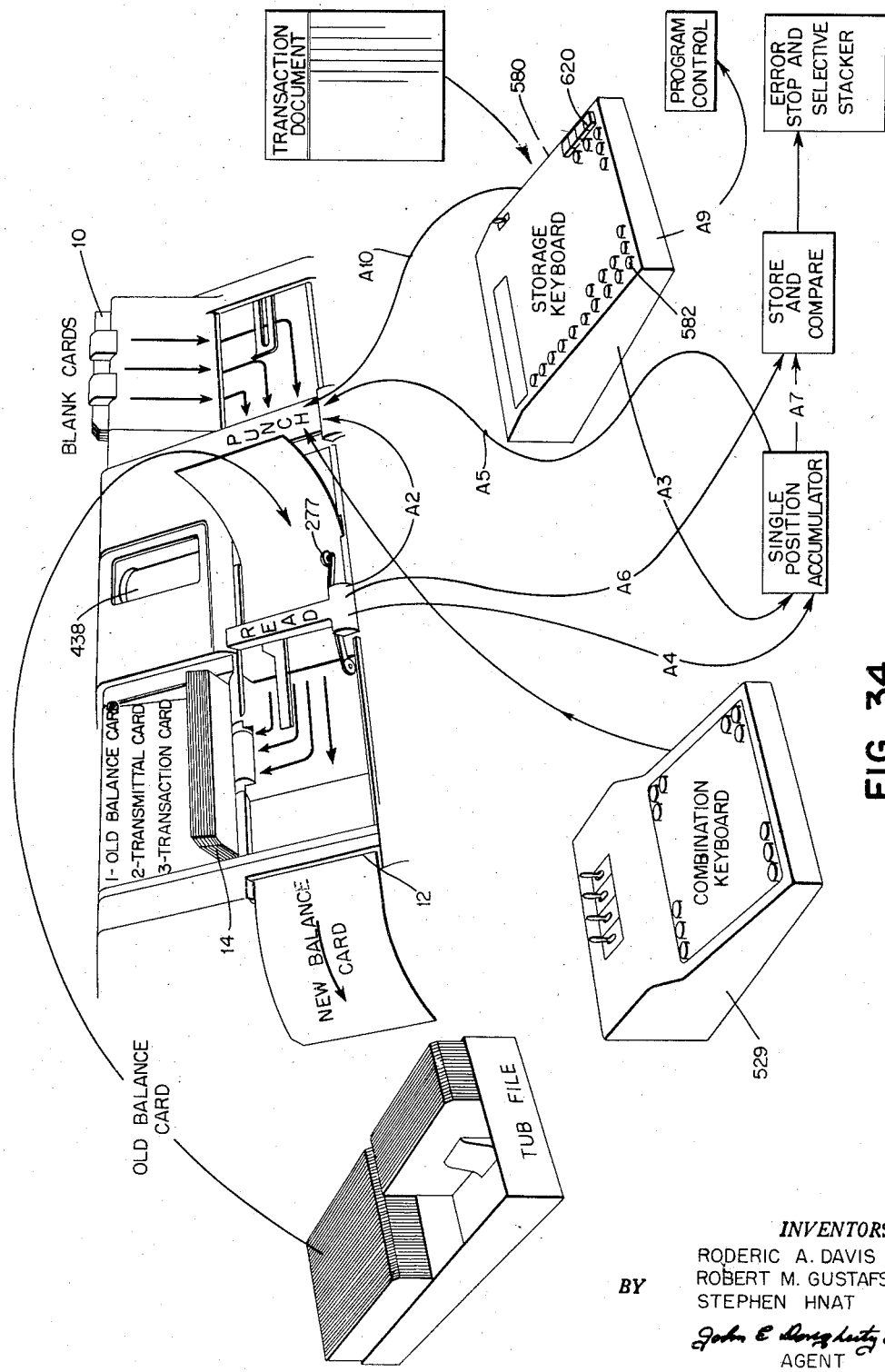
Fig. 34 is a diagrammatic chart of the operation of the machine for a particular inventory application.

It is possible, according to the present invention, to feed a card manually into the machine at a position just to the right of the read station G, as illustrated in Fig. 34. Thus, after the first fed card has been advanced to the punch pre-registration station A, another card may be manually inserted in this position before the read station G and these cards may be then advanced past the punch and read lines, respectively.

The manner in which the cards are moved from position to position along the previously described paths will now be described with specific reference to the particular structure provided to accomplish these functions.

Card feed mechanism

Figure 3:
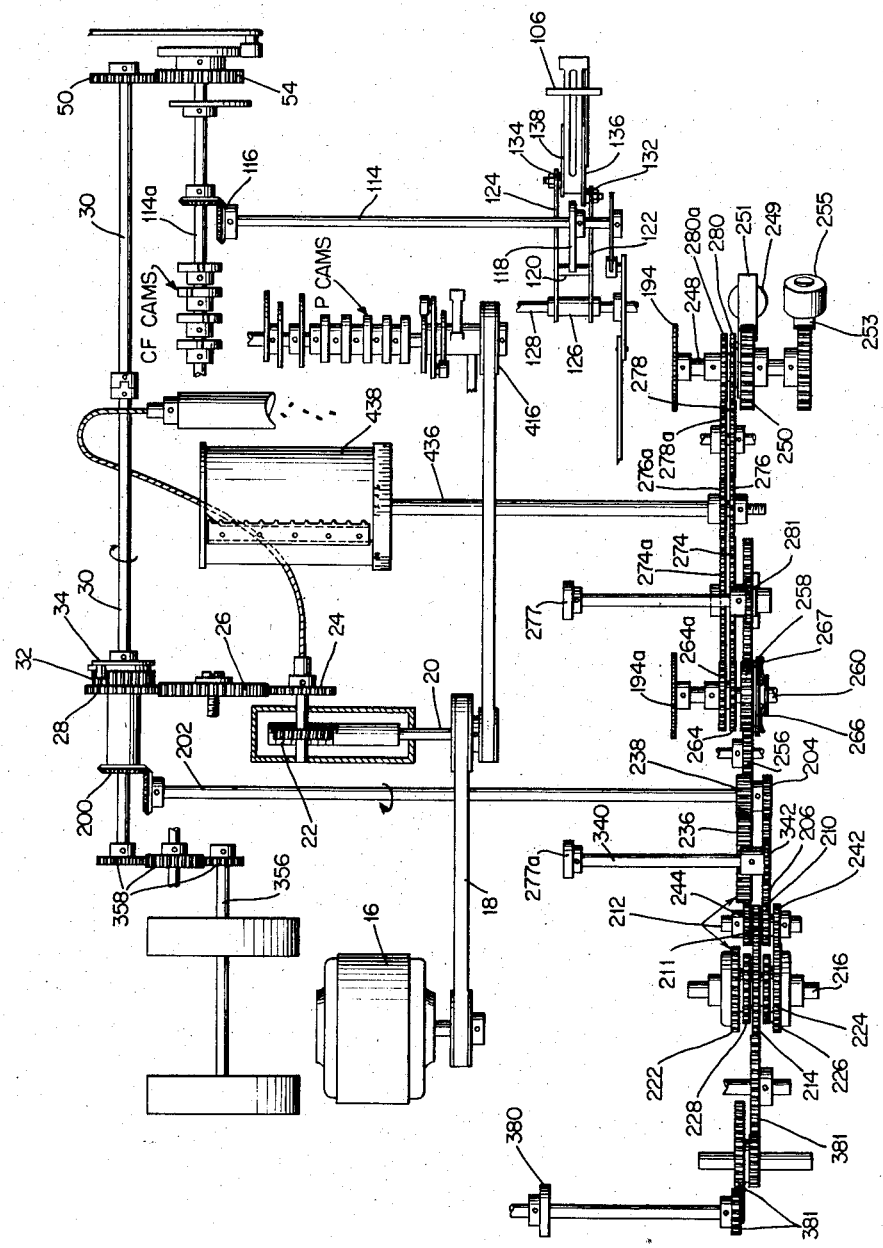
Fig. 3 is a diagrammatic view showing the relationship of various driving gears and shafts of the machine.
Figure 4:
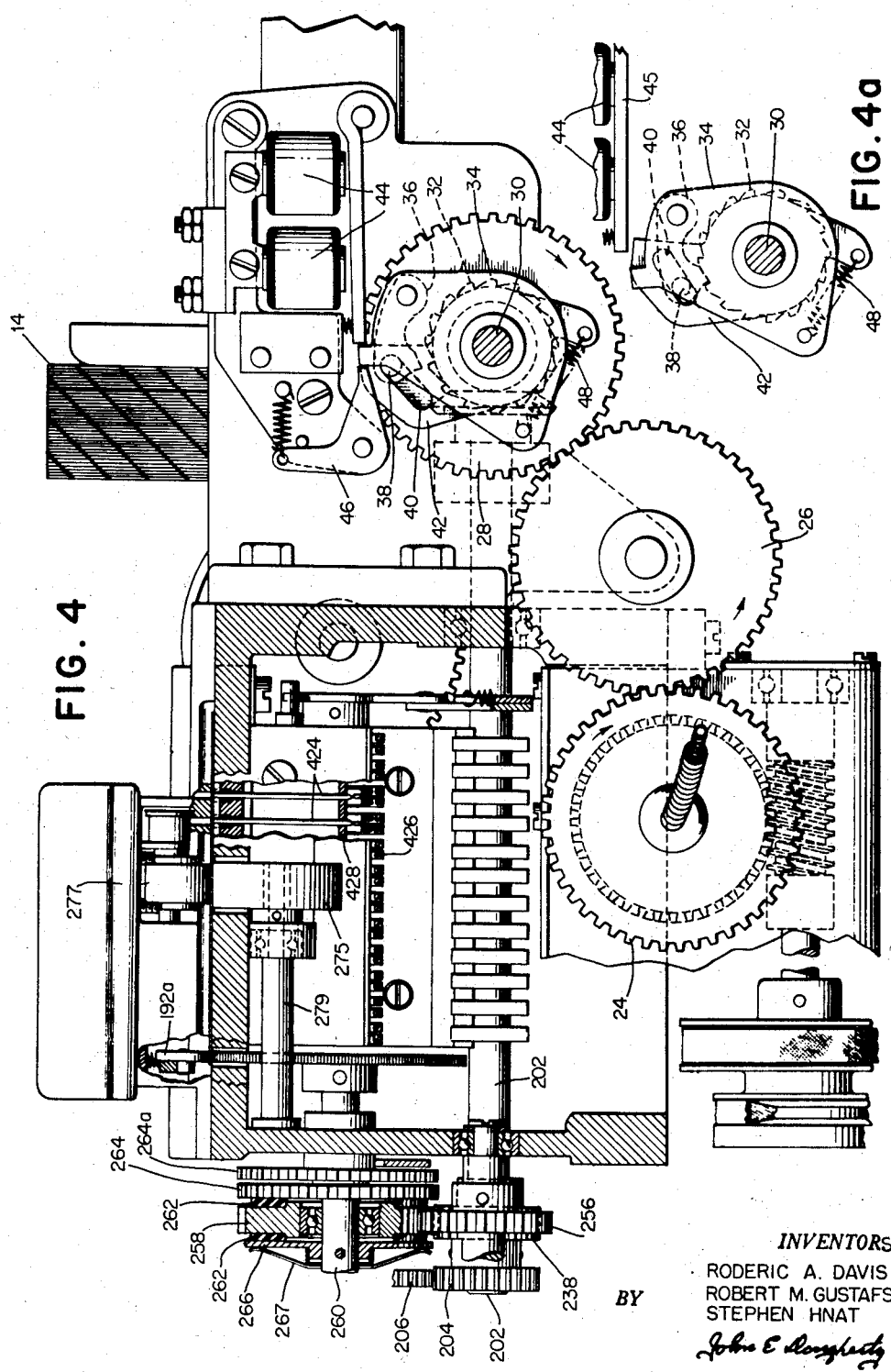
Fig. 4 is a sectional elevation taken on lines 4—4 of Fig. 1.

Referring to Figs. 3, 4 and 4a, constantly running motor 16 through belt and pulley connection 18 drives a shaft 20 which, through reduction worm and gear 22, drives a gear 24 in a clockwise direction as viewed in Fig. 4. This gear 24, through idler 26, drives a gear 28 freely mounted on shaft 30 and having integral therewith a clutch driving ratchet 32. Secured to shaft 30 is a plate 34 to which dog 36 is pivoted, the dog lying in the plane of the driving ratchet 32. The left end of the dog has a pin 38 therein extending into a slot 40 in a second plate 42 loose on the shaft 30. With the card feed clutch magnet 44 in its normal deenergized position its armature 45, as in Fig. 4, engages both plates 34 and 42 to hold them in the position shown while a spring pressed dog 46 engages the plate 34 to prevent retrograde movement thereof.

Upon energization of the magnet 44 spring 48 will rock plate 42 to the position of Fig. 4a, thereby causing its slot 40 to cam pin 38 towards shaft 30 and effect engagement of the dog 36 with the driving ratchet 32 so that shaft 30, to which plate 34 is secured, will be driven with gear 28. At the completion of the revolution during which magnet 44 is deenergized and its armature 46 restored to normal position, the plate 42 will strike the free end of the armature 45 to cause relative movement of the two plates 34 and 42, and result in disengagement of the dog from the driving ratchet 32.

The foregoing constitutes a well known form of one-revolution clutch mechanism, whereby the energization of magnet 28 will cause shaft 30 to take a single revolution, effective to accomplish what will be hereinafter designated as a card feed cycle.

*First card feed cycle.*—This cycle is utilized to feed a card from the feed magazine 10 to the punch pre-registration station A.

Figure 5:
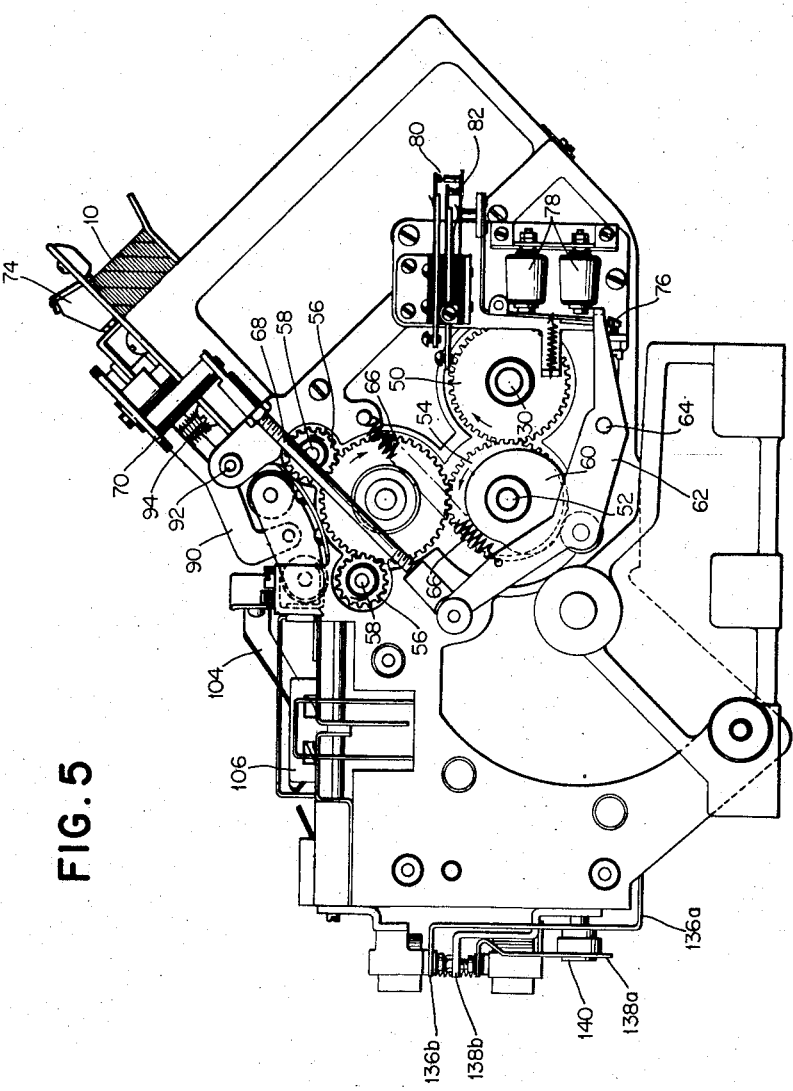
Fig. 5 is an end elevation of the card feed mechanism looking in the direction of lines 5—5 of Fig. 1.
Figure 6:
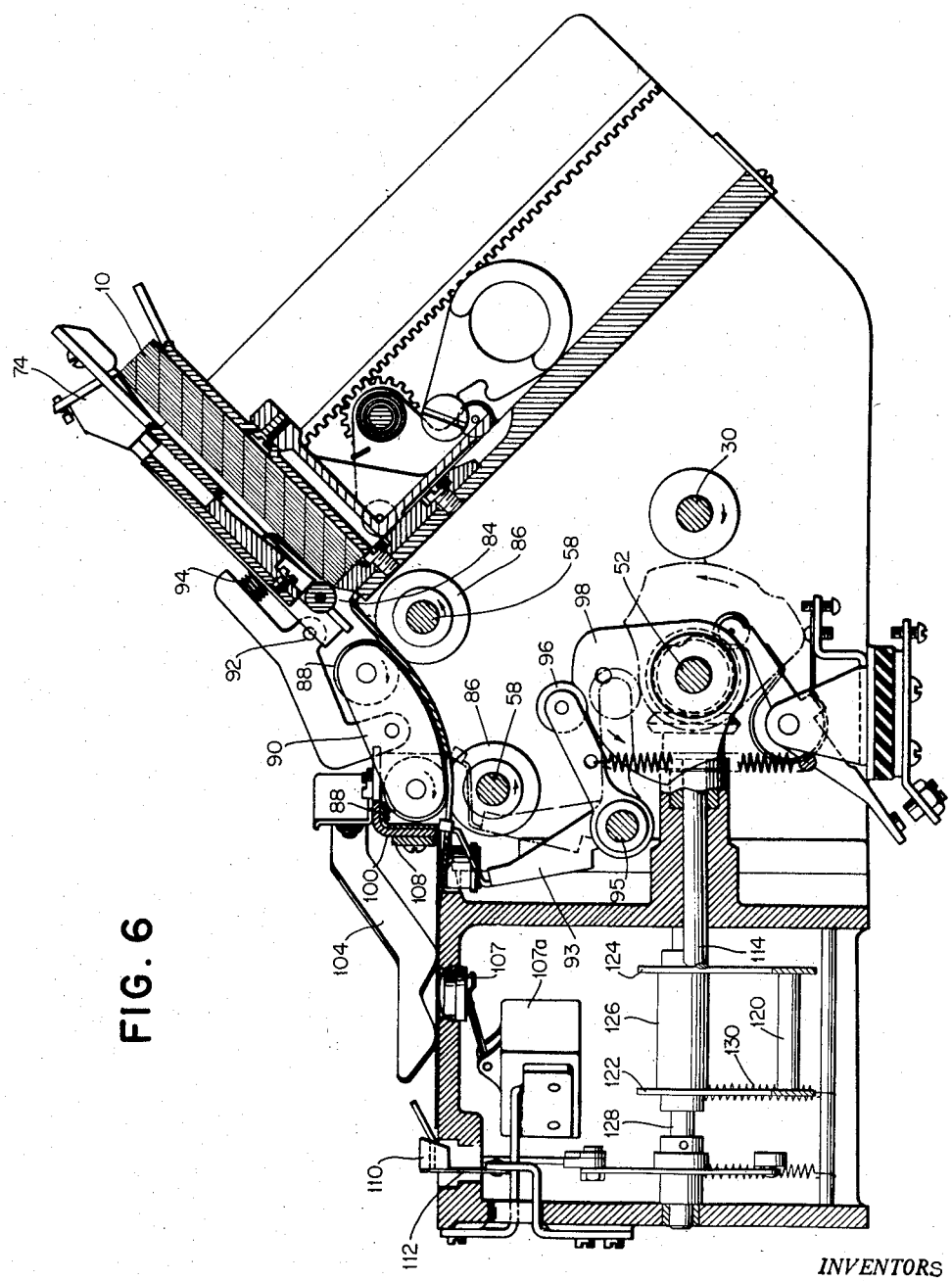
Fig. 6 is a sectional elevation of the card feed mechanism taken on lines 6—6 of Fig. 1.

Regardless of whether forward or reverse operation is effected at the punch station the records are initially fed from the magazine 10 to the punch pre-registration station A in the same manner. Referring to Figs. 3, 5 and 6, shaft 30 has a gear 50 secured to its end which drives a shaft 52 through gear 54, and through further gearing generally designated as 56 drives feed roller shafts 58. Secured to shaft 52 is a cam 60 which oscillates a lever 62 about its pivot 64. This lever 62 under the action of a spring 66 and through adjustable link 68 serves to oscillate lever 70 to reciprocate plate 72 to which feed knives 74 are fastened and are accordingly reciprocated in suitable guides for each revolution of the shaft 52. The ratio between gears 50 and 54 is 1:1 so that one revolution of the shaft 30 or one revolution of the shaft 52 will constitute one card feed cycle of operation.

Provision is made to selectively prevent operation of the feed knives when shafts 30 and 52 are being revolved. To this end an armature 76 of magnets 78 is arranged upon energization of the magnet to hook under a lateral extension of the right end of lever 62 and thereby block it against following the contour of the cam 60. Thus, when magnets 78 are energized the parts will remain substantially as shown in Fig. 4, independent of any rotation of the shafts 30 and 52, and cam 60 and the card picker knives 74 will not be reciprocated. As an incident to the energization of magnet 78, pairs of contacts 80 will be closed. The circuits controlled by these contacts will be explained later in connection with the circuit diagram.

Referring to Fig. 6, the downward stroke of the picker knife 74 will advance the foremost card in the magazine 10 through the throat 84, to the rollers 86 secured on shafts 58 and cooperating pressure rollers 88, which are carried in a framework 90 which is pivoted at 92 and biased clockwise by spring 94. The rollers 86 and 88 will advance the card to a position in Fig. 6 where its righthand or trailing edge is just to the left of the lower rollers 86 and 88.

Figure 7A:
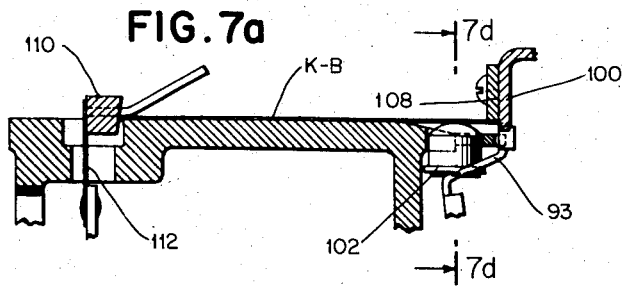
Figs. 7a, 7b, 7c and 7d show the relationship of the card with respect to mechanism shown in Fig. 6 at different steps of operation.
Figure 7B:
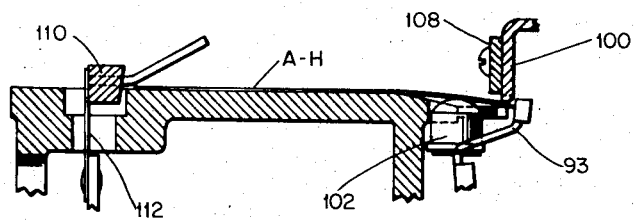
Figure 7C:
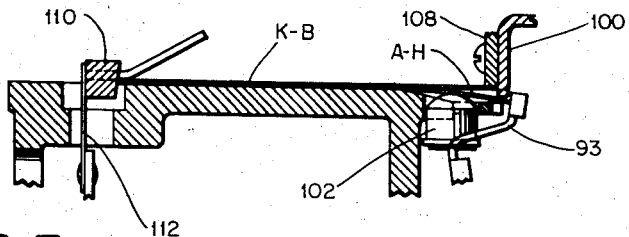
Figure 7D:
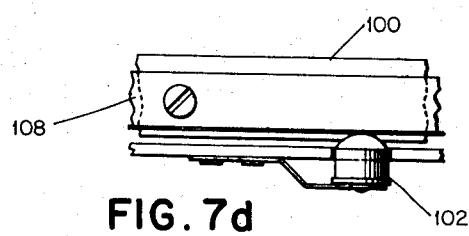

In Fig. 6 a card aligning pusher 93 pivoted at 95 has a roller 96 cooperating with a cam 98 secured to shaft 52. At the beginning of a card feed cycle the pusher 92 occupies the position shown in full lines. As the shaft 52 rotates the pusher 92 is rocked slightly in a counter-clockwise direction, which is an idle movement during the first card feed cycle, and is thereafter rocked in a clockwise direction to the dotted position shown, which position it reaches before the card being advanced from the magazine 10 has reached the lower pair of feed rollers 86 and 88. The cam 98 is such that the pusher 93 will remain in the dotted position until the rollers 86 and 88 have advanced the card over and past the pusher. At this time pusher 93 will be rocked back in a counter-clockwise direction to the full line position of Fig. 6. This movement will cause the upper end of the pusher 93 to engage the right end of the card to move it to the position H shown in Fig. 7b. Having been thus advanced to the H position the card will be under the bar 100 as viewed in Fig. 7b, in which position it will be held in place by the spring-energized buttons 102 (see also Fig. 7d), which bear upwardly against the righthand edge of the card to press it against the underside of the bar 100. As the card moves into the H position (Fig. 2), it enters between the spring-urged lever 104 and a button 107 (Fig. 6) to move the button downward to operate the card lever contacts in the form of a well known microswitch designated 107a.

At the end of this first card cycle another pusher 106 (Fig. 9), through mechanism about to be described, will engage the righthand end of the card as viewed in this figure and push it to the A position where the left end of the card is a distance of about six card columns to the right of the punch line C—C.

*Second card feed cycle.*—This feed cycle is utilized to advance the card from the pre-registration station A to the punch position B or to the punch position BB and if desired to feed a second card from the magazine 10 the pre-registration station A. A second cycle of shaft 52 is now initiated and, as explained before, the pusher 93 (Fig. 6) is given an initial counterclockwise movement which will shift it from the position of Fig. 7b to the position in Fig. 7a, wherein it shifts the card from the A position to the K position in which position the spring-pressed buttons 102 bearing against the underside of the card will snap the right end of the card, as viewed in Fig. 7a, slightly upward so that it lies against the lower edge of guide bar 108 and against the vertical edge of bar 100. The movement of the pusher 92 is such that the right end of the card is moved slightly beyond this position and the left end is forced against the guide bar 110 which is carried on a resilient strap 112 and serves to urge the card against the bar 100 and hold it in such alignment during its subsequent advance. The card is then advanced from the K position to either the B or BB position by the pusher 106 (Fig. 9), which is operated by a mechanism about to be described.

As shown in Figs. 3 and 8, from shaft 52 a cross-shaft 114 is driven through a pair of bevel gears 116, to which shaft 114 is secured a cam 118 (Figs. 9, 9a and 9b), which is rotated in a clockwise direction with the shaft. Cam 118 as it rotates engages a cam stud 120 which stud has secured to its extremities two levers 122 and 124 which levers are connected to a common hub 126, freely mounted on rod 128. A spring 130 (Fig. 9) attached to lever 122 urges the connected levers 122 and 124 in a counterclockwise direction. These integral levers carry studs 132 and 134 which bear against individual card pusher arms 136 and 138.

Card pusher arm 136, which may be called the column 0 pusher arm, is freely mounted on shaft 140 and has a flange extension 136a which cooperates with a control magnet armature 142 (see Fig. 11a), in a manner later to be described.

Figure 9:
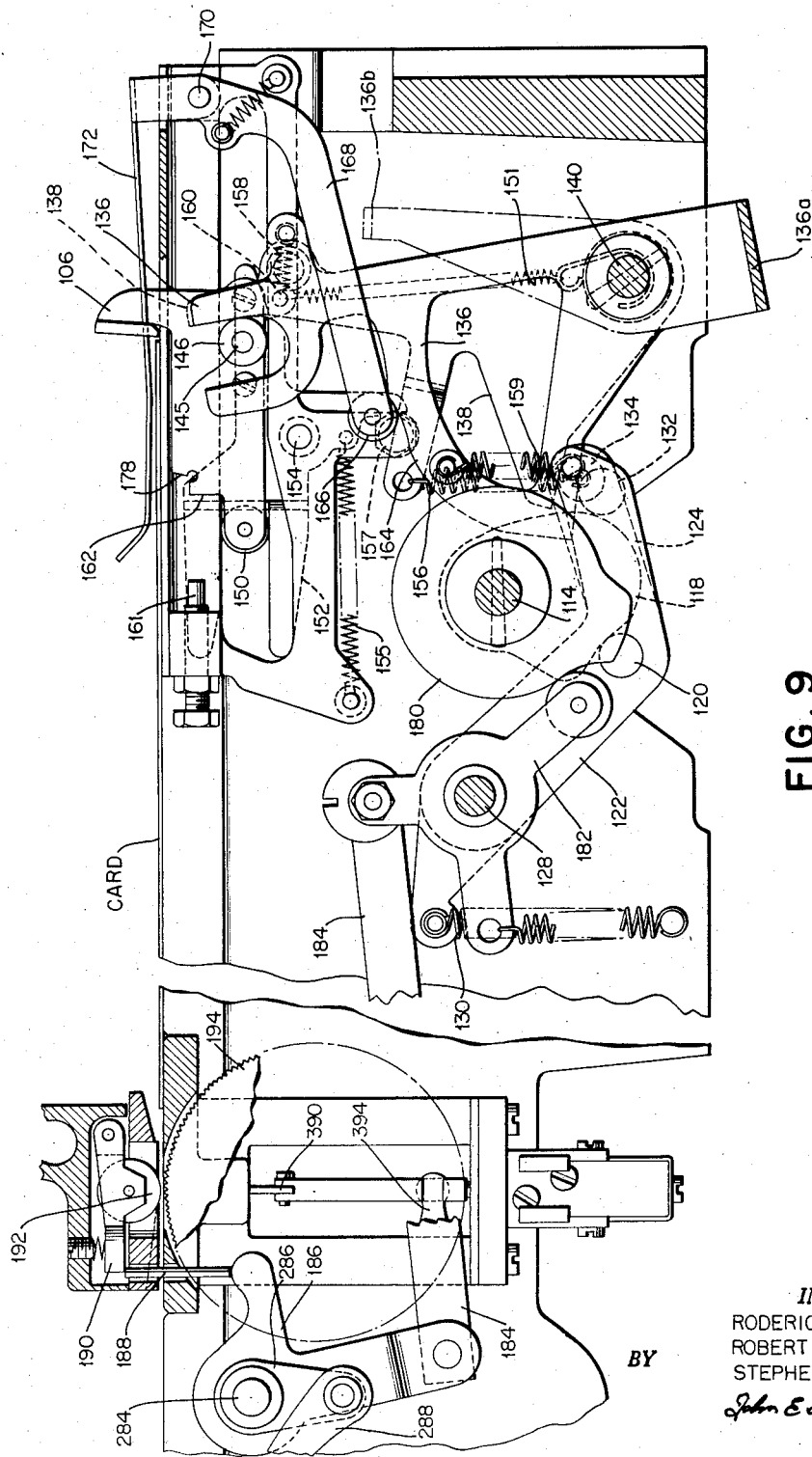
Fig. 9 is a sectional elevation on lines 9—9 of Fig. 8.

Card pusher arm 138, which may be called the column 2 pusher arm is secured to shaft 140 and its operation is controllable by a lever 138a also pinned to shaft 140, which lever 138a cooperates with a control magnet armature 144 in a manner later to be described. The card pusher 106 is mounted at its lower righthand end (Figs. 8 and 9) to a pivot stud 145 connecting a pair of rollers 146 and 148 and is reciprocated in a guideway formed in base plate 153. A spring 151 is provided to keep the pusher 106 seated in the guideway, bearing against the surface of base plate 153. At the left end of the pusher there is provided another roller 150 which rides in a guideway in a deflecting arm 152 which is pivotally mounted to the frame at 154, and urged by spring 155 in a clockwise direction against stud 157. When the pusher assembly is in its home position before a feed cycle is initiated, as shown in Fig. 9, a spring 156 will urge the column 2 arm 138 in a clockwise direction against the stud 134. The other end of arm 138 will then bear against roller 148 on the pusher 106. The column 0 arm 136 is biased in a similar manner by spring 159 urging it against roller 146. A spring 158 on the column 0 arm 136 is connected to a plate 160 mounted on the card pusher 106 to urge arms 136 and 138 against the rollers 146 and 148 on the pusher.

If, at the beginning of the second card feed cycle, neither of the register magnets 147 or 149 (Fig. 11a) is energized, which is the condition under which a card will be fed to the position B (Fig. 2), the lip 138b will be in line with the armature 144 which will prevent clockwise rocking of lever 138a and thus of the column 2 pusher arm 138, since both the lever and arm are secured to shaft 140. The lip 136b will, in this condition, be clear of the armature 142 and thus flange extension 136a, and the column 0 pusher arm 136, will be free to be rocked in a counterclockwise direction as viewed in Fig. 11a. With both magnets 147 and 149 in the deenergized condition during the second card feed cycle, when shaft 114 and cam 118 are rotated in a clockwise direction (Fig. 9), the cam stud 120 and connected levers 122 and 124 will follow the cam and at a time indicated in Fig. 35, after the action of the pusher 93 has moved the card to the position K, the column 0 pusher arm 136 following stud 132 will rock counterclockwise (Fig. 9b). This action of the arm is transmitted through the roller 146 to the card pusher 106 to move the card pusher horizontally towards the punch station and thus feed the card to the position B registered at the punch station with the first column of the card one column or step before the punch line C—C. The movement of the card pusher 106 toward the punch station is limited by the registration screw 161 which is in the path of the surface 162 on the card pusher.

A camming surface 164 on the column 0 arm 136, as the arm is rocked in a counterbalance direction, engages a stud 166 on lever 168 pivoted at 170 to pivot the lever and an attached card gripper 172 in a counterclockwise direction in order to place a slight drag on the card as it is being moved towards the punch station and thus hold the card against the card pusher 106. The continued rotation of cam 118 will now rock the column 0 pusher arm 136 back in a clockwise direction past the home position to a position shown dotted in Fig. 9a, and thence back again at the end of the feed cycle to the original position of Fig. 9. The purpose of this movement will be later explained.

If during the second card feed cycle the card pusher is to be utilized to advance the card from the K position to the BB or column 2 position, the control magnet 147 (Fig. 11a) will be energized and magnet 149 will remain deenergized. In this condition both of the extensions 136b and 138b will be clear of the armatures 142 and 144 and thus both card pusher arms 136 and 138 will be free to follow studs 132 and 134 in a counterclockwise direction.

Referring to Figs. 3 and 9, it will be seen that the length of the lever 124 from stud 120 to stud 134 is greater than the similar portion of lever 122 and thus the column 2 arm 138 will be rocked through a larger angle than the column 0 arm 136 and will be effective to move the card pusher 106 a greater distance towards the punch station. As cam 118 is rotated during the card feed cycle at a time after the pusher 93 has moved the card present at the A position to the K position, the column 2 pusher arm 138 through the roller 146 will move the card pusher 106 toward the punch station. Referring to Fig. 10, as pusher arm 138 is rocked counterclockwise a stud 174 thereon will bear against the camming surface 176 on the deflecting arm 152, causing the deflecting arm to pivot counterclockwise about point 154. Since the roller 150 on the card pusher 106 rides in a guideway in the deflecting arm 152, this pivoting will cause the card pusher to pivot about point 175 in a counterclockwise direction at it is moved toward the punch station, thus enabling the pusher to advance the card until the surface 178 on the pusher abuts against the registration screw 161. This movement of the card pusher is effective to advance the card from the K position to the BB or column 2 position in which the second column of the card is coincident with the punching line C—C. It should be noted that since the column 0 arm 136 is also allowed to be rocked during this cycle the card gripper 172 will be operated as before to put a slight drag on the card and hold it against the pusher 106. Continued rotation of the cam 118 will then rock the arms clockwise back past the home position to a position shown in Fig. 9a and thence back to the home position at the end of the card feed cycle.

If, during this second card feed cycle, it is desired to feed a second card from the hopper 10 to the pre-registration position A, the operation is as follows: During the second card feed cycle the pusher 93, after it has advanced the first card from the position A to the position K, as above explained, returns to the dotted line position (Fig. 6), while the second card is being advanced from the magazine 10 in the same manner as explained in the first card feed cycle, to allow the second card to be advanced to the H position. It will be noted, with reference to the first card in the K position, that its righthand end is elevated slightly above the second card being advanced by the rollers 86 and 88 to cause the second card to slide under the first card in a position shown in Fig. 7c where the second card will have its righthand end beneath bar 100 and urged against said bar by buttons 102. Referring to time chart (Fig. 35), the relative movement of the mechanism involved in the transport of the cards from the magazine 10 to the H and K positions is illustrated. It will be noted that the card pusher 93 moves to effect a side alignment represented by the position of the parts (Fig. 7a) where it remains for about 1/10 of a card feed cycle and then shifts back to its dotted line position (Fig. 6) to allow the second card fed from magazine 10 to be advanced over the pusher 93, at which time pusher 93 is moved back to its full line position of Fig. 6 to advance the second card to the H position under the first card fed. Toward the end of the second card feed cycle when the card pusher 106, after having moved the first card to the punch position B, has been rocked to the extreme position shown in Fig. 9a to allow the second card to be fed into the H position, the subsequent movement of the card pusher 106 to its home position will advance the second card fed from the H to the A position.

It should be noted here that the second card will normally be fed from the magazine 10 to the H position only when a first card is being advanced to the column 0 or B position anticipatory of forward punching. When the first card fed is to be advanced to the BB position anticipatory of reverse punching the magnets 78 are normally energized to prevent feeding of the following card from the magazine.

Figure 35:
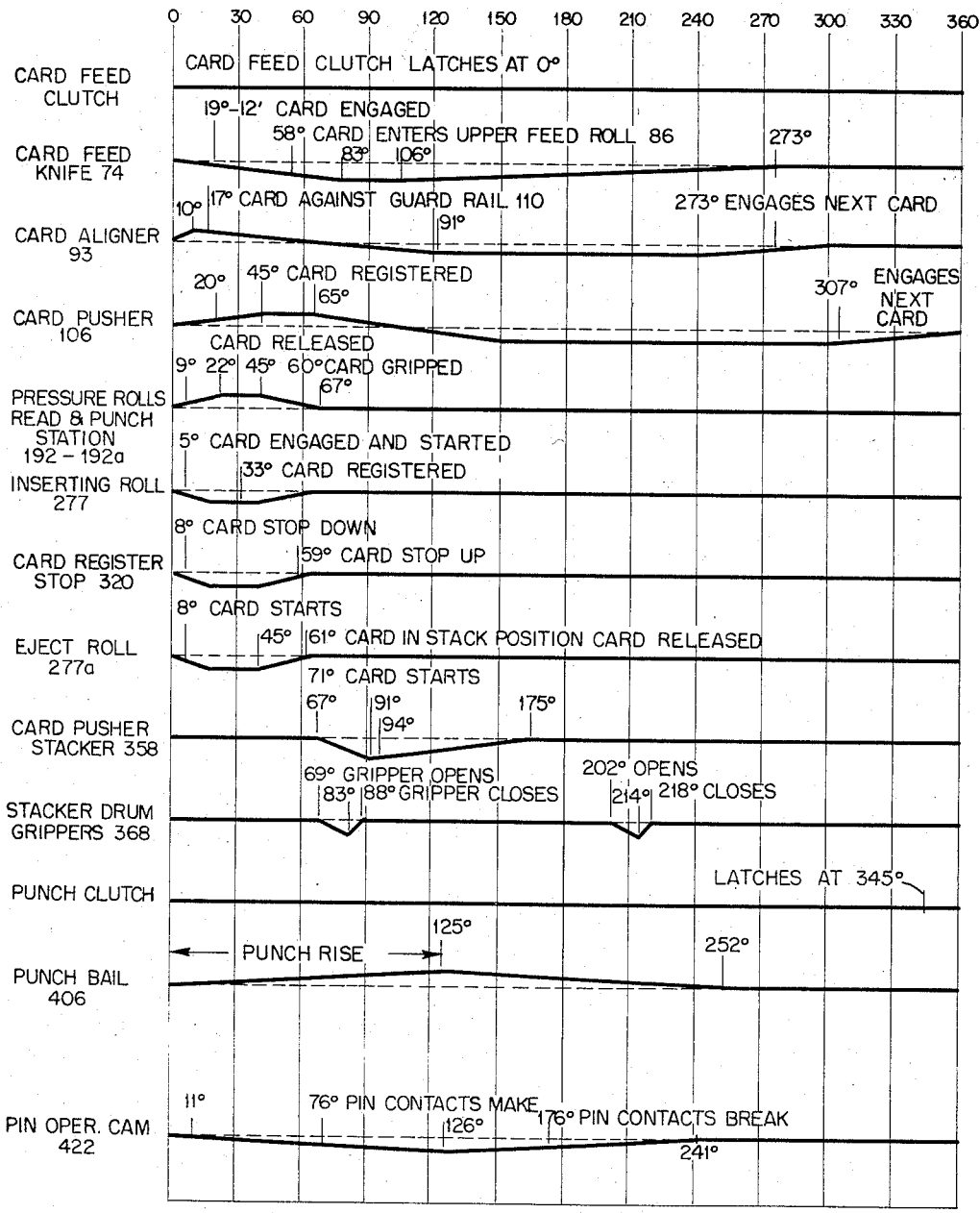
Fig. 35 is a mechanical timing diagram for the machine.

*Feed roller mechanism.*—Referring to Fig. 9, a second cam designated 180 on shaft 114 will rock the spring urged lever 182, which lever through link 184 will rock bell crank 186 to push a pin 188, located to one side of the path of the travel of the card, against spring loaded arm 190 carrying pressure roller 192. This roller is in line with the card feed wheel 194, the location of which is indicated in Fig. 2 where it engages one edge of the card and serves as the sole advancing means to step the card from position B or BB past the punching line C—C. The feed wheel 194 is under control of an escapement mechanism and is operable for rotation in either direction in a manner later to be described. The timing is such that, as indicated in Fig. 35, the pressure roller 192 is raised out of engagement with the feed wheel 194 at the beginning of a card feed cycle while the card pushers 93 and 106 advance the card from the A to the B or BB position. After pusher 106 has been advanced to abut against a registration screw 161 and the card has been fed to either the B or BB position, as the case may be, the roller 192 is lowered to press the card against the feed wheel 194. Once the card has been thus gripped between the roller 192 and wheel 194 the pusher 106 is moved back to this extreme opposite position, leaving the card held between the roller and wheel.

*Differential drive mechanism.*—Referring to Fig. 3, the rotating gear 28 on shaft 30 is integral with the bevel gear 200 which, through a like gear, drives shaft 202 to which shaft is affixed gear 204. As shown in Fig. 12, gear 204 drives a gear 206 pinned to shaft 208, which gear 206 drives gear 210 freely mounted on shaft 212. Gear 210 has integral therewith another gear 211 which drives gear 214 freely mounted on shaft 216 (see Fig. 11b). These gears above mentioned are constantly rotating in the direction shown in Fig. 12a, and constitute what may be termed as the input drive to the differential mechanism. Mounted on oppositely extending flanges 217 of the gear 214 (Fig. 12) are two sets of planetary gears 218 and 220 which are free to rotate about pins 219 and 221, respectively. The planetary gears 218 mesh with sun gear 228 and also with the internally cut teeth 222a of ring gear 222. The planetary gears 220 mesh with sun gear 226 and also with the internally cut teeth 224a of ring gear 224. The ring gears 222 and 224 and the sun gears 226 and 228 are freely mounted on shaft 216. The output of the differential drive mechanism is through gears 236 and 238 freely mounted on shafts 208 and 212. Gear 238 transmits rotation through a friction clutch to an escapement controlled drive mechanism, later to be described, which drives feed wheel 194 to step a card in either direction past the punch line C—C. For forward escapement of a card past the punch line, gear 238 must be rotated in a counterclockwise direction and for reverse escapement in a clockwise direction. The direction of rotation of the output gear 238 is controlled by a solenoid operated bail 230 (see Fig. 11b), having two lugs 232 and 234 which are selectively engageable with ratchet teeth 226a and 228a provided on the sun gears 226 and 228.

Figure 11B:
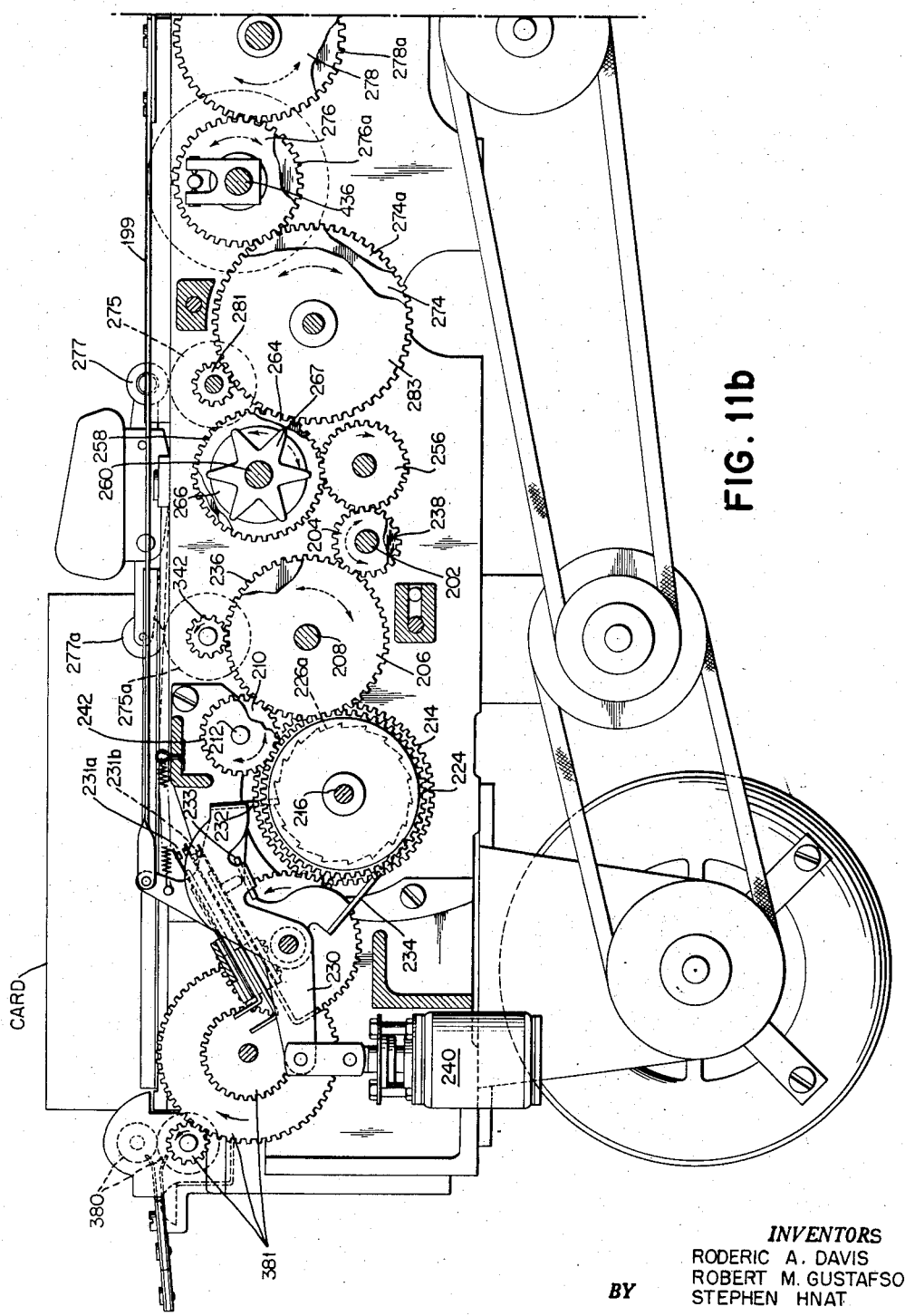
Fig. 11b is a front elevation looking in the direction of lines 11b—11b of Fig. 1.

Fig. 11b illustrates that, when the solenoid 240 is in the deenergized condition, the lug 232 engages one of the ratchet teeth 226a on sun gear 226. This is the condition which will result in the counterclockwise rotation of the output gear 238 which is necessary to effect forward escapement. As has been above stated, input gear 214 which constantly rotates in a clockwise direction carries with it the planetary gears 218 and 220 pivotally mounted on flanges 217. Since lug 232 is engaged with the ratchet teeth 226a, the sun gear 226 will be prevented from rotating in a clockwise direction.

Thus, as illustrated in Fig. 12b, the planetary gears 220 carried by the flange will be rotated in a clockwise direction around pins 221 and will positively drive ring gear 224 in a clockwise direction. Externally cut teeth 224b on ring gear 224 engage gear 242 pinned to shaft 212 to effect counterclockwise rotation of the shaft and of the gear 244 pinned to the other end of the shaft. Gear 244, through the idler gear 236, will drive output gear 238 in a counterclockwise direction. Thus with lug 232 engaged with the ratched teeth 226a of sun gear 226 a positive drive is effected from the input gear 214 to drive output gear 238 in a counterclockwise direction. Idler gear 236 also meshes directly with externally cut teeth 222b of ring gear 222 which will cause counterclockwise direction of gear 222 and thus counterclockwise rotation of the planetary gears 218 around pins 219 which rotation is transmitted to the sun gear 228 now free to rotate in either direction.

When the solenoid 240 is energized, the bail 230 is pivoted counterclockwise causing lug 234 to engage ratchet teeth 228a on sun gear 228 and lug 232 to be out of the path of ratchet teeth on the sun gear 226. Thus sun gear 226 will now be free to rotate in either direction and sun gear 228 will be prevented from rotating in a clockwise direction.

With sun gear 228 stationary, as shown in Fig. 12c, the planetary gears 218 carried by constantly rotating gear 214 are rotated in a clockwise direction around this now stationary sun gear which will cause ring gear 222 to be rotated in a clockwise direction which motion is transmitted through the externally cut teeth 222b to the idler gear 236 to drive the output gear 238 in a clockwise direction. Thus, with the solenoid 240 energized, a direct drive is maintained from the input gear 214 to rotate the output gear 238 in a clockwise direction which is the condition necessary to effect reverse stepping of the card past the punch line C—C. In this condition, the motion transmitted back from the idler gear 236 through the gears 244 and 242 to the ring gear 224 will be taken up by the sun gear 226, now free to rotate in either direction.

*Escapement mechanism.*—Referring to Figs. 3 and 11b, the output gear 238 through a gear 256 drives a gear 258 freely mounted on a shaft 260. Gear 258, as shown in Figs. 4 and 8, is flanked on both faces by friction springs 262, one of which abuts against a gear 264 which is secured to the shaft 260. The other spring abuts against a disc 266 pinned to the shaft 260 for rotation therewith but arranged for a slight movement axially on the shaft. Bearing against the outer face of the disc 266 is a cupped leaf spring 267 which urges the parts toward the right, as viewed in Fig. 8, agains the gear 264, so that there is frictional drive to the gear 264 tending to drive this gear in the same direction as the output gear 238.

Another gear 264a is integral with gear 264 and these gears through a spring-loaded gear train (Fig. 8), later to be described, drive shaft 248 on which the card feed wheel 194 is mounted. Also mounted on shaft 248 are two escape wheels 250 and 252, each of which is provided with ratchet teeth. Escape wheel 252 is pin connected to shaft 248 and wheel 250 is secured to the shaft through spiral spring 282. An armature 251 controlled by a magnet 249 is mounted adjacent to forward escape wheel 250 so that the armature in a deenergized position will abut against the ratchet teeth and prevent counterclockwise roation of the wheel 250, and thus of the shaft 248. Another armature 253 controlled by a magnet 255 is mounted adjacent the reverse escape wheel 252 so that the armature 253, when in a deenergized position, will prevent clockwise rotation of reverse escape wheel 252, and thus of the shaft 248. If the output gear 238 is rotating in a counterclockwise direction, and through gear 256 driving the friction drive assembly so as to tend to urge the gears 264 and 264a counterclockwise, these gears will be constrained against such movement by the action of the armature 251 engaging the ratchet teeth on the forward escape wheel 250. If the output gear 238 is rotating clockwise, the armature 253 engaging the teeth on escape wheel 252 will perform a like function.

Control circuits later to be described are provided to energize the solenoid 240 to control the direction of rotation of the gear 236 in a manner heretofore described and in conjunction with the control of solenoid 240 to momentarily cause energization of either magnet 249 or 255, freeing the ratchet teeth of the forward or reverse escape wheel, as the case may be, from the associated armature to allow the feed wheel 194 to step the card in either direction. Provision is also made to deenergize the magnet 249 or 255 in time so that its armature 251 or 253 may be returned to engage the next succeeding tooth of the ratchet. This single tooth advance constitutes a step or column of advance of the record past the punch line C—C. It should be noted here that pairs of escapement contacts 245 and 247 (Fig. 11a) are associated with each armature 253 and 251. These contacts are closed upon attraction of the associated armature by its magnet and they control circuits later to be described with reference to the circuit diagram.

The stepping movement is transmitted to the cards at the punch station through the action of the feed wheel 194 cooperating with the pressure roller 192. The feed wheel is provided with serrations around its periphery which are in the form of finely cut V-shaped teeth which, in cooperation with the pressure roller 192, grip the card firmly along its lower margin as shown in Fig. 2. As the card is stepped past the punch line C—C in either direction, the resilient guides 110 and 110a (Figs. 1 and 6) urge it with constant pressure against the stationary rails 100 and 100a to maintain the card in correct registration as it is advanced.

Figure 24:
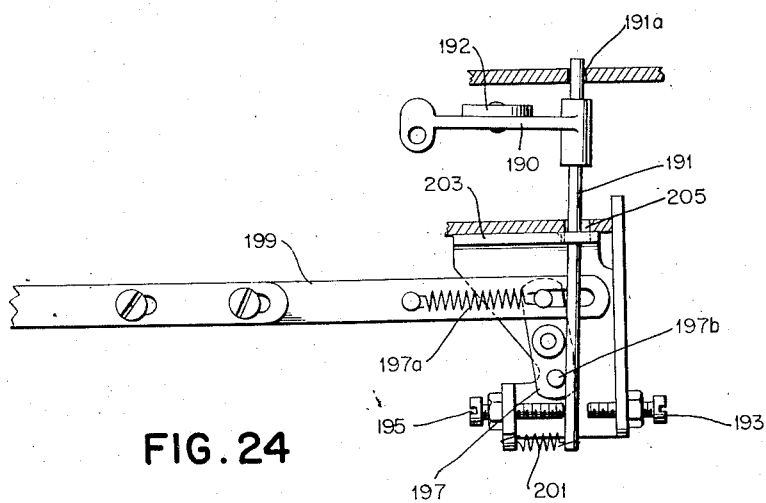
Fig. 24 is a detail view of the shiftable feed roll mechanism.

In order that a card being fed past the punch line C—C may be maintained against the upper rails 100 and 100a, for both forward and reverse escapement, provision is made to skew the roller 192 to cause it to urge the card against the upper rail 100a during forward escapement and against the upper rail 100 during reverse escapement. Referring to Fig. 24, arm 190, on which the roller 192 is mounted, is secured to a rod 191 which extends through a slot 205 in a frame piece 203, which slot is transversely oversize with respect to the arm 190 to allow pivoting of the arm in the slot. A spring 201 attached to the end of rod 191 normally pivots the rod about point 191a causing it to abut against the stop screw 195 as shown in Fig. 24. In this position the roller will urge a record, being escaped in a forward direction, against the upper rail 100a. When solenoid 240 is energized for reverse drive, a link 199 connected to bail 230 (Fig. 11b) will be moved toward the left which motion is transmitted through spring 199a to pivot bell crank 197 in a counterclockwise direction about point 197a thus engaging stud 197b with the rod 191 and causing the rod to be pivoted against the limit screw 193. In this position the roller will urge a card, being stepped past the punch line C—C in a reverse direction, against the upper rail 100.

If, as heretofore explained, a card has been advanced to the punch station in position B anticipatory of forward punching, the solenoid 240 will then remain deenergized and control circuits will be completed to energize forward escape magnet 249 to effect forward stepping of the card past the punch line C—C. When it is required to advance a card a greater distance than the space between successive columns the magnet 249 is held energized for the required time allowing the shaft 248 and feed wheel 194 to advance the card the required extent with a continuous movement.

If a card has been advanced to the punch station in position BB anticipatory of reverse punching, the operation is as above to advance the card a predetermined distance past the punch line at which time the solenoid 240 will be energized and the control circuits to magnet 255 will effect the reverse stepping of the card past the punch line.

Referring to Fig. 11b, a pair of contacts 231a and 231b are operated by a lug 233 on bail 230. With solenoid 240 deenergized contacts 231a are opened and 231b are closed. Energization of the solenoid and pivoting of the bail will cause lug 233 to close contacts 231a and allow contacts 231b to open. Control circuits are provided from these contacts to the escapement magnets 249 and 255 so that, when solenoid 240 is deenergized, magnet 255 will be continuously energized and, when solenoid 240 is deenergized, magnet 249 will be continuously energized in order to prevent the armature 251 or 253, as the case may be, from dragging on the ratchet teeth of its associated escape wheel when that armature is not being utilized to control escapement.

*Gear train.*—The gear train (Figs. 3 and 8) which, as has been stated, transmits the drive from the frictionally driven gears 264 and 264a to the shaft 248, comprises a series of gears 274, 274a, 276, 276a, 278, 278a, 280 and 280a, mounted in tandem and spring-loaded by a spiral spring 282. Pinned to shaft 260 is another card feed wheel 194a, similar to card feed wheel 194, which wheel 194a is located to engage a card at the reading station with cooperating pressure roller 192a (see Fig. 2). It will be noted that the shaft 260 is through the above gear train, connected for step by step movement with shaft 248 so that when wheel 194 moves the companion wheel 194a moves likewise under control of either of the escape magnets 249 or 255 to concurrently step a pair of cards past the punch and read lines C—C and E—E, respectively. The escape magnet armature 251 is so located with respect to the forward escape wheel 250 that, when a card is being stepped by the feed wheel 194 past the punch line under control of magnet 249 and forward escape wheel 252, the successive columns of the card will be in registration with the punch line C—C after each step. When solenoid 240 is energized to initiate reverse operation, the armature 253 is so located with respect to reverse escape wheel 252 that the column registration with the punch line will be maintained. At the same time a card at the read station will be under control of the card feed wheel 194a. In order to eliminate backlash and thus maintain the columns of the card at the read station in registration with the read line E—E during both forward and reverse operation, the spring-loaded gear train is provided.

Referring again to Fig. 8, it will be seen that two similar sets of gears are mounted in tandem between shafts 260 and 248. The gears 264 and 264a on shaft 260 are integral and secured to the shaft. The gears 274, 276 and 278 of the forward set are secured to their respective shafts while the opposite gears 274a, 276a and 278a of the rear train are free on their shafts. Gear 280a, which transmits motion of the rear train, is pinned to shaft 248. Gear 280 is freely mounted on the shaft and transmits the motion of the front gear train through the spiral spring 282. This spring is connected between the gear and the forward escape wheel 250 which is pinned to shaft 248. Wheel 250, gear 280 and spring 282 are initially assembled with tension on the spring urging the wheel 250 and gear 280 in opposite directions; the wheel 250, as viewed in Fig. 11a, being urged in a clockwise direction and the gear 280 in a counterclockwise direction. The effect of this tension is transmitted from gear 280 through the front train to gear 264 secured to shaft 260, causing the teeth on gear 264 and 274 to be in the relationship shown in Fig. 8b. The effect of the tension is also transmitted from the feed wheel 250 pinned to the shaft 248 to gear 280a also pinned to shaft 248 and thence back to the freely mounted gear train to gear 264a and will result in the teeth of gears 264a and 274a being in the relationship shown in Fig. 8a. Thus, for forward escapement when shaft 260 will be urged in a counterclockwise direction, the drive to the card feed wheel 194 will be through the gears 264a, 274a, 276a, 278a, 280a, and shaft 248 to the card feed wheel 194. For reverse escapement the drive is transmitted through the front train of gear to gear 280 and thence through spring 282 to feed wheel 250 which is pinned to shaft 248. The spiral spring 250 is of sufficient tension to maintain the train in this loaded condition (Figs. 8a and 8b), during all operations of the machine and thus a fixed relationship is maintained between the card feed wheels 194 and 194a, which will enable correct registration of the columns of the cards at the read and punch lines under both forward and reverse escapement.

*Third card feed cycle.*—This cycle is utilized after completion of punching and related operations to advance the first card fed from the punch station to the position G and also to advance a card present at the H position to the B or BB position (Fig. 2).

Figure 14:
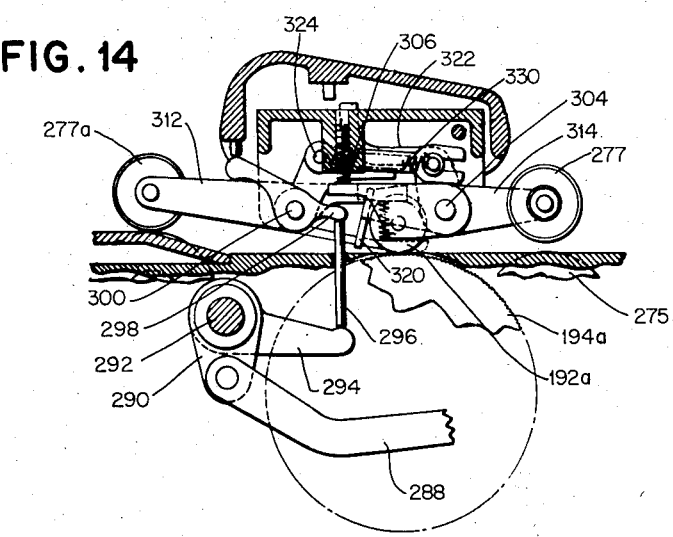
Fig. 14 is a detail section taken on lines 14—14 of Fig. 13.

The mechanism thus far described serves to advance the card from the hopper 10 to position B or BB and thence past the punch line C—C by forward escapement or by a combination of forward and then reverse escapement, as the case may be. After all the columns have been stepped past the punch line C—C, the leading edge of the card will have been advanced between rollers 275 and 277 (Figs. 1 and 14). Roller 275 is mounted on a rod 279, the other end of which has a gear 281 secured thereto which meshes with gear 283 constantly driven by gear 258 (Fig. 3). The advance of the card from this position to the G position of Fig. 17, to bring the first column of the card to the reading line E—E, is effected during the card feed cycle of operation and is concurrent with the advance of the next following card from the A position to the B position and also with the advance of the third card from the magazine 10 to the A position.

Referring to Fig. 9, the bell crank 186, which was rocked during a card feed cycle as previously described, is secured to a rod 284 which also carries an arm 286 connected to a link 288 which extends transversely across the front of the machine and at its other extremity is connected to a similar arm 290 (Fig. 14) attached to rod 292 so that when rod 284 is rocked during the card feed cycle the companion rod 292 will be similarly rocked. The latter rod 292 has an arm 294 secured thereto which operates on a vertically guided pin 296 to elevate it concurrently with the elevation of pin 188. The normal position of the read station mechanism is illustrated in Fig. 14. During a card feed cycle, operation of pin 296 will actuate the mechanism to the position of Fig. 15 to allow a card present at the read station to be ejected therefrom and also to allow a card just punched to be advanced to the read station. As pin 296 is raised it engages a lever 298 secured to a rod 300 rocking it clockwise so that the short end of the lever engages and pivots the free end of a lever 302 freely supported on a rod 304 and biased downwardly by compression spring 306.

Pivotally connected to lever 302 is pressure roller 192a which will thus be raised away from the feed wheel 194a in anticipation of the advancing of a card to the read station G. Rocking the rod 300 will also rock arm 308 secured thereto, which rod 308 carries adjustable screws 310 (Fig. 13), normally abutting levers 312 and 314. These levers are normally biased to rock in opposite directions by springs 316 so that, upon rocking of arm 308, lever 314 is tilted about rod 304 upon which it is freely mounted to bring the roller 277 into engagement with the card and hold the card against the constantly rotating feed roller 275. This will cause the card to be rapidly advanced toward the left end of the machine, as viewed in Fig. 15, until it is interrupted by a stop 320 which is lowered into the path of the card from the position of Fig. 14 to that of Fig. 15 concurrently with the elevation of pressure roller 192a. The lowering of stop 320 is effected through the following connections.

The arm 308 has a link 322 pivoted thereto at 324 and its opposite end is bifurcated to straddle a pin 326 on an arm 328 secured to rod 304. A spring 330 serves to urge pins 324 and 326 toward one another. Thus, as arm 308 is rocked counterclockwise to the position of Fig. 15, link 322 will move therewith and through spring 330 will rock arm 328 and its connected rod 304 so that card stop 320 which is also secured to the rod will rock counterclockwise into the path of the card. When the leading edge of the card strikes the stop 320, the roller 318 will slip against the surface of the card to hold it against the stop until roller 192a is again lowered to press the card against feed wheel 194a. In this position the first column of the card will be coincident with the read line E—E.

Figure 13:
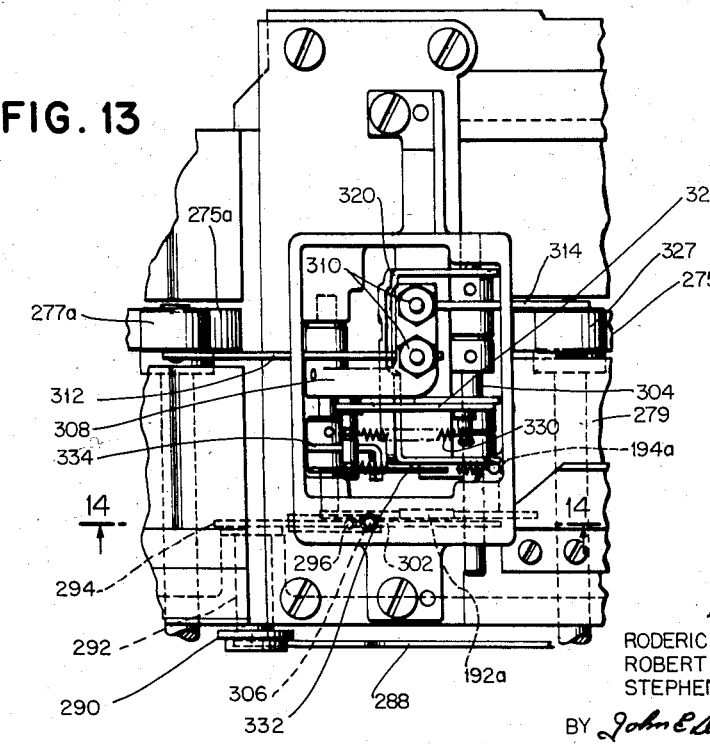
Fig. 13 is a plan view of the card ejecting mechanism.

*Manual insertion.*—As has been previously stated, it is also possible in the present invention to manually insert a card at a point just before the reading station G. This procedure is normally followed when there is already present in the machine a card at the punch pre-registration station A. After manual insertion initiation of a feed cycle will advance the manually inserted card to the position G, the first column being coincident with the reading line E—E and also advance the other card from the position A either to the position B or BB, according to the subsequent operation that is to be effected. The card at position A is advanced in the same manner as has been previously described. The operation for the manually inserted card is as follows:

Referring to Fig. 16 a so-called safety stop arm 332 is provided which is freely pivoted on rod 300 and with no card present at the read station arm 332 is in the position shown in Fig. 16. When a card is inserted between the rollers 275 and 277, normally spread apart as shown in Fig. 13, the arm 332 will limit the distance the card may be inserted. Initiation of a feed cycle, as described before, effects lowering of roller 277 together with stop 320, and during this operation another arm 334 secured to rod 300 will engage the underside of the arm 332 to rock it out of the path of the card so that the card may be advanced by the rollers 275 and 277 against the stop 320. The provision of arm 332 is for the purpose of locating the leading edge of the card far enough to the right, as viewed in Fig. 15, so that ample time is provided for stop 320 to drop in front of the card before rollers 275 and 277 can advance it past this point.

There is also provided at the read station a pair of card lever contacts 110b which are mounted just to the right of the read station (Fig. 1) and are operable by the resiliently mounted guide 110a when a card is present at or just before the read station.

*Card stacking mechanism.*—The first card fed having been advanced to position G is now stepped past the read line E—E in conjunction with the next fed card being stepped past the punch line C—C. The cards are stepped past the read and punch lines, respectively, under control of the differential drive solenoid 240 operating in conjunction with the escape magnets 249 and 255 to effect forward and reverse escapement. After this operation has been completed and all columns of the cards have been stepped past the respective read and punch lines, a fourth card feed cycle advances the first card fed to the stacking mechanism in the following manner.

Figure 17:
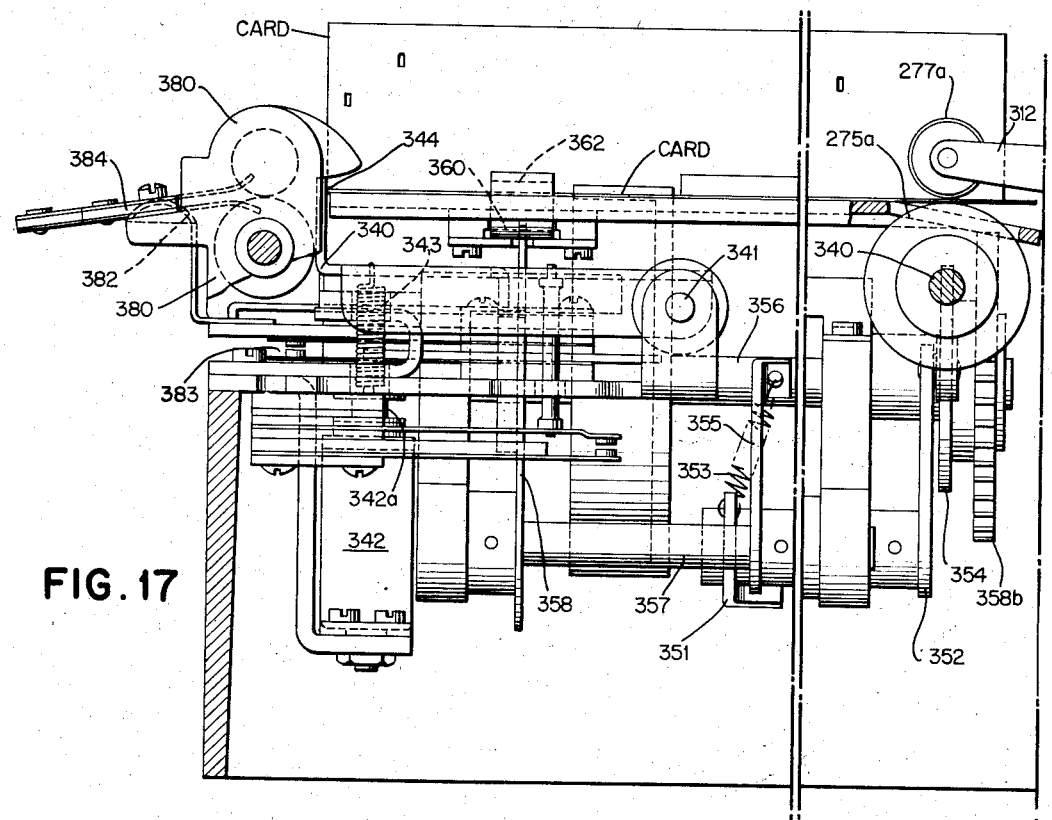
Fig. 17 is a sectional elevation of the card stacking mechanism taken on lines 17—17 of Fig. 1.
Figure 18:
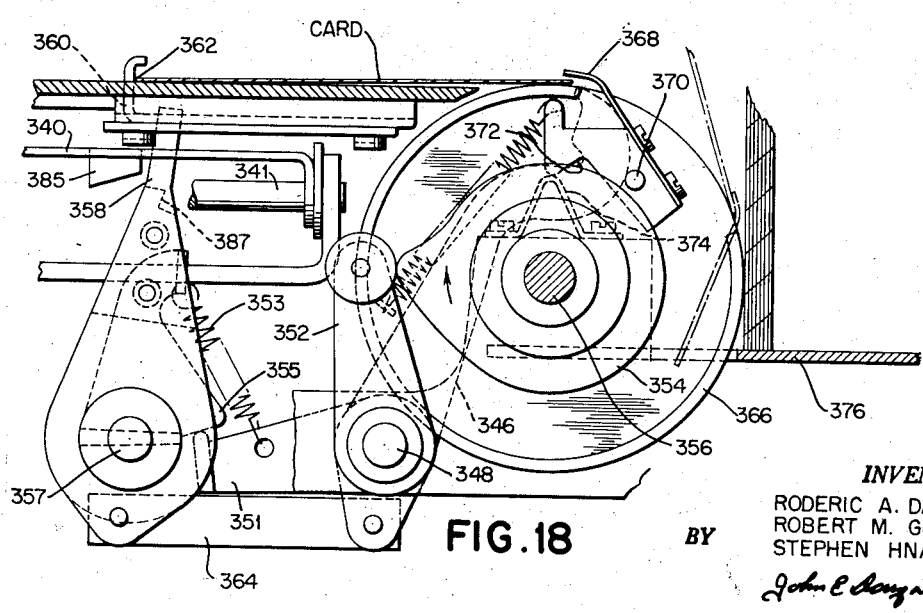
Fig. 18 is a position view of parts shown in Fig. 19.
Figure 19:
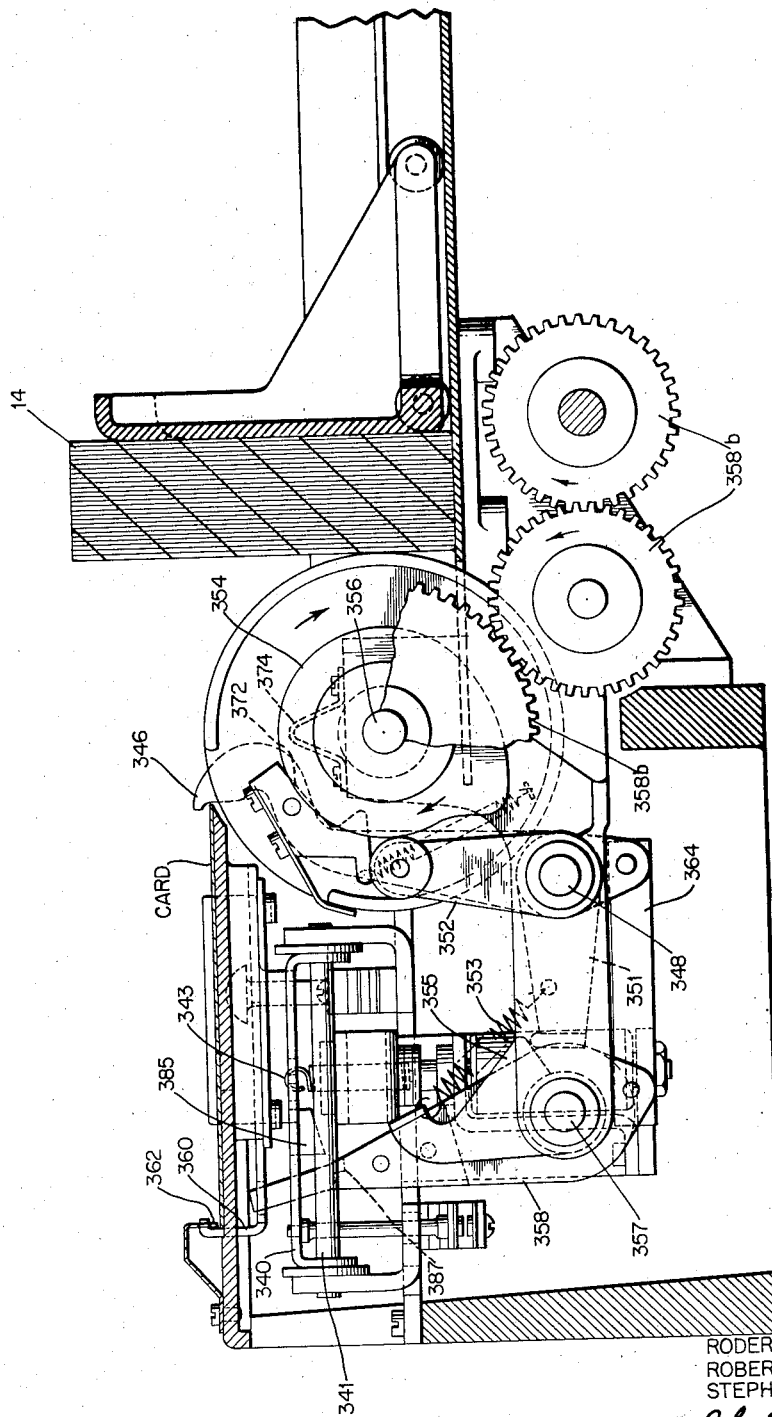
Fig. 19 is a sectional elevation through the card ejecting and stacking mechanism taken on lines 19—19 of Fig. 1.

*Fourth card feed cycle.*—In Fig. 3 there is shown a roller 277a secured to shaft 340 whose opposite end has a pinion 342 which is driven from the constantly rotating gear 206. When, as above explained, lever 312 is rocked from the position of Fig. 14 to that of Fig. 15, a roller 275a will be lowered against the upper surface of constantly rotating roller 277a so that a record present in this position will be pressed against the constantly rotating roller 277a and rapidly advanced to the left to the position F of Fig. 2. Referring to Fig. 17, a gate 340 pivotally mounted at 341 and operable by a solenoid 342 is urged in a clockwise direction by a tension spring (not shown). With the solenoid in the deenergized position the surface 344 on the gate 340 will act as a stop to limit the movement of the card to the left by the rollers 275a and 277a. In the position designated F in Fig. 2 the right hand edge of the card is still between the rollers 275a and 277a which will thereupon slip on the card. When the card advanced is to be stacked in the position 14 the operation is as follows:

The timing diagram of Fig. 35 indicates that roller 277a is lowered to effect the feeding of the card to position F and thence raised in the early portion of the card feed cycle. A guide lever 345 (Fig. 19) is normally in a position to guide the card in its endwise movement to the left and this lever is freely mounted on a rod 348, to which rod is secured cam follower arm 352 with which card pusher cam 354 cooperates. This cam 354 is secured to shaft 356 which is driven, through gearing generally designated 358b, from card feed shaft 30 (see Fig. 3) which, as has been previously explained, makes a single revolution for each card feed cycle. The gear ratio is such that shaft 356 and cam 354 secured thereto, will make one revolution for each card feed cycle. As the cam 354 rotates from its home position of Fig. 19 to the position shown in Fig. 17, follower arm 352 will be rotated counterclockwise causing rotation of shaft 348. To shaft 348 there is coupled, through an arm 351 and safety spring 353, a lever 355 which lever following shaft 348 will be rocked clockwise to the position of Fig. 18. This lever 355 is secured to a rod 357 to which rod are also secured a pair of pusher fingers 358 having extensions that extend through suitable openings in a pair of slides 360. These slides each contain a pusher surface 362 which in the home position of Fig. 19 are to the left of the card in the F position. As the fingers 358 are rocked clockwise, the card will be moved to the right by the surfaces 362 on the slides 360. The clockwise rocking of the fingers 358 through a connecting link 364 effects clockwise rotation of card guide lever 346 from the position of Fig. 19 to that of Fig. 18, in which position the upper end of the card guide lever is below the card line and out of the path of the card being moved by the slide surfaces 362.

Secured to the shaft 356 is a stacker drum 366 which carries well-known spring carry clips 368 pivoted at 370. The rotation of the drum from the position of Fig. 19 to that of Fig. 18 will cause engagement of the surface 372 of the carry clip 368 with camming surface 374 causing opening of the clips to allow the leading edge of the card to enter under the clips. Continued rotation of the drum 366 will cause the carry clips 368 to be carried past the surface 374 allowing the clips to close on the card and swing it through an angle of 90 degrees into the card stacker 14 where, as the leading edge of the card passes the platform 376, the card will be stripped from the clips and after completion of the revolution of the shaft 356, the parts will be back in their normal position of Fig. 19.

When it is desired to advance the card to the stacking postion 12, the solenoid 342 will be energized before the card being advanced to the position F has been advanced against the surface 344 on the gate 340. Energization of the solenoid will, through solenoid plunger 342a and spring 343, effect pivoting of the gate in a counterclockwise direction (Fig. 17) around pivot 341 and bring the surface 344 below the card line. A gear train generally designated 381 transmits motion from constantly running gear 214 to a pair of feed rollers 380. The card being advanced by feed rollers 375a and 377a will be advanced past the pivoted gate to these rollers which will continue the advance of the card to the position 12. A card lever 382 is provided to close contacts 383 as the card is being fed into the position. The card is held in position 12 through the spring action of the card lever tending to force the card against the upper surface of the card chute 384. Cards are normally manually removed from the position 12, the contacts 383 in the closed condition being effective, as will be later described, to prevent further operation of the machine while a card is present in this position.

In order to prevent operation of the slides 360 during the advancing of the card from the position F to the position 12 a tooth 385 is provided on the gate 340 which tooth is normally clear of lateral extension 387 on the finger 358 farthest from the reading station. Upon energization of the solenoid 342 and pivoting of gate 340, the tooth 385 will be in the path of the extension 387 and will prevent clockwise rocking of this finger and through the shaft 357 of the other finger 358. This rotation of cam 354 will thus be ineffective to cause movement of the slides 360, the pivoting of the arm 351 merely stretching the safety spring 353.

In carrying out the purpose of the present invention, units for reading, punching, printing and keyboard control of the cards in the machine are provided. Each of these units is of the type disclosed in U.S. Patent No. 2,647,581, issued to Elliott Gardinor and Arnold Crowell on August 4, 1953. Reference may be made to this patent as an aid in understanding the operation of these units in the present invention.

*Punching mechanism*

Figure 20:
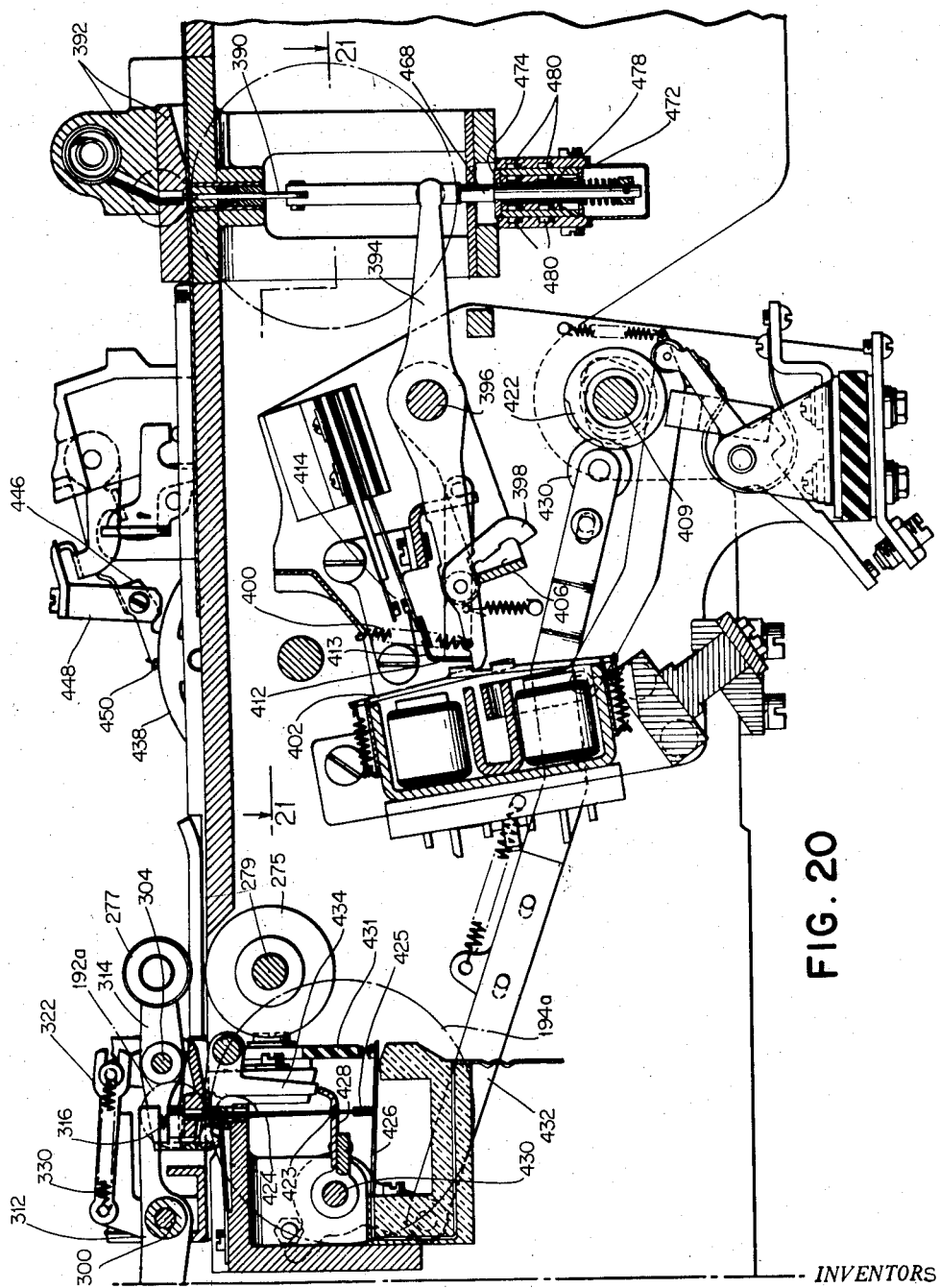
Fig. 20 is a sectional elevation on lines 20—20 of Fig. 1 showing the card reading and punching mechanism.

At the punch line C—C there is provided a row of 12 punches 390 mounted for vertical reciprocation in a die and stripper assembly 392 (see Fig. 20). Each of these punches 390 is provided with a slot adaptable to receive the rounded end of a lever 394 which is mounted freely on a transverse shaft 396. At the other end of this lever, there is pivotally mounted an interposer 398 which is normally urged in a clockwise direction by a spring 400, but which is prevented from rotating by engagement with an armature 402 under control of a magnet 404. Energization of the magnet 404 will effect rocking of the armature 402 to release interposer 398 and allow it to be rocked by spring 400 into engagement with operating bail 406, which bail, as shown in Fig. 22, is also freely mounted on shaft 396 and is operable by the action of a pair of cams 408 acting upon cam followers 410 pivotally mounted on the bail. Another bail 412 is freely mounted at 193 (Fig. 21) and is operable by the rocking of said interposer 398 to cause closing of the contacts 414 by the extension 413 of this bail. The function of these contacts is first to bring about an escapement operation and thus advance the card present at the punch station one column and then to effect a cycle or revolution of operation of the punch shaft 409 on which the cams 408 are fixed. Rotation of these cams will cause oscillation of the bail 406 and, through the engaged interposer 398 and lever 394, will elevate the associated punch 392 through the record card and retract it therefrom. As shown in Fig. 3, there is provided a belt and pulley connection from the constantly running motor to a pulley 416, which pulley is freely mounted on shaft 409 and is connected to the shaft through a well-known type friction clutch (Fig. 21) generally designated 418 under control of a magnet and armature assembly. It is sufficient for the purposes of the present disclosure to state that momentary energization of the clutch magnet 419 will allow the shaft 409 to take a single revolution as driven by the pulley 416 through the friction clutch 418. As shaft 409 and the cams 408, secured thereto, are making this revolution to cause oscillation of the bail 406, and thus reciprocation of the punch through the card, the magnet 404 (Fig. 20) will be deenergized allowing its armature, through the action of the spring 420, to be returned to its original deenergized position to engage the interposer at the end of the punching cycle and restore the interposer to its original position. It should be noted at this point that the control circuits associated with contacts 414 to operate the escape magnets 249 or 255 (Fig. 1), as the case may be, and the punch clutch magnet 419 are so timed that first the card will be advanced under control of the energized escape magnet in the direction desired and after this escapement the punch clutch will be energized to allow perforation of the card in the column which has been advanced to the punch line C—C.

It should also be pointed out at this time that, once an armature 402 is attracted and the corresponding interposer 398 is rotated clockwise by its spring 400, interposer 398 cannot be restored until a punch cycle has been completed during which it was coupled to the punch bail 406. Thus, if during a punch cycle, after bail 406 has begun its rocking counterclockwise, another armature 402 is attracted, releasing its associated interposer, contacts 414 will again be closed. Closing of these contacts will at the end of the punch cycle in progress initiate another escapement and punch cycle. During this subsequent punch cycle the interposer 398, first released, will be coupled to bail 406 and will be restored by its deenergized armature 402 at the end of this cycle. For repetitive punching by the same punch the circuitry is arranged to allow a magnet 404 to be energized on successive cycles to hold the associated armature attracted until the previously pivoted interposer 398 coupled to bail 406 has been moved past the position where engagement with the armature in a deenergized condition usually restores a pivoted interposer. In this manner punching by the same punch can be accomplished on successive cycles without any loss of time.

Card reading mechanism

Concurrently with the punching operation in the column of the card at the punch line, there is a reading operation of a column of a card at the read line. As has been heretofore explained, the cards at the read and the punch lines, respectively, are advanced together in a step-by-step manner past these lines. As has also been explained, with reference to the forward punching operation, when any column of a card is being punched at the punch station the next higher column of the other card is being read at the reading station. During reverse punching operation, while a column of the card at the punch station is being punched, the next lower column of the card at the read station is being read. Referring to Fig. 20 the read unit is operated under control at a cam 422, secured to the punch shaft 409, and thus the read unit is operated in conjunction with the punching unit. The reading mechanism comprises a row of 12 double pins 424 mounted along the read line E—E (see also Fig. 4). These pins are normally urged in an upward direction by the spring contacts 426 bearing against an insulated button 425 provided at the lower extremity of each set of pins. In the normal condition a slotted bail 428 engages against shoulder portions 423 on the pins 424 to hold the pins in their lowered condition against the urging of the contact springs 426. Bail 428 is mounted on shaft 430 and has pivotally connected to it a link 432 urged toward the right, as viewed in Fig. 20, by a spring 434. This link 432 is prevented from moving to the right by the action of cam 422, secured to the punch shaft 409, which bears against a roller 430, secured to the end of the link. Rotation of the punch shaft during a punch cycle, and thus of the cam 422 attached thereto, allows the spring 434 to move the suitably guided link 432 to the right and thus raise the bail 428 away from the shoulder 423 on the pins. Thus the pins 424 will, under the action of the contact springs 426, rise until they either abut against a card present at the reading station or pass through a perforation in the column coincident with that particular set of pins. Where a pin, or set of pins, has been allowed to pass through a perforation on a card, the associated spring contact 426 will be allowed to close against the common bail 431 and thus complete an electrical circuit indicative of the perforation present in the card in that column. Continued rotation of the cam 422 will restore the parts to the original condition, as shown in Fig. 20, wherein all the contacts 424 are removed from the common contact bail 431. Since the operation of the read unit is under the control of the cam 422 on punch shaft 409, this reading action will occur after the escapement mechanism under the control of the contacts 414 has escaped the card at the read station in conjunction with the card at that punch station one column either in the forward or reverse direction, as the case may be. A card lever 434 pivotally mounted on a stud and normally biased to a position shown in Fig. 20, is located in the read station to engage the bail 428 and thus prevent pivoting of the bail unless there is a card present at the read station. Insertion of a card at the read station will pivot the card lever in a counterclockwise direction and thus free the bail 428 from the card lever so that it may follow the action of the link 432 when it is allowed to move to the right by the rotation of the cam 422. Suitable electrical circuits are provided from the common terminal bail 431 and the individual pairs of spring contacts 426, which circuits are effective to control other operations of the machine according to the information sensed during the reading cycle. A pair of contacts 433 (Fig. 1) are operable by the left end of spring bail 110a to indicate the presence of a card at the read station.

Figure 23:
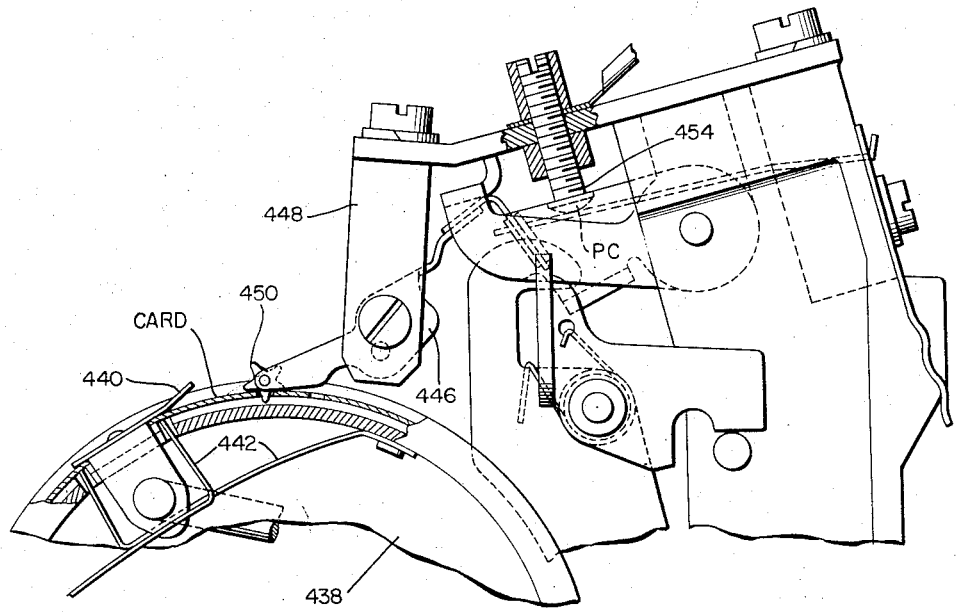
Fig. 23 is a fragmentary view of the program drum and star wheel sensing mechanism.

*Program drum.*—Referring to Fig. 3, the shaft 436, which is part of the gear train controlled by the escapement mechanism, extends towards the rear of the machine and has removably mounted thereto a so-called program drum 438. This drum is arranged so that a standard size record card may be wrapped around it and held in place by the action of the blade springs 442 urging the card against the plate 440, as shown in Fig. 23. Extending across the top of the drum (see also Fig. 1) is a row of sensing devices generally designated 444. The structure is such that as the drum and card wrapped thereon are moved in a step-by-step manner, under control of the escapement mechanism, the card column of the program card coincident with the row of sensing devices will correspond to the column of the card at the read station which is coincident with the read line E—E. It should be noted that the circumference of the drum is somewhat greater than the length of the program card. Thus, to completely rotate the drum, an advance of 89 steps is needed. The advance from column 80 back to column 1 takes place usually as data cards are being advanced from one position in the machine to the next, that is, for example, from the punch to the read station.

For each of the 12 rows of perforating positions in the card there is provided a lever 446 (see Fig. 23), pivoted to a stationary block 448. Each lever has pivotally connected thereto a five point start wheel 450 which normally bears against the surface of the card on the drum under the influence of the contact spring PC, which engages the opposite end of the lever 448 and biases the lever in a counterclockwise direction. When there is a perforation present in any of the 12 rows present in the column at the sensing station, one of the teeth of the star wheel for that row will enter into the perforation as shown in Fig. 23 allowing the lever 446 to be pivoted further in a counterclockwise direction by the action of the contact spring PC, which spring will now be allowed to abut against the contact terminal 454. It should be noted that where there are perforations in the same row in successive card columns the corresponding star wheel 450 will drop into the first perforation and allow contact PC to close against the terminal 454. The wheel will then roll into the next perforation without elevating the pivot of the wheel and consequently the contact PC will remain against terminal 454 for the extent that there is a succession of adjacent perforations.

Figure 28:
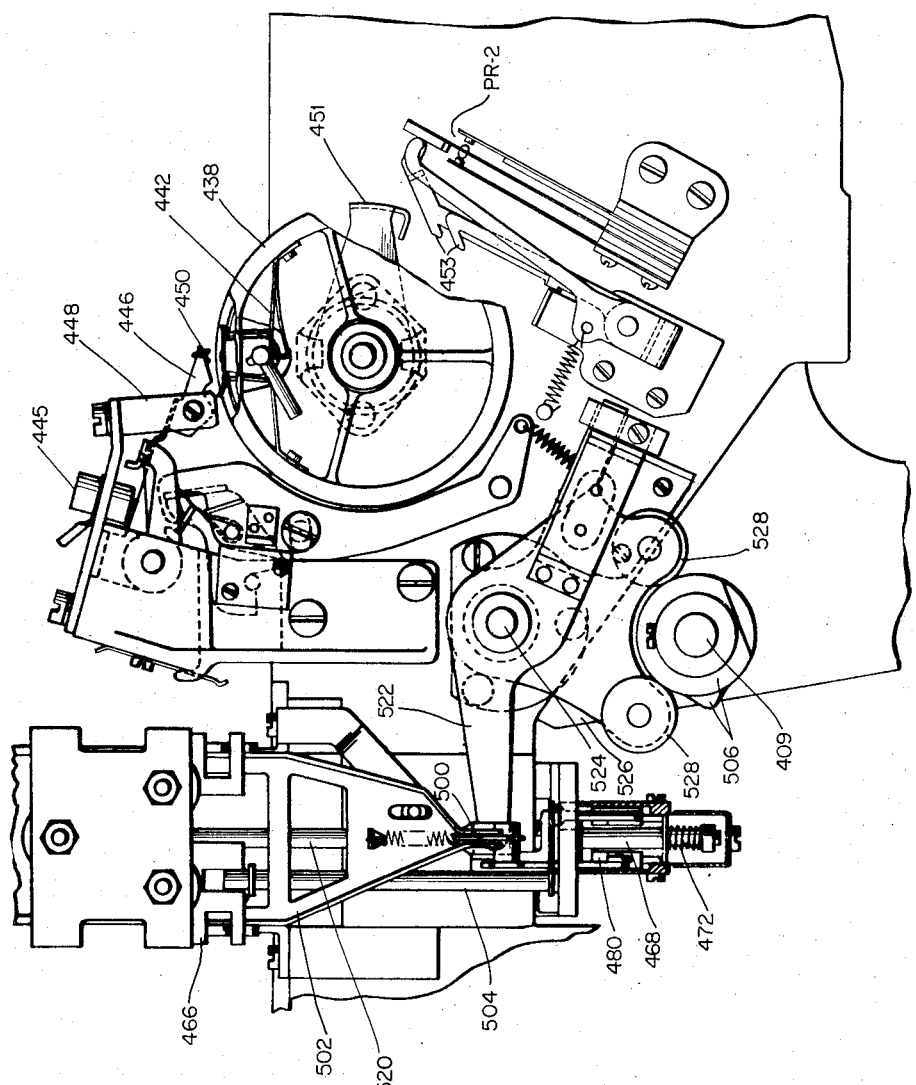
Fig. 28 is an outside view taken from the rear of the machine showing the location of the printing and program units.

This card which is wrapped around the drum 438 is referred to as the program card (Fig. 30) and is provided with perforations in rows and columns so as to close the PC contacts at predetermined positions of the cards passing through the machine. These contacts when closed will complete circuits for controlling the various functional operations of the machines as will be particularly pointed out in connection with the description of the circuit diagram. As shown in Fig. 28, a camming surface 451 is integral with the drum 438 and as it rotates engages a pair of arms 453 to operate program cam contacts PR1 and PR2.

Printing mechanism

Figure 25:
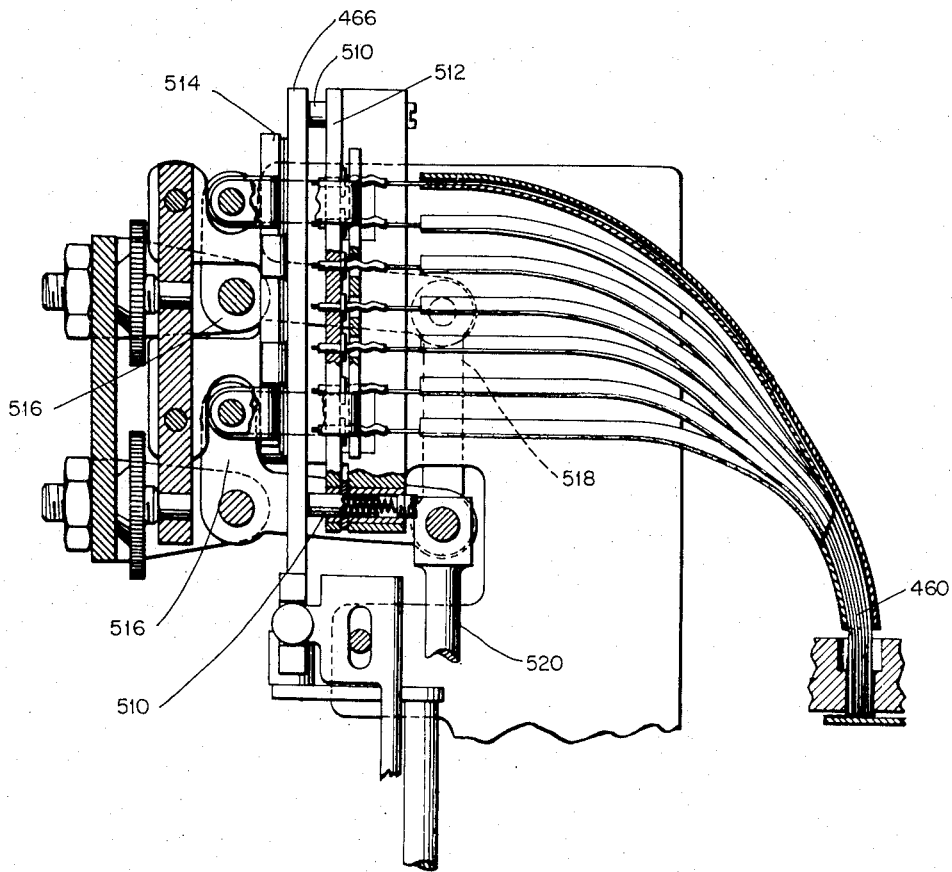
Fig. 25 is an enlarged detail showing the relationship between the print code plate and print wires.
Figure 26:
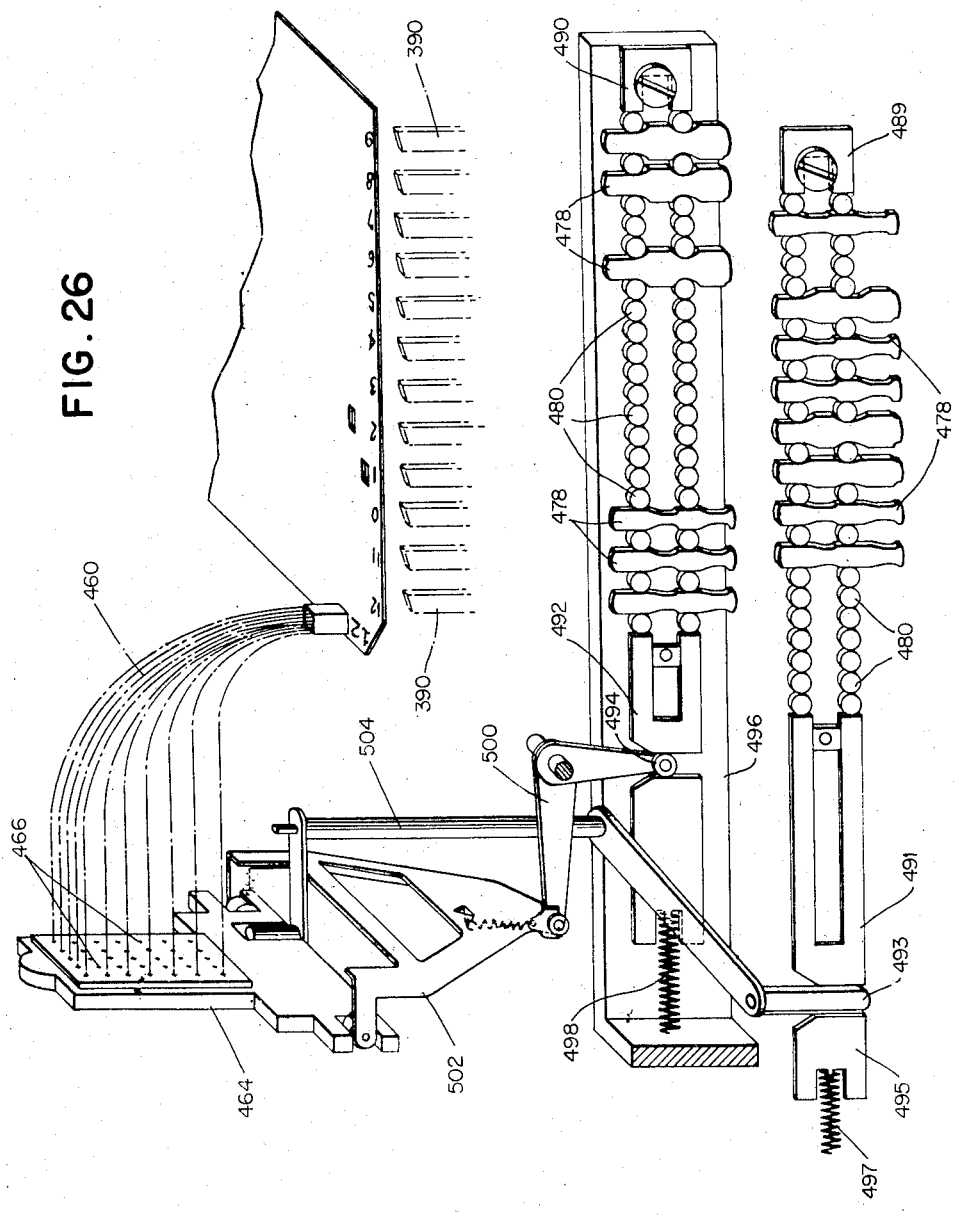
Fig. 26 is a diagrammatic view showing the manner of positioning the print code plate.
Figure 27:
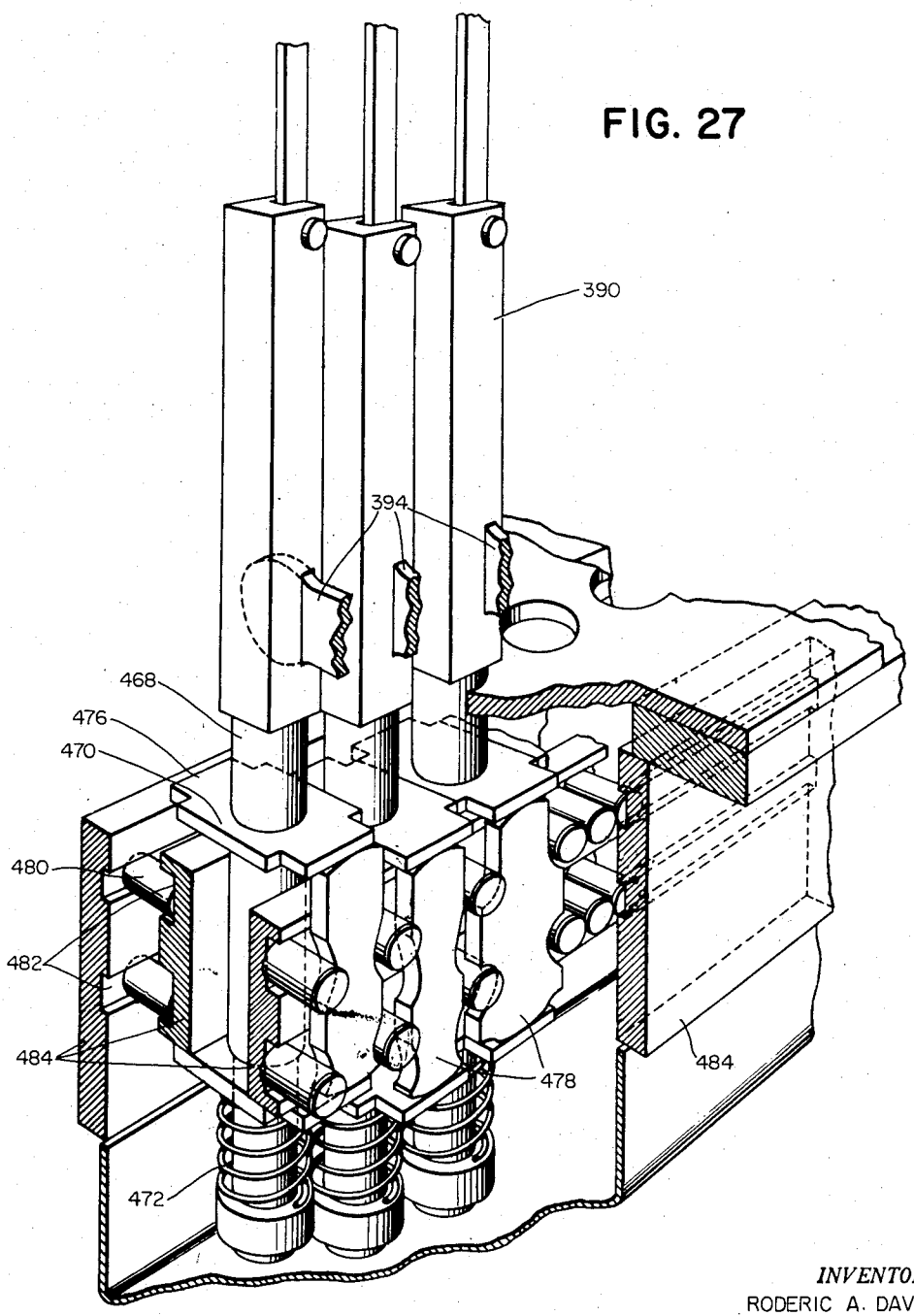
Fig. 27 is an enlarged detail view showing the punch stems and print control mechanism associated therewith.

Located on the punch line C—C, and arranged in a rectangular pattern, is a group of individual wires 460, the ends of which constitute a so-called wire printing device (see Fig. 25). Between the ends of these wires 460 and the record card is an inked ribbon through which impressions are made along the upper margin of the card, as illustrated in Fig. 26. There is also provided a positionable code plate 464 having selective projections 466 on its face, which plate 464 is operable during a punching cycle to actuate certain of the wires 460 in a pattern of the character corresponding to the hole or combination of holes punched during that cycle. Referring to Figs. 20 and 27, each of the punches 390 has a downwardly extending stem 468 on which is slideably mounted an interposer yoke 470 which is urged upwardly by springs 472 against shoulder 474 provided on the punch stems 468. On either side of these interposer yokes 470, there are provided flanges 476, between which are positioned individual interposers 478, which interposers will reciprocate with the yoke as it follows the elevation and retraction of the punch under control of the springs 472. The interposers 478 on adjacent stems 468 are separated by rollers 480 which are free to move in a lateral direction in slots 482 provided in the pairs of opposing plates 484. Referring to Fig. 26, on one side of the interposer yoke, rollers 480 farthest to the right abut against a fixed stop 490, and the ones farthest to the left abut against a slide 492, which through a pin 494 and another slide 496 is urged to the right by spring 498. The action of the spring 498 is thus transmitted to urge all of the rollers 480 to the right against the stop 490. On the opposite side of the interposer yoke a similar system is provided comprising a spring 497, slide 495, pin 493, and slide 491, to urge all of the rollers 480 on that side against another stop 489 situated at the extreme right end of the system. As any of the individual punches 390 or combination of punches is reciprocated during a punching cycle, the associated interposers 478 will be raised and thus the slides 491 and 492, under control of the springs 497 and 498, will move either to the left or to the right according to the camming surface provided on the interposers 478 associated with the actuated punches. The lateral displacement of slide 492 is transmitted through a linkage comprising roller 494, bell crank 500, and plate 502, to vertically position the coding plate 464 in an upward or downward direction according to which direction the slide 492 was displaced. The lateral displacement of slide 493 is transmitted through a pin 493, lever and rod assembly 504 to position the coding plate either to the left or to the right in a horizontal direction according to the direction of the displacement of the slide 491. The code plate 464 is thus positioned both horizontally and vertically during a punching cycle in an amount and direction governed by the camming surfaces on the interposers 478 associated with the punches actuated on that cycle.

After the code plate has been positioned it is operated under control of complementary cams 506 (Fig. 28), secured to punch shaft 409, to actuate aligned wires to effect printing on the card. A pair of spring-urged plungers 510 (Fig. 25), in a fixed plate 512, normally urge the coding plate 466 against an actuating plate 514. The actuating plate 514 has pin connections with a pair of parallel bell crank levers 516, joined together with link 518, from which a rod 520 extends to connect with a lever 522 (Fig. 28) which is pivoted at 524. Lever 522 is connected to another lever 526, which has affixed thereto a pair of rollers 528 which cooperate with a pair of complementary cams 506 secured on the punch shaft 409, which shaft, as has been heretofore described, carries the cams for effecting punching. The code plate 466 will thus be moved to the right, as viewed in Fig. 25, and according to how it has been positioned will effect abutment between certain of its projections and opposing wires 460 to cause the wires thus actuated to print a pattern of the desired character on the upper margin of the card.

Combination keyboard

The keyboard, generally designated 529, shown in Fig. 29, is a separate mechanical unit and is connected to the punch through electrical connections. Individual keys for all of the letters of the alphabet are provided, some of which as shown within the outline 530 are also used to represent the digits 1 to 9. A key designated NUM when operated will render the machine responsive to the operation of the numeric section of the keyboard and to the upper special characters shown on others of the key caps. A key designated "ALPHA" when operated will render the machine responsive to the alphabetic keys. There are also provided several functional keys such as the card feed key, which may be utilized to initiate a card feed cycle through control circuits later to be described. Certain of the keys, such as the duplicating key and the back space key, operate to close contacts directly through their key stems. As shown in Fig. 31 others of the keys on the keyboard when depressed will rock a bell crank lever 532 to draw a connecting link 534 toward the left. There is associated with each of the links 534 a vertical slide 536, which slides are urged in a downward direction by springs 538 but are prevented from moving in this direction when the keys are in the normal position. Referring to Figs. 31a, 31b and 31c, each link 534 has a lateral extension 540 normally lying in a notch 542 provided in a latch 544 pivotally connected to each of the slides. The latch 544 also has a shoulder 546, which in this condition rests upon a stationary cross bar 548. The engagement of this shoulder with the stationary cross bar, as shown in Fig. 31a, prevents the downward movement of the latch and thus of the pivotally connected slide. Operation of the key will, as shown in Fig. 31b, shift the related link to the left and through engagement of the extension 540 in the notch in the latch will pivot the latch in a counterclockwise direction and thus move the shoulder 546 away from the fixed cross bar 548 to allow the latch and connected slide to be then moved in a downward direction under the action of the compression spring 538. Each of the slides 536 is provided with a series of notches 550 into which extend the fingers 552 of a set of 14 plates 554 (Fig. 32), which plates are integral with transverse rods 556 mounted for oscillation in the side plates 560 of the keyboard unit. Each of these rods has one or more extending fingers 552 which are arranged to cooperate with certain of the vertical slides so that depression of a key will effect oscillation of a rod or rods which have a finger extension which cooperates with notches in the slide associated with the depressed key.

Figure 32:
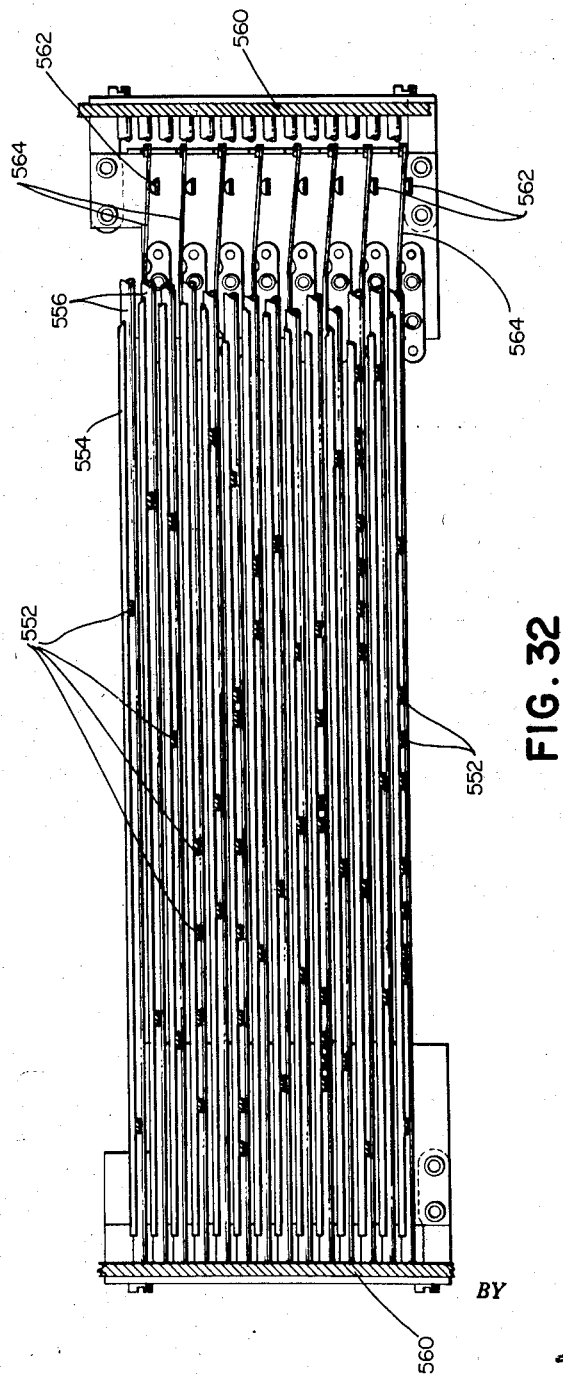
Fig. 32 is a section taken on lines 32—32 of Fig. 31 showing character contact operating mechanism of the control keyboard.

Referring to Fig. 32, each plate 554 on related rods 556 has a single rearwardly extending finger 562, and these are arranged in two vertical rows near the extremities of the rods with alternate fingers at opposite ends for more convenient spacing. Each of these fingers 562 extends beneath the insulated portion of a contact blade 564 normally out of contact with a common conductor 566 (see Fig. 31a). Oscillation of the rod and plate will, through the finger 562, effect closing of the contact 564 against the common conductor 566. Accordingly, these contacts 564 are closed in combinations corresponding to the combinational arrangement of fingers 552 associated with the various vertical slides operable by the individual keys on the keyboard.

Located beneath each of a number of slides 536 (Fig. 31a) is a pair of contacts 570 which will be closed by the related slide when that slide is depressed, and which contacts will remain closed until the slides are restored to their normal position. These contacts 570 are referred to as slide contacts and the contacts 564, which were operable by the oscillation of the rods 556, will be referred to as bail contacts.

Restoration of the slides 536 is effected by a pair of magnets 572 (Fig. 31), whose armatures 574 when attracted will raise a bail 575 into abutment with extended portions 576 of the latches 544, and concurrently raise and rotate the latches to their original latched position. There is also provided on this bail an extension 577 which is operable when the bail is elevated to open a pair of normally closed contacts 578.

Storage keyboard

Figure 33:
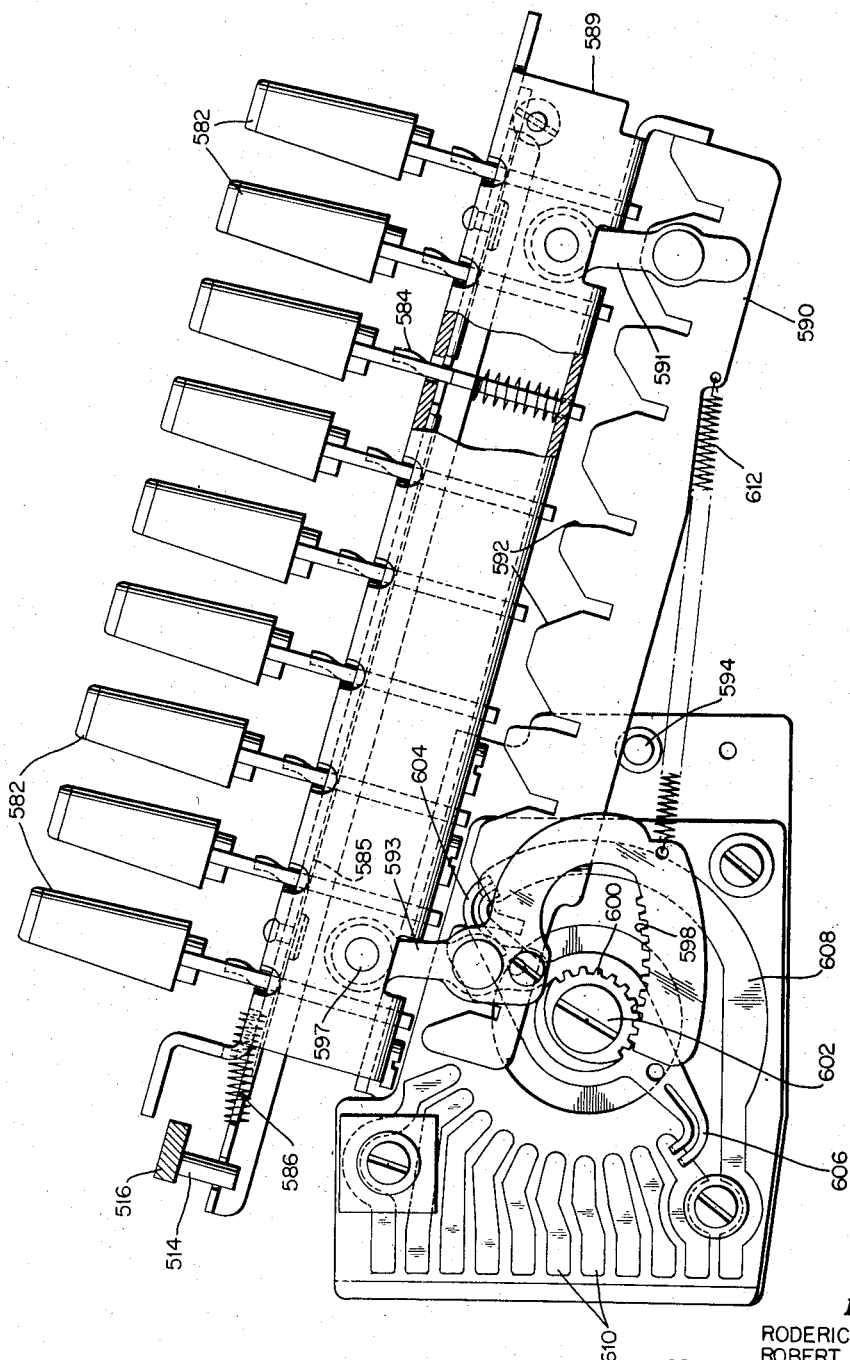
Fig. 33 is a detail view of one position of the keyboard storage mechanism.

The storage keyboard generally designated 580 in Fig. 34 comprises 16 positions of keyboard storage. Referring to Fig. 33, each position of storage includes 9 entry keys 582 indicative of the digits 1 through 9. A camming surface 584 provided on each key cooperates as it is depressed with slots in a slidable bail 585 to move the bail to the right against the action of the compression spring 586, which movement will release any key previously depressed and locked down by the bail. Upon complete depression of a key the camming surface 584 will be below the bail 585 allowing it to be returned to the left by the spring 586 to lock the key in the depressed position. The lower extremity of a key stem as it is depressed will bear against one of a series of cam surfaces 592 on a set up bail 590 pivotally connected to frame 589 by arms 591 and 593 and guided for longitudinal movement by stud 594. Thus depression of a key will effect movement of the bail either to the left or right according to the camming surface 592 opposing the depressed key and the position of the bail 590 before depression. Integral with arm 593 is a sector 596 which will be oscillated about pivot 597 by the longitudinal movement of the bail 590. Gear teeth 598 on the sector 596 mesh with a gear segment 600 mounted on stud 602. Segment 600 has integral therewith a pair of contact fingers 604 and 606. Finger 604 always contacts a common strip 608, and finger 606 is positionable to contact one of a group of 10 emitter segments 610 representative of the digits 0 through 9. In the normal position shown with no key depressed the spring 612 will bias the mechanism to the position shown with fingers 604 and 606 completing a circuit from the "0" emitter segment to the common strip 608. Circuits will be completed between others of the segments 610 and the common strip 608 according to which one of the keys 582 is depressed, the camming surface 592 presented to each key stem being effective to cause movement of the set up bail 590 and thus of the sector 598 and segment 600 to a different position. All of the positions of keyboard storage can be restored together by arms 514 integral with a transverse restoring bail 516 suitably mounted for rocking and operable by a pair of restoring magnets (not shown), which magnets may be energized to effect restoration as will be later explained with reference to the circuit diagram.

There are also provided on the storage keyboard a group of functional control keys 620 (Fig. 34), which are operable to effect closing of associated electrical contacts to initiate operations later described with reference to the circuit diagram.

Problem

Referring to Fig. 34, there is diagrammatically illustrated the functional operation of the machine with reference to a particular problem. The problem referred to is a common inventory problem in which record cards are used to indicate stock transactions in various inventory items. It should be understood that the discussion of the invention with reference to this problem is only for the purposes of the present disclosure and is in no way meant to limit the utility of the invention to problems of this specific nature. In the tub file shown in the diagrammatic illustration, there are kept individual records each relating to a particular item of stock and each containing pertinent information concerning the present stock on hand. In each of these cards (see Fig. 37) there is recorded the following information. The quantity of the item "On Hand"; the the quantity which has been ordered to replenish the supply on hand which quantity is entitled "Due In"; the quantity which has been ordered from stock but has not been shipped which quantity is entitled "Due Out"; the quantity representing the desired "Minimum Stock Level"; and the quantity representing "Accumulated Issue" which indicates the number of items shipped during a particular period. There are also provided code recordings under a title "Part Number" which number is representative of a particular item of stock to which the above quantities refer. Generally speaking, the following are the steps of operation for this particular problem:

Step 1.—Blank cards are placed in the feed magazine 10.

Step 2.—A program card (Fig. 30) is locked on the program drum 438. This program card contains recordings of 12, 11, 0, 4 and 5 in selected columns which control operation of the machine during the problem.

Step 3.—The release key "REL" on the combination keyboard is depressed to initiate a card feed cycle during which:

(a) The forward escape magnet 249 is energized to advance the program drum and card to a position in which the star wheels 450 (Fig. 1) are coincident with the first column of the program card.

(b) A card is fed from the magazine 10 to the punch pre-registration position A (Fig. 2).

Step 4.—Information on the transaction document is keyed into the storage keyboard.

(a) In positions 16 and 17, and 18 the quantity of the transaction is entered.

(b) In positions 9, 10 and 11 the code number representing the company with whom the transaction is made is entered.

(c) In positions 6, 7 and 8 the order number of the transaction is entered.

(d) In position 2 a transaction code indicative of the type of transaction is entered. This code number is utilized to control the operation of the machine and the transaction code in the present problem is "3" which code is indicative of a transaction by which a back order previously received is filled and the quantity of the item ordered is shipped from stock presently on hand.

Step 5.—The old balance card representing the particular item of the transaction is placed in a position just before the read station under the roller 277.

Step 6.—The start key 620 on the storage keyboard is depressed after which the following operation of the machine is automatic.

(a) A second feed cycle is initiated during which magnets 78 (Fig. 5) are energized to prevent feeding of a second card from the magazine 10 to the punch pre-registration position A.

(b) The blank card in the punch pre-registration station is advanced to the position BB with column 2 coincident with the punch line C—C.

23

(c) The old balance card is advanced by the rollers 275 and 277 (Fig. 1) to the read station with column 1 coincident with the read line E—E.

Step 7.—The forward escape magnet 249 (Fig. 1) is energized and the old balance card and blank card following are continuously advanced past the read and punch lines respectively to a point determined by the "4" punches in the program card at which time the solenoid 240 is energized and the control circuitry to the reverse escape magnet 255 is actuated in anticipation of reverse operation under control of the "5" punches in the program card.

Step 8.—The cards are then stepped in reverse direction past the punch and read lines respectively at which time the functions listed below are performed under various fields of information in the card. The fields such as "Accumulated Issue" are defined by the 12 punches in the program card. The functions performed are controlled (A9) by the transaction code which was entered into position 2 of the storage keyboard.

(a) The part number is read (A2) from the old balance card and punched into the blank card at the punch station column by column.

(b) The quantity of the transaction is read (A3), position by position from position 16, 17 and 18 of the storage keyboard into a single position relay accumulator in conjunction with the reading (A4) of the quantity of the "Accumulated Issue" field column by column from the old balance card into the accumulator and the sum of the two are punched (A5), column by column as accumulated into the card at the punching station.

(c) The "Minimum Stock Level" field is read (A2) from the old balance card and punched column by column into the card at the punch station. The quantity in this field is also read and stored (A6) in a relay storage unit.

(d) The "Due Out" field is combined with the quantity of the transaction in a similar manner as was the "Accumulated Issue" field except that in this instance the relay accumulator is effective to compute the difference between the two quantities and cause the difference to be developed column by column and punched as it is developed in the card at the punch station.

(e) The 'Due In" field is duplicated in the same manner as was the part number.

(f) The "On Hand" field is combined with the quantity of the transaction in the same manner as was the "Due Out" field and the difference is punched in the card at the punch station. As this is occurring, the quantity of the "On Hand" field is also read (A7) into the relay comparing unit and compared with the stored minimum stock level column by column to determine if as a result of the transaction, the on hand quantity will be brought below the desired minimum stock level and to control (A8) the error stop and selective stacker circuits accordingly.

(g) After the operation for the last column of the "On Hand" field which is column 6 in the present example has been completed, the reverse solenoid 240 will be deenergized and the cards will then be skipped together in advance direction under control of the forward escape magnet 249 completely past the read and punch lines, respectively. It should be noted that the card punched in the above-described operation is termed a new balance card in that it represents the stock condition of the particular item after completion of the present transaction.

Step 9.—At this point, a third card feed cycle is initiated during which the following operations take place.

(a) The old balance card is advanced into the normal stacker position 14.

(b) The new balance card just punched is advanced to the read station with column 1 coincident with the read line E—E.

(c) A second card is fed from the magazine 10 to the punch pre-registration position A.

24

Step 10.—A fourth card feed cycle is then initiated during which:

(a) The card is advanced from the punch pre-registration position A to the punch station at position B with column 0 of the card coincident with the punch line C—C.

(b) A third card is advanced from the magazine 10 to the punch pre-registration position A.

Step 11.—The new balance card is then advanced past the read station and the next fed card which may be, termed a transmittal card, is advanced past the punch station during which time the information in the new balance card is duplicated (A2) into the transmittal balance card. In this instance the fields of the new balance card to be duplicated are defined by the 11 punches in the program card. After duplication is completed, the cards are then skipped completely past the punch and read stations.

Step 12.—A fifth card feed cycle is then initiated during which:

(a) The card present at the punch pre-registration position A is advanced to the punch station at position B with column 0 of that card coincident with the punch line C—C, and another card is fed from the magazine 10 to the punch pre-registration position A.

(b) The transmittal card is advanced to the read station at position G with column 1 coincident with the read line E—E.

(c) The new balance card is advanced to the selective stacker position 12 and the machine operation will be interrupted until this card is manually removed.

Step 13.—Removal of the new balance card allows the operation of the machine to continue, which continued operation will consist of the advancing of the transmittal card just punched past the read station in conjunction with the advance of the next following record card past the punch station. This card being advanced past the punch station is termed a transaction card and information indicative of the transaction itself is read both from (A2), the transmittal card and from (A10), the storage keyboard unit and punched into fields of this card which fields are defined by zero punches in the program card.

Step 14.—After completion of this punching the transmittal and transaction cards are successively advanced to the normal stacker position 14. The blank card present in the punch pre-registration position A is not advanced to the punching line so that the machine will be left in the condition described upon completion of Step 3 above anticipatory of the recording of another transaction.

*Circuit Diagram*

Figure 41A:
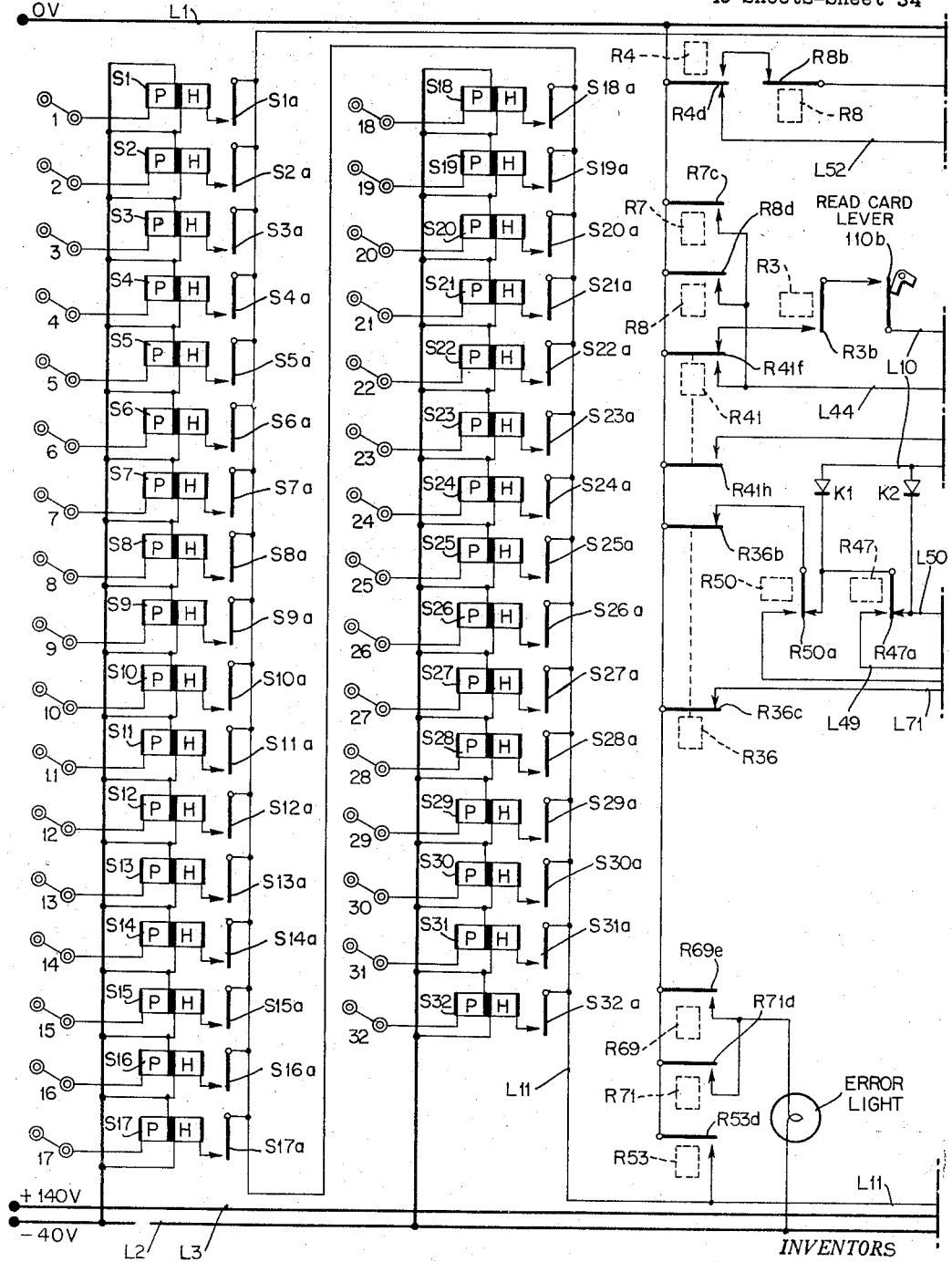

Referring to the circuit diagram shown in Figs. 41a, 41b, 41c, 41d, 41e, 41f, 41g, 41h, 41j, 41k, 41m, 41n, 41p, 41r, 41s and 41t there are provided three power lines L1, L2 and L3, which from a suitable source are maintained, as indicated in Fig. 41a, at potentials of approximately 0 minus 40 and plus 140 volts respectively. In this condition with these potentials on the power lines, and before any machine operation is initiated, all of the vacuum tubes T1 through T16 (Figs. 41g and 41j), except tube T3 are in the non-conductive state and all of the magnets except the reverse escape magnet 255 which is in the plate circuit of tube T3 are in the deenergized condition. It should be noted that the cathodes of all the tubes are connected to the 0 volt line L1. The circuit to render tube T3 conductive extends in Fig. 41c from the 0 potential line L1 through relay contacts R8c (conductor L5 to Fig. 41f), R32d and, (L72 to Fig. 41g) R58d to the grid of tube T3. To energize the reverse escape magnet 255 a circuit is completed from the cathode to tube T3 to the plate of the tube and thence through the coil 255, contacts R58f and a resistor to the plus 140 volt line L3. The energization of the reverse escape magnet is to prevent its armature 253 (Fig. 11b) from dragging on the escape wheel 252 during the following operations of the machine.

Referring both to the circuit diagram and the steps outlined above, the operation of the machine in conjunction with the problem stated will now be explained in detail. After cards have been placed in the magazine 10 and a program card locked on drum 438, as outlined in Steps 1 and 2, Step 3 is initiated by the depression of the release key 624 on the combination keyboard (Fig. 29).

Figure 41B:
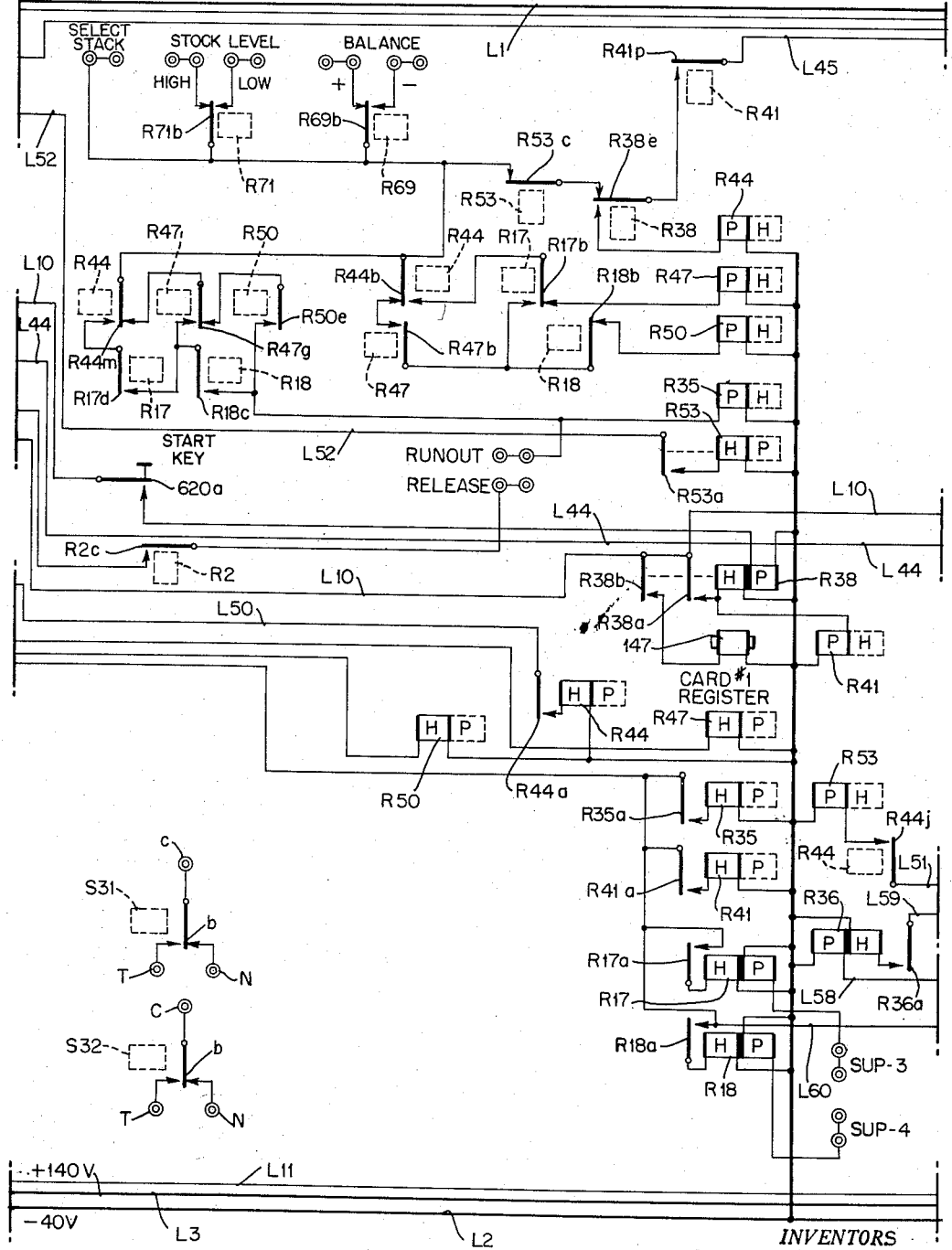
Figure 41C:
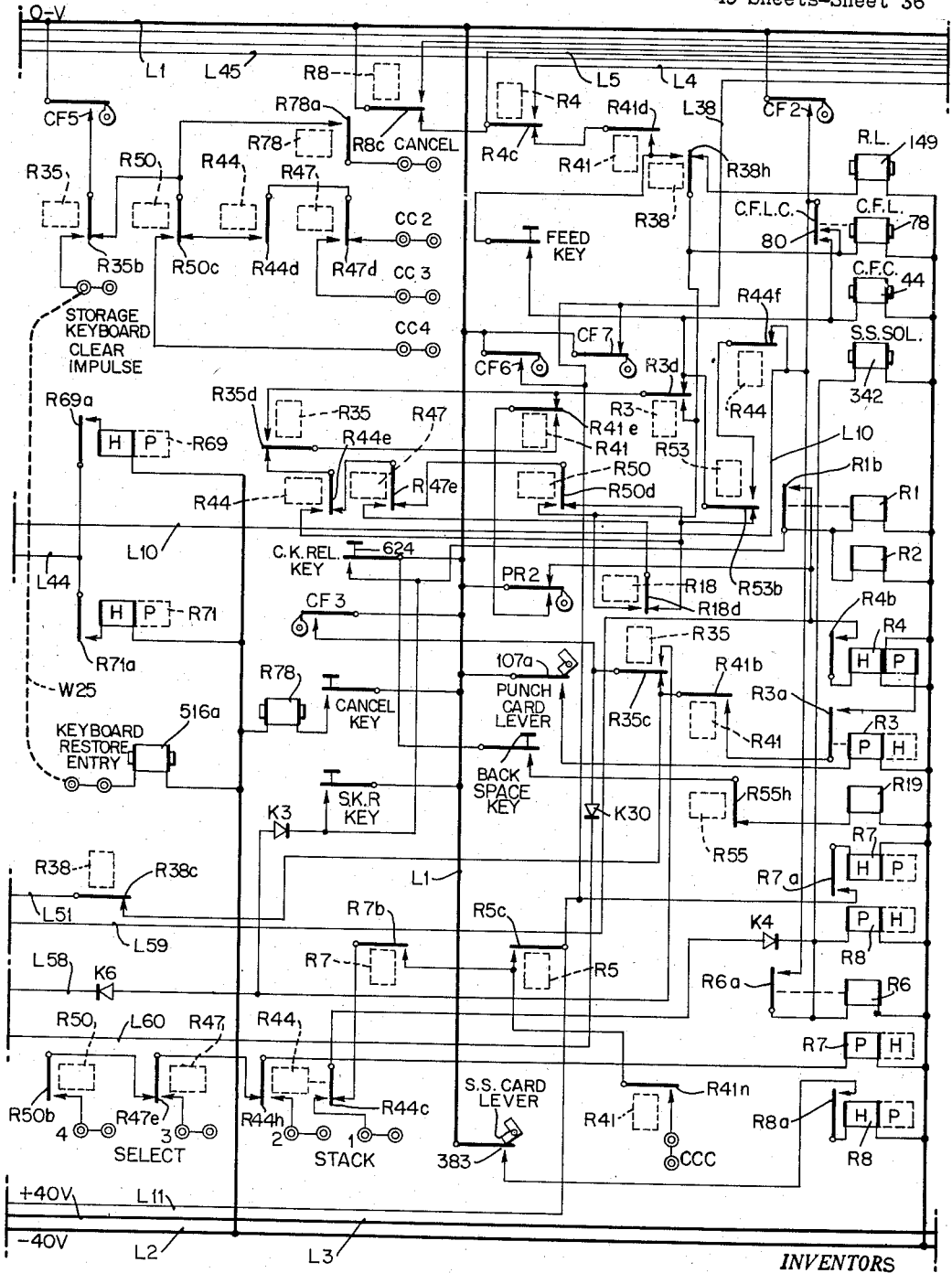

*Step 3.*—(*a*) In order to advance the program drum 438 to column 1 it is necessary to pick the forward escape magnet 249 and hold it energized until the program drum has been rotated to this point. Referring to Fig. 41c depression of the release key 624 effects closing of the associated contacts to complete a circuit from line L1 through the release key contacts, to and through the coils of relays R1 and R2 to line L2. Relays R1 and R2 are held energized through the transferred R1b contacts and program cam contacts PR2 in the position shown maintaining a circuit to line L1. The closing of the contacts R1c completes a circuit from line L1 (Fig. 41c), through contacts R8c (L5 to Fig. 41f), R1c transferred, R58b and R32h (L6 to Fig. 41j) to the grid of tube T11 to render that tube conductive and thus energize and hold relay R25 in the plate circuit of tube T11.

Energization of relays R1 and R25 will cause a circuit to be completed to the grid of tube T2 from the zero potential line L1 to render the tube conductive and thus allow energization of the forward escape magnet 249 which is in the plate circuit of tube T2. The circuit to render tube T2 conductive extends as above from line L1 to and through the D32h contacts (Fig. 41f) and thence through contacts R25d transferred, R24c, R22c (L8 to Fig. 41g), R32e and R58c to the grid of tube T2. The forward escape magnet 249 is then energized by a circuit extending from the cathode of tube T2 to the plate and thence through coil 249, relay contacts R58e and cam contacts P1 to the plus 140 volt line L3.

The program drum 438 and attached program card will be advanced as long as the forward escape magnet is energized. The holding circuit for relay R1 is completed as has been heretofore explained through the program cam contacts PR2 (Fig. 41c), which contacts are transferred as the program drum is advanced past the 81st column of the program card. It is thus necessary to establish another hold circuit for relay R25 and the forward escape magnet which will keep these coils energized until the program card has been advanced to column 1. This circuit is established at a point immediately after the program drum has been advanced past column 80 at which time program cam contacts PR1 (Fig. 41h), are closed. A circuit is then completed from the zero potential line L1 through program cam contacts PR1 transferred through rectifier K15, contacts R24b, R54b and (L47 to Fig. 41j) rectifier K10 to the grid of tube T11. In this manner tube T11 is maintained in the conductive state and thus relay R25 remains energized under control of program cam contacts PR1. A parallel circuit extends from the terminal of rectifier K10 (Fig. 41j), up and to the left along conductor L6 and through contacts R25d transferred (Fig. 41f) R24c, R22c, R32e (L8 to Fig. 41g), R32e and R58c to the grid of tube T2 to maintain this tube conductive and thus hold forward escape magnet 249 energized. This circuit is maintained until the program card has been advanced past the 88th column at which time program cam contact PR1 returns to its original position as shown on the circuit diagram and thus relay R25 and the forward escape magnet are deenergized which will allow the armature 251 (Fig. 8) associated with the forward escape magnet 249 to engage the forward escape wheel 250 to end escapement with the program card in column 1, that is with the star wheels 450 coincident with column 1 of the program card.

Figure 41D:
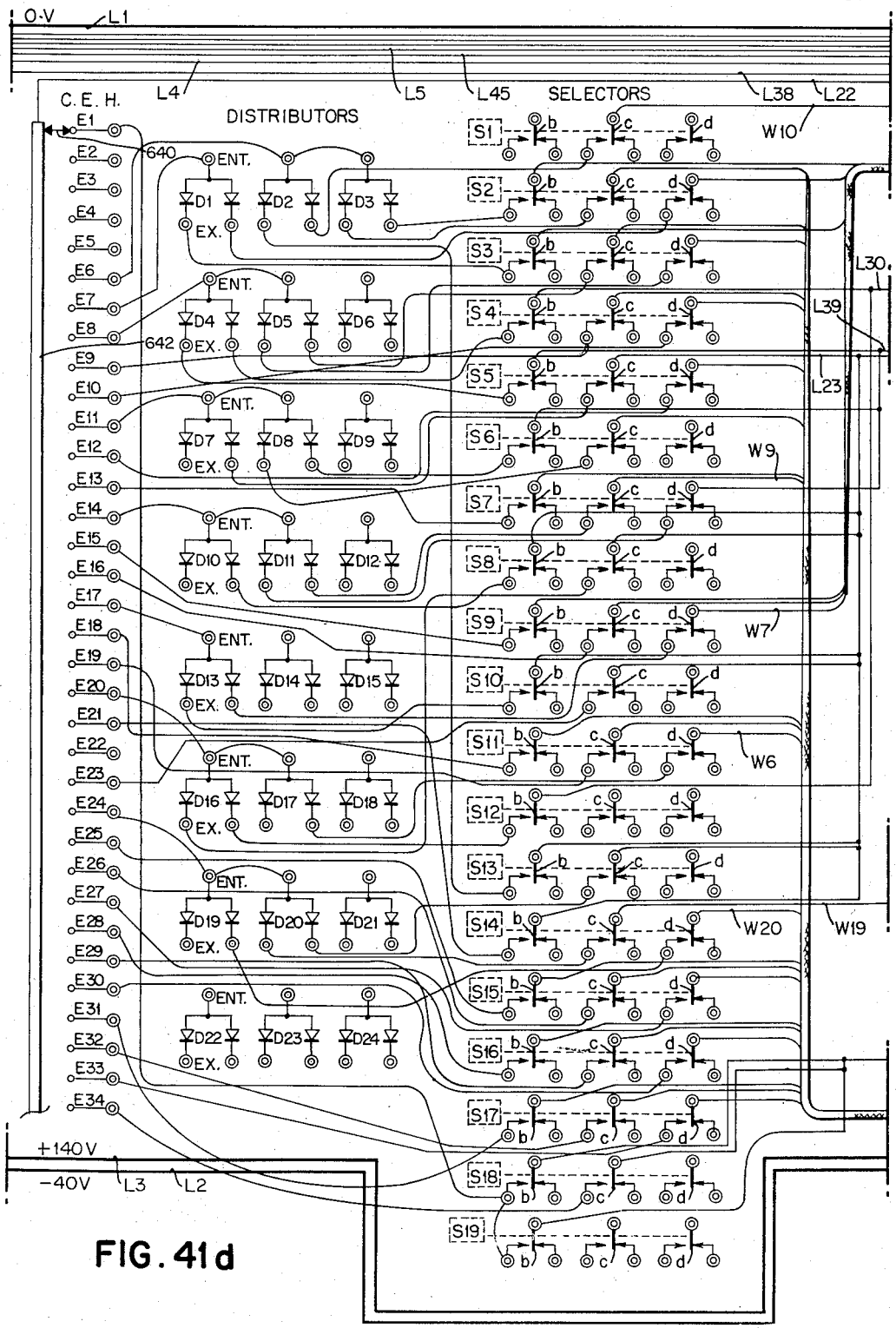

It should be noted incidental to the above operation that a circuit parallel to that which renders tube T2 conductive extends from contacts R32c (Fig. 41g), through conductor L7 to render tube T4 conductive and thus effect energization of relay R9 which is in the plate circuit of tube T4. A hold coil for relay R9 in series with the transferred R9a contacts is in the plate circuit of tube T5 which will be maintained in a conductive state by a circuit which tube proceeds from line L1 (Fig. 41c) through contacts R8c (L5 to Fig. 41f), R25f transferred and conductor L9 to the grid of tube T5 (Fig. 41g).

(*b*) In order to feed a card from the magazine 10 to the punch pre-registration position A it is necessary to energize the card feed clutch magnet 44 (Fig. 4a) and thus enable shaft 30 to take a single revolution for what has been termed a card feed cycle. The circuit to energize the card feed clutch magnet 44 is established when the program cam contact PR2 is transferred as the program card is advanced past the 81st column. The transferring of the program cam contact PR2 (Fig. 41c) completes a circuit from the zero potential line L1 through program cam contact PR2, relay contacts R41e and R3d, and thence through the clutch magnet 44 to line L2 which is maintained at a potential of minus 40 volts. The card feed clutch magnet 44 is only momentarily energized, that is only as long as program cam contact PR2 is in the transferred condition which is from shortly after column 81 to shortly before column 1 of the program drum advance. Thus a single card feed cycle will be completed at which time the card feed clutch magnet will again latch up as heretofore explained. A cam shaft 114a (Fig. 3) carrying a group of cams generally designated C. F. cams is under the control of the card feed clutch magnet and makes one complete revolution for each card feed cycle. The timing of the individual C. F. cams is illustrated in the timing diagram of Fig. 36.

As card is fed from the magazine 10 into the position A of Fig. 2, the card lever 107 (Fig. 7) will be depressed to cause closing of the card lever contacts 107a. The closing of the card lever contacts will establish a circuit from the zero potential line L1 (Fig. 41c) through the contacts 107a to and through the coil of relay R3 to line L2. Relay R3 will remain in its energized condition as long as the punch card lever contacts are kept in the closed condition by a card present in the punch bed.

*Steps 4 and 5.*—At this time with the first blank card advanced to the position A, the transaction information is keyed into the keyboard storage unit (Fig. 34) and the old balance card is placed before the read station under the roller 277 as described in the general outline in Steps 4 and 5. Insertion of the old balance card will effect closing of the read card lever contacts 110b (Fig. 1). For the particular problem considered, the quantity of the transaction keyed into positions 16, 17 and 18 is "025"; the company number keyed into positions 9, 10 and 11 is "032"; the order number keyed into positions 6, 7 and 8 is "516"; and the transaction code keyed into position 2 is "3." In this manner, the finger 606 (Fig. 33) in each position will be moved through linkage heretofore described to contact the segment 610 corresponding to the number which is keyed into that position. At this time, a start key 620 on the storage keyboard (Fig. 34) is depressed to initiate further operation of the machine.

*Step 6.*—Depression of the start key on the storage keyboard will close contacts 620a (Fig. 41b) to complete circuits to energize the card feed latch magnet 78 (Fig. 5), the card feed clutch magnet 44 and the card register magnet 147 (Fig. 11a), so that a second card feed cycle may be initiated during which, due to the energization of the latch magnet 78, no new card will be fed from the magazine and due to the energization of the register magnet 147 the card present in the punch pre-registration position A will be moved by the card pusher 106 to the punch station at position BB with column 2 of the card coincident with the punch line C—C. As an integral part of the card feed cycle as has been above explained, the roller 277 is lowered against the old balance card to advance that card to the read station with column 1 coincident with the read line E—E.

Figure 36:
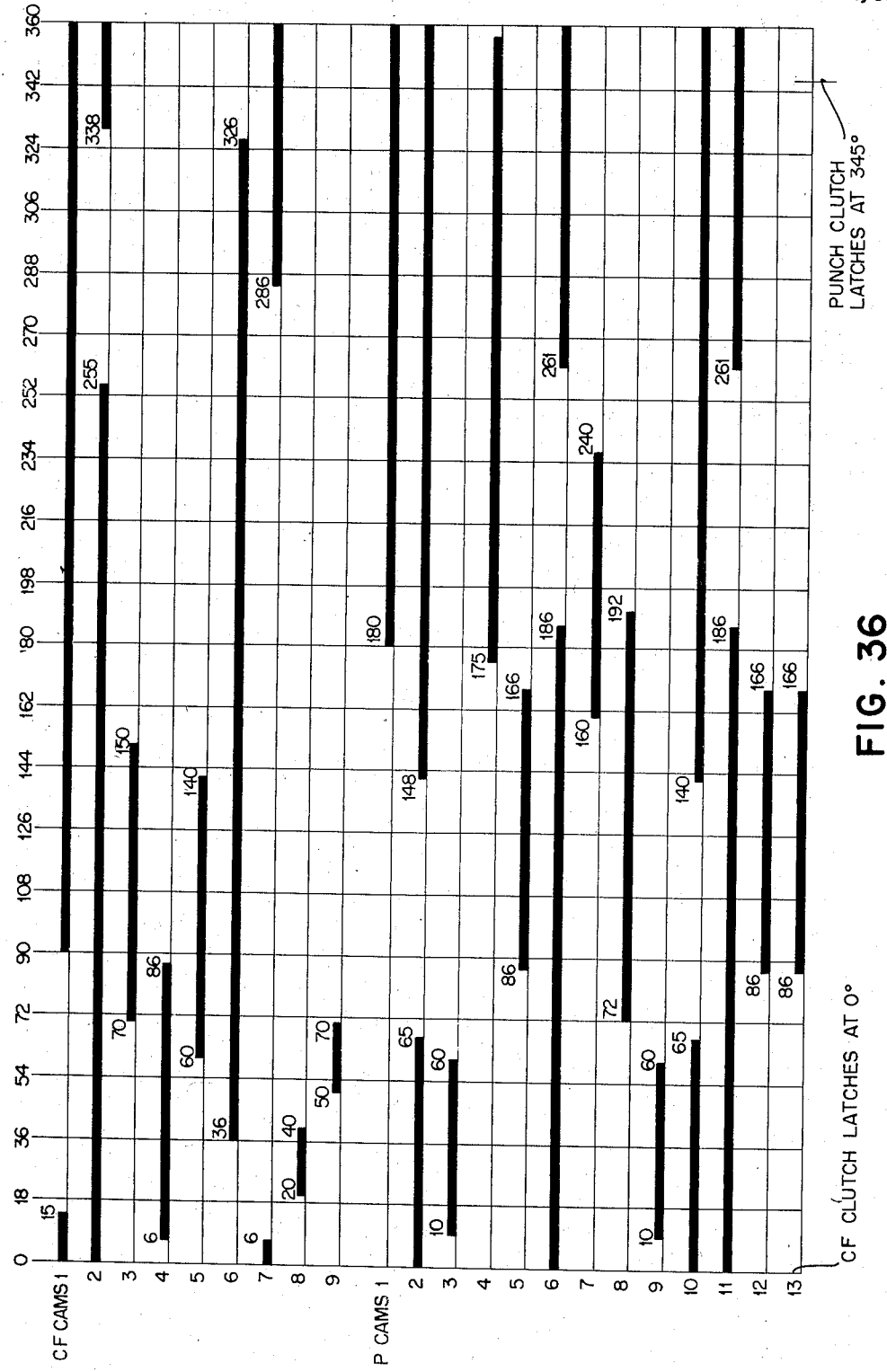
Fig. 36 is an electrical timing diagram for the machine.

The closing of the start key contacts completes a circuit from line L1 (Fig. 41a) through the contacts R41f, R3b transferred, the read card lever contacts 110b transferred, and (L10 to Fig. 41b) the start key contacts 620a transferred to and through the pick coil of relay R38 to line L2. A circuit is provided to energize the hold coil of relay R38 and the pick coil of relay R41 (Fig. 41b), which circuit extends from three coils through transferred contacts R38a and (L10 to Fig. 41c) thence to line L1 through cam contacts CF2 which as is illustrated in the timing diagram of Fig. 36 are made at this time with the card feed clutch in the latched position. The hold coil of relay R41 (Fig. 41b) is energized and held energized by a circuit from the coil through contacts R41a transferred (L71 to Fig. 41a), and R36c to line L1. Thus relay R38 will remain energized until cam contacts CF2 are opened and relay R41 will remain energized until the contacts R36c are opened upon subsequent energization of relay R36. A circuit parallel to the holding circuit to relay R38 is also completed from cam contacts CF2 through transferred contacts R38b (Fig. 41b) to energize the register magnet 147. Energization of this magnet during the following feed cycle as has been heretofore explained, will allow the column 2 arm 138 (Fig. 10) to operate the pusher 106 to advance the card into the column 2 registration position BB.

The circuit to energize the card feed latch magnet 78 proceeds in Fig. 41c from line L1 through contacts R8c, R4, R41d transferred and R38h transferred to and through the magnet 78 to line L2. Energization of the latch magnet 78 will effect closing of the associated contacts 80 which will complete a circuit from the cam contacts CF2 through the latch magnet contacts 80 to pick the card feed clutch magnet 44 and also to hold energized both the clutch magnet and the latch magnet until the CF2 contacts break during the card feed cycle thus initiated. During this feed cycle circuits are completed which through plugboard wiring are utilized to condition the machine for the operations to be performed in accumulating and punching information into the blank card now being advanced to the punch station.

Figure 40:
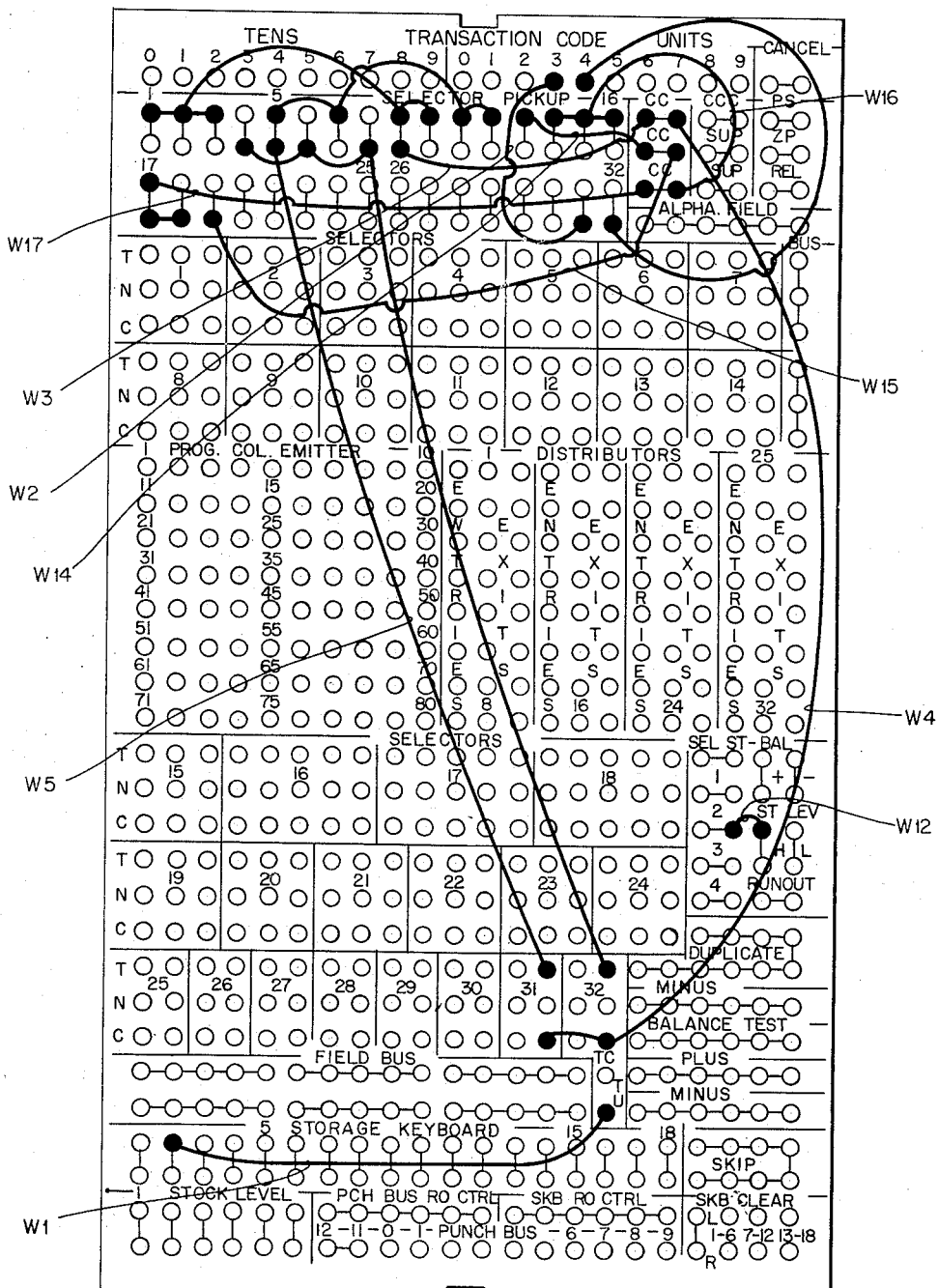
Fig. 40 is a view of the machine plugboard partly wired for a particular problem.

In Fig. 40, there is shown a well known type of electric accounting machine plugboard and certain of the plugwire connections necessary for completion of the particular problem under consideration. In order to more clearly disclose the invention certain other plugboard wiring is shown completing circuits on the circuit diagram. Reference will be made to these plugwire connections as the description progresses.

At 20 degrees of this second card feed cycle, cam contacts CF8 (Fig. 41j) are closed and complete a circuit from line L1 through contacts CF8 transferred, R41j transferred to and through relay R125 to energize that relay. Another circuit extends from line L1 through the CF8 cam contacts transferred, the transferred R41j contacts and rectifier K141 to the units exit hub for the transaction code, which hub is connected as is shown through plugwire W1 on the plugboard in Fig. 40 to the entry hub for the second position of the storage keyboard. Referring again to Fig. 41j the circuit is thus extended from the transaction code units hub to the entry hub for the second position of keyboard storage (Fig. 41n). Since a transaction code of "3" has been keyed into this position the circuit will be extended through the finger commutator (see also Fig. 33), to the 3 wire of Fig. 41n and thence to the left (Fig. 41m) to and through the transferred R125j contacts to the 3 hub for units transaction code exit. The circuit is completed by a plugwire connection W2 (Fig. 40), from this hub to the pickup hub for selector S31 (Fig. 41a), and thence through the pick coil of selector S31 to line L2. A circuit to energize the hold coil of selector S31 extends from the coil through contacts S31a transferred (L11 to Fig. 41c), and cam contacts CF6 transferred at this time (Fig. 36) to line L1. Another card feed cam CF7 has its contacts parallel with the CF6 contacts and, referring to the timing diagram of Fig. 36, it can be seen that this pair of contacts in parallel will maintain the hold circuit for the selector relay throughout the card feed cycle now in progress and until the cam contacts CF7 are broken in the early part of the next initiated card feed cycle.

A number of other selectors are energized during this second feed cycle in the following manner. When cam contacts CF8 (Fig. 41j) are transferred early in the card feed cycle, a circuit is completed through these cam contacts and (L45 to Fig. 41b) contacts R41p transferred and R38c transferred to relay R44 to energize that relay. A circuit to energize and hold the hold coil of relay R44 extends from the coil (Fig. 41b), through contacts R44a transferred (L50 to Fig. 41a), R47a, R50a and R36a to the zero potential line L1. It should be noted that the relay R44 hold coil will remain energized until one of the relays R36, R50 or R47 is energized to open the normally closed contacts in this circuit. When cam contacts CF5 (Fig. 41c) are made at 60 degrees of the feed cycle (Fig. 36), a circuit is completed through these contacts to and through contacts R35b, R50c, R44d transferred and R47d to the card cycles hub CC2. This hub is connected by plugwire W3, as is shown in Fig. 40, to the pickup hubs of selectors S1, S2, S3, S9 and S10, which selector relays are now picked and held energized in the same manner as was selector relay S31. A further circuit is completed by plugwire W4 from the card cycle hub CC2 to the S31c contacts (Fig. 41b) and thence through the transferred S31c contacts and by plugwire W5 to the pickup hubs of selectors S5, S7, S11 and S12. These selectors will be energized and held in the same manner as selector S31 until the early part of the following card feed cycle when cam contacts CF7 are opened.

Incidental to this second card feed cycle completed during this step, a circuit is completed at 70 degrees from line L1 (Fig. 41c) through cam contacts CF3 transferred and through contacts R35c, R41b transferred and R3a transferred to relay R4 to energize that relay. The hold coil of relay R4 is held energized by a circuit from the coil through contacts R4b transferred and program cam contacts PR2, in the position shown, to line L1.

As a result of the above described operation the old balance card has been advanced to the read station with column 1 of the card coincident with the read line E—E; the first blank card which is to be the new balance card has been advanced to the punch station with column 2 of the card coincident with the punch line C—C; the selector relays S1, S2, S3, S5, S7, S9, S10, S11, S12 and S31 are being held energized under control of the cam contacts CF6 and CF7; relay R3 is being held energized under control of the card lever contacts 107a; relay R41 is being held energized under control of the normally closed c contacts of relay R36; relay R44 is being held energized under control contacts R47a, R50a and R36b; and relay R4 is being held energized under control of the program cam contacts PR2. Referring to Fig. 41c, particular note should be made that with relay R4 held energized a circuit is completed from zero volt line L1 through contacts R8c and R4c transferred to a conductor designated L4 which conductor will be thus maintained at zero voltage for the following operations.

Step 7.—Skipping of the old balance card and blank card following past the read and punch stations, respectively, in anticipation of reverse punching is initiated during the operation above described. Referring to the timing diagram of Fig. 35 it can be seen that the cards have been registered in the punch and read stations by 65 degrees of the feed cycle and are secured in that position at 67 degrees when the pressure rollers 92 and 92a are closed to hold the cards against the feed wheels 194 and 194a. As has been explained, relay R4 is energized at 70 degrees when cam contacts CF3 are closed and relay R38 is held energized during the feed cycle under control of the cam contacts CF2 which are closed at this time. Thus at 70 degrees of the card feed cycle, relays R38 and R4 are energized which enables the completing of circuits to the forward escape magnet 249 in the following manner.

Relay R54 is energized by a circuit which extends from conductor L4, now at a potential of zero volts as explained above, to contacts R55f (Fig. 41e), through these contacts and the transferred R38d contacts (L12 to Fig. 41g), and through the coil R54 to line L2. A circuit is established to hold relay R54 which proceeds from the coil (L12 to Fig. 41h) through contacts R54a transferred and punch cam contacts P10, in the condition shown, to conductor L4. Referring to Fig. 30, it can be seen that the program card which has been inserted on the program drum 438 for this problem contains a series of "4" punches in columns, 1 through column 22. Since the program card had been advanced, as was outlined in Step 3, to column 1 and still remains in that position, the star wheel 450, associated with the "4" punch position of the card, will now be extending through the hole punched in column 1 (Fig. 23) and will allow the contact spring PC4 associated with the "4" row of punched to abut against the contact terminal 454. With the program contact PC4 thus abutting against the contact terminal and relay R54 energized, a circuit is completed to render tube T11 conductive and thus energize relay R25 in the plate circuit of this tube. This circuit extends (Fig. 41h) from conductor L4 through the d contacts of relay R19 to common terminal 454 and thence through program card contact PC4 transferred, contacts R54b transferred and (L47b to Fig. 41j) rectifier K10 to the grid of tube T11.

Upon energization of relay R25 circuits are available, as described in Step 3 above, from the terminal of rectifier K10 (Fig. 41j), through the transferred R25d contacts (Fig. 41f), to the grids of tubes T2 and T4 (Fig. 41g), to energize the forward escape magnet 249 and relay R9. As above, the hold coil of relay R9 is maintained energized due to a circuit through the transferred R25f (Fig. 41f), contacts to the grid to tube T5. The forward escape magnet will remain energized and skipping of the cards past the punch and read stations, respectively, will continue over all the columns in the program card in which there is present a "4" punch.

Incidental to the above operation the following circuits are completed to condition the machine for the transition from forward to reverse operation which will occur upon completion of the skip defined by the "4" punches on the program card. The energization of relay R54 completes a circuit to energize relay R55, which circuit extends in Fig. 41e from conductor L4 through cam contacts CF1, transferred at 90 degrees of the card feed cycle, and (L13 to Fig. 41g) contacts R54d transferred to the coil of relay R55. Relay R55 is held by a parallel circuit extending from the coil through the transferred contacts R55a and thence back through cam contacts CF1. As the program card is advanced past column 6 the presence of the "5" punches in the program card will allow program cam contact PC5 to make against contact terminal 454 to complete a circuit to render tube T8 conductive, and thus cause energization of relay R52. This circuit proceeds from the grid of tube T8 (Fig. 41g), through contacts R55m transferred, R2a and (L14 to Fig. 41h) program cam contacts PC5 transferred to terminal 454, and thence to line L1 in the same manner as was described in reference to program contacts PC4. Relay R52 in the plate circuit of tube T8 will be energized as long as there are present in the program card "5" punches in the columns being advanced in either direction past the star wheels 450.

As the program card is advanced from column 22 to 23, the program contact PC4 will be opened allowing tube T11 (Fig. 41j) to become non-conductive and thus deenergizing relay R25. Restoration of contacts R25d (Fig. 41f) will open the circuit to the grid of tube T2 to allow deenergization of the forward escape magnet 249. Despite the opening of contacts R25f (Fig. 41f), the hold coil of relay R9 will be maintained in the energized condition since a circuit is available through the parallel contacts R54c now transferred to the grid of tube T5. The deenergization of the forward escape magnet 249 will end the forward skipping operation. As a result of this skipping, column 23 of the program card will be coincident with the star wheels 450, column 23 of the old balance card will be coincident with read line E—E, and column 24 of the new balance card will be coincident with punch line C—C.

At this time a circuit is available to energize the punch clutch magnet 419 to initiate a punch cycle during which the machine is conditioned for the reverse stepping of the cards past the read and punch lines. This circuit extends from conductor L4 in Fig. 41e through contacts R22d (L15 to Fig. 41f), R25e, R32g, R54e transferred and R55b transferred (L16 to Fig. 41g) to the grid of tube T7 to render that tube conductive and energize the punch clutch magnet 419, in the plate circuit of the tube, and under control of cam contacts P1, now in the condition shown. The punch clutch will remain energized until zero degrees of the punch cycle thus initiated, at which time cam contact P1 will be transferred. It should be noted here that, as indicated in Fig. 36, the punch clutch latches at 345 degrees and thus a punch cycle begins and ends at 345 degrees of machine cycle time.

At 10 degrees of this punch cycle cam contacts P9 are transferred to energize relay R32 by a circuit extending from conductor L4 (Fig. 41h), through cam contacts P9 transferred, relay contacts R54f transferred and R55j transferred to and through the pick coil of relay R32 to line L2. Relay R32 is held energized by a circuit extending from line L2 through the hold coil (Fig. 41g), and contacts R32a transferred (L17 to Fig. 41f), R52d transferred (L18 to Fig. 41e) and reverse magnet contacts 231b (see also Fig. 11b), to conductor L4. The energization of relay R32 and opening of its d contacts (Fig. 41f) will interrupt the circuit to the grid of tube T3 (Fig. 41g) and allow the reverse escape magnet 255 to be deenergized and its armature 253 (Fig. 11a) to engage reverse escape wheel 252 anticipatory of the reverse stepping operations to follow. At 65 degrees of this punch cycle cam contacts P10 are transferred deenergizing relay R10 and restoring the R54c contacts (Fig. 41f), but the hold circuit for relay R9 which extends in Fig. 41g from the grid of tube T5 is maintained through the transferred R32d contacts (Fig. 41f). At 72 degrees of the punch cycle cam contacts P8 are transferred to complete a circuit to energize relay R58 which circuit extends from conductor L4 (Fig. 41e) through contacts P8 transferred, R52b transferred and R32b transferred (L19 to Fig. 41f) through the coil of relay R58 to line L3.

Figure 41E:
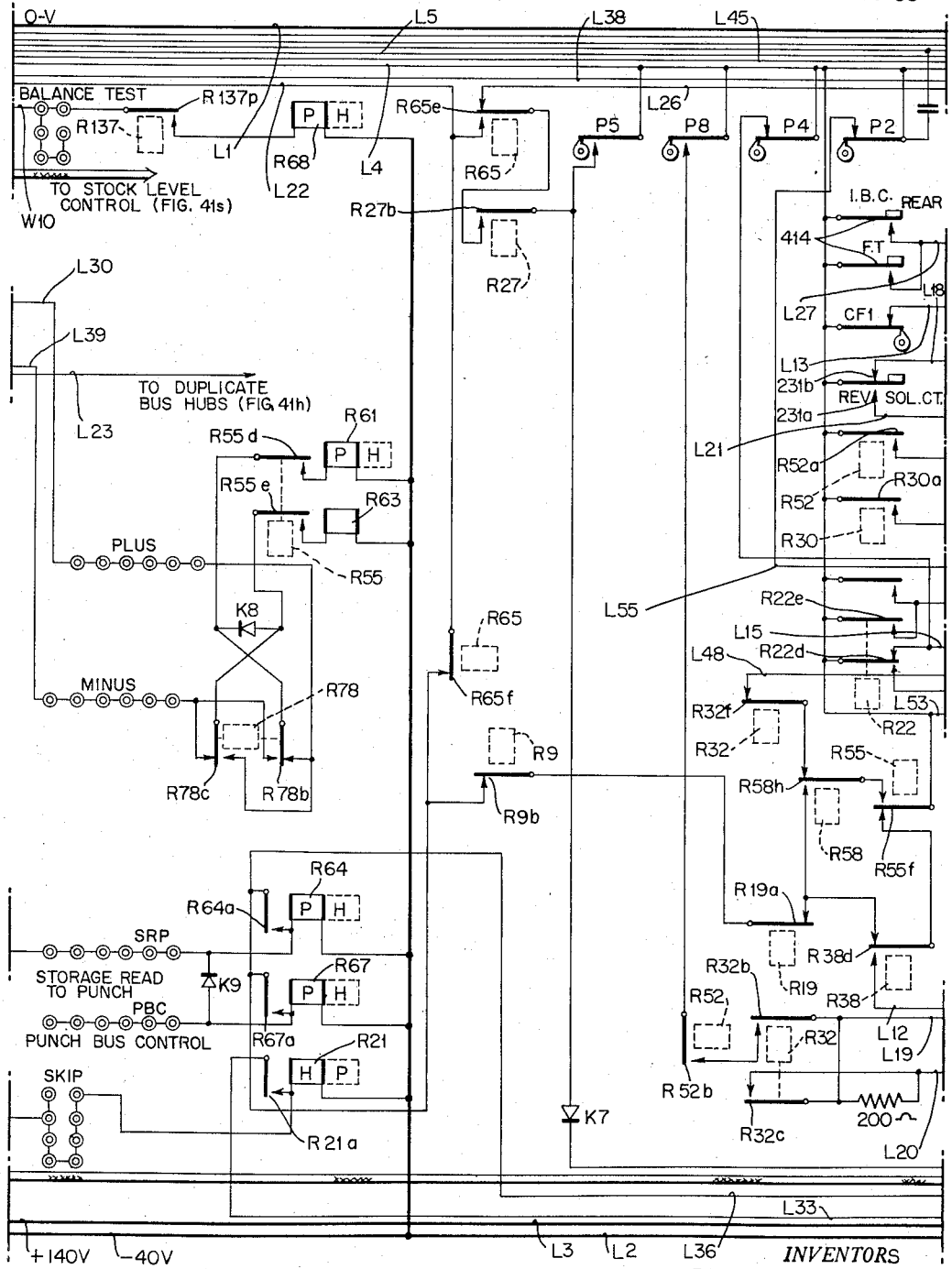
Figure 41F:
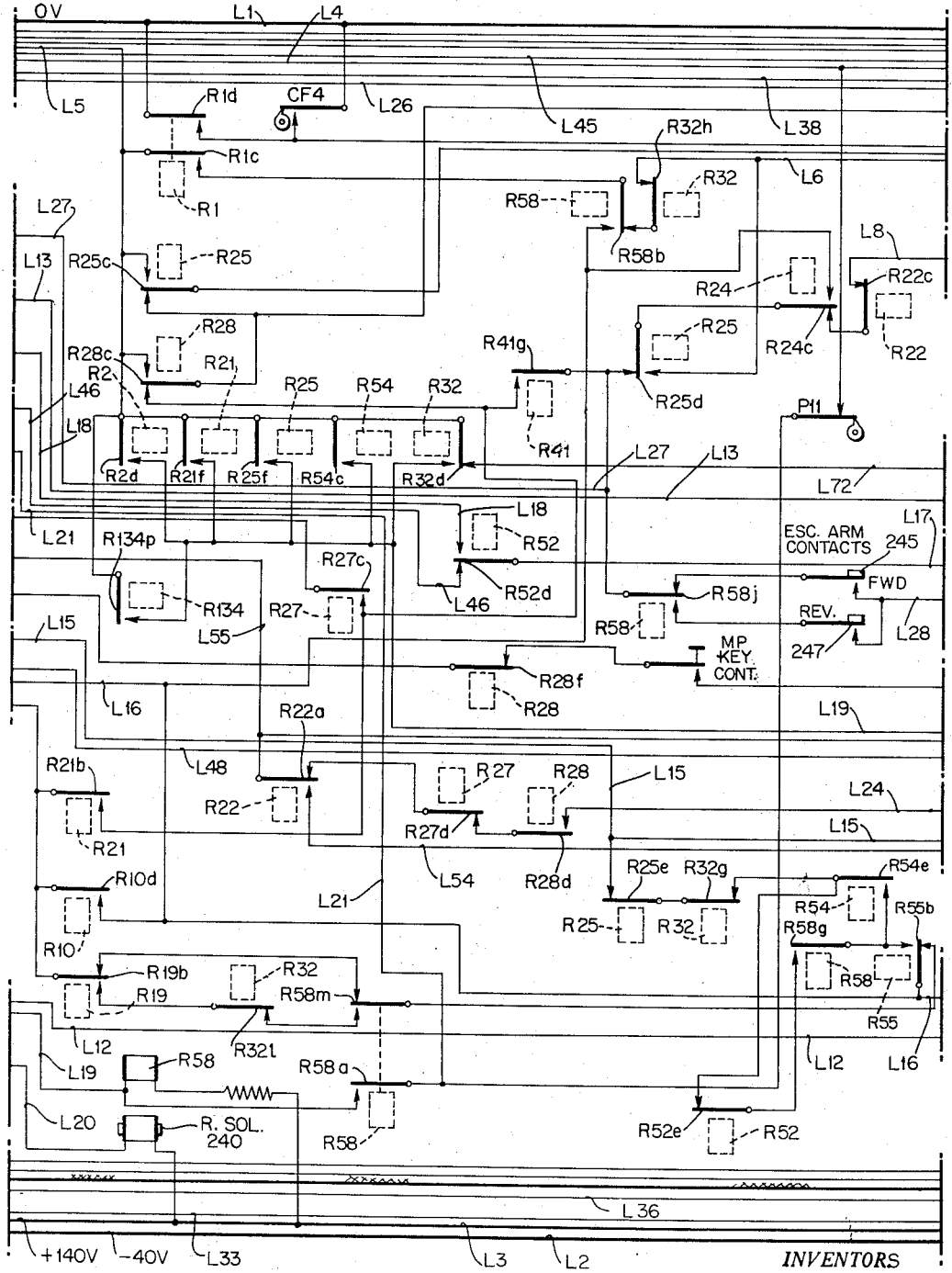
Figure 41G:
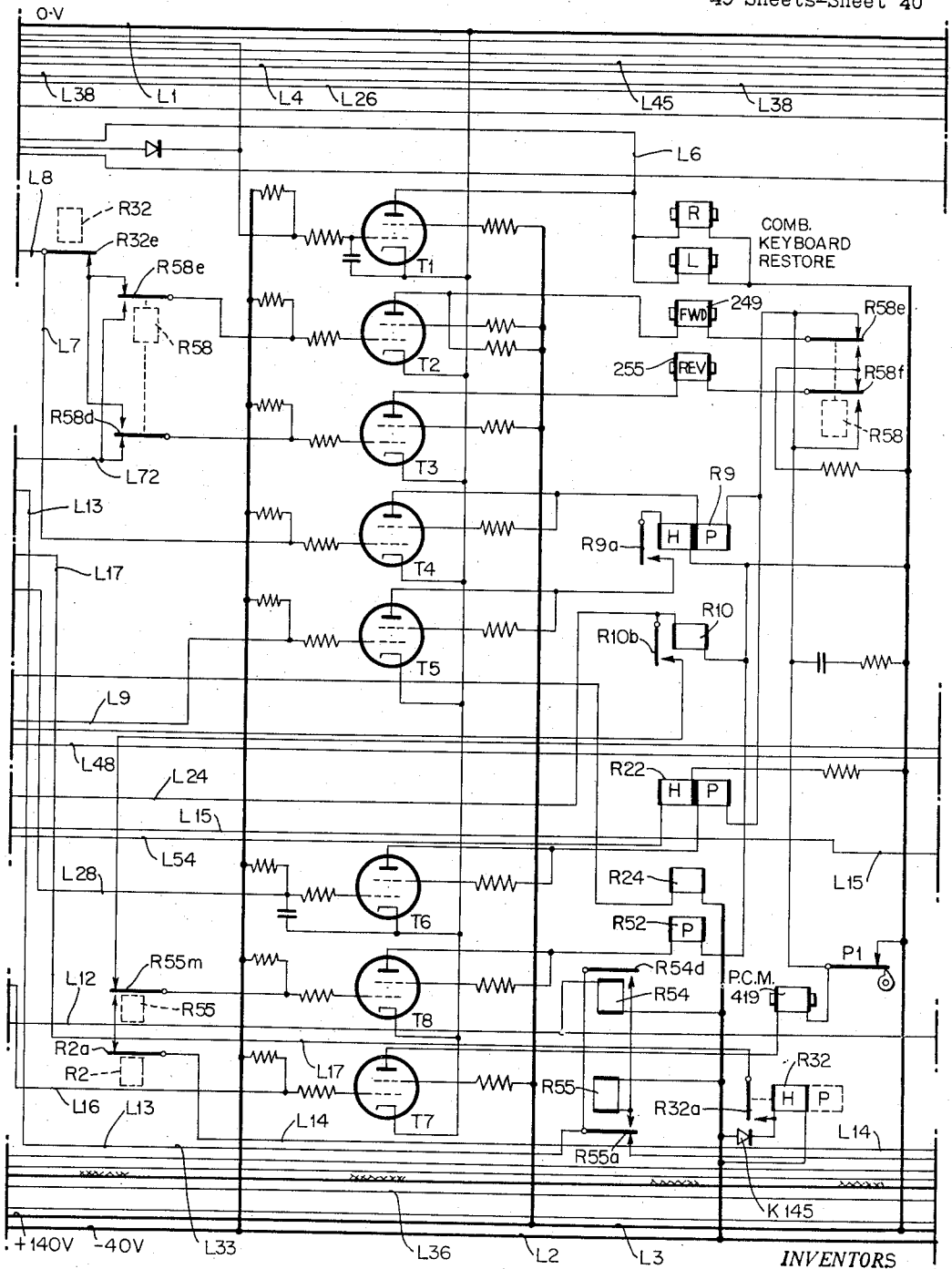

The reverse solenoid 240 (Fig. 11b) is energized to reverse the direction of the drive to the escapement mechanism by a circuit which extends, as above in Fig. 41e from the transferred P8 contacts through the transferred R32b contacts, and thence through the transferred R32c contacts and (L20 to Fig. 41f) the reverse solenoid 240 to line L3. The reverse solenoid and relay R58 are maintained energized by a hold circuit extending in Fig. 41f through contacts R58a transferred and (L21 to Fig. 41e) R52a transferred to conductor L4. The energization of the reverse solenoid 240 opens the reverse solenoid contacts 231b (Fig. 41e), thus interrupting the circuit holding relay R32 (Fig. 41g) energized. The deenergization of relay R32 and opening of contacts R32c (Fig. 41e) causes the hold circuit for the solenoid 240 to extend through the 200 ohm resistor connected across the R32c contacts. The rectifier K145

(Fig. 41g) connected across the hold coil of relay R32 is provided to slow down the deenergization of relay R32 to insure that contacts R58d (Fig. 41g) are completely transferred before the d contacts of relay R32 are restored to the condition shown in Fig. 41f and thus preclude the possibility of a reenergization of the reverse escape magnet 255 through tube T3 at this time. The opening of the d contacts of relay R32 will interrupt the circuit to the grid of tube T5 maintaining relay R9 energized, which will allow the b contacts of relay R9 to be restored to the conidtion shown in Fig. 41e. There is also a circuit established at this time, after energization of the reverse solenoid 240, to energize the forward escape magnet 249 and to disengage its armature 251 (Fig. 11a) from the forward escape wheel 250 during the reverse stepping operation to follow. This circuit extends from line L1 (Fig. 41c), through contacts R8c (L5 to Fig. 41f), R32d and R58c transferred to the grid of tube T2 to render the tube conductive and energize the forward escape magnet 249 through contacts R58e transferred and a resistor completing a circuit from the anode of the tube to line L3.

Referring to Fig. 41d of the drawings there is shown an electrical commutator of a well-known type. It is sufficient for the purposes of the present invention to state that the commutator is advanced under control of the escape mechanism and in conjunction with the advance of the program drum 438 so that as each column, 1 through 80, of the program card is in a position coincident with the star wheels 450 the contacting finger 640 will be in a position to complete a circuit from the common bar 642 to the corresponding emitter hub, E1 through E80.

As a result of the circuit operation just described the condition of the machine at this time is as follows. Column 23 of the old balance card has been advanced to the read line E—E; column 24 of the first blank card, or new balance card, has been advanced to the punch line C—C; column 23 of the program card has been advanced to a position of coincidence with the star wheels 450; the program emitter has been advanced to a position where the finger 640 completes a circuit from the common bar 642 to emitter hub E23. The escapement shaft 248 (Fig. 11a) is being urged in a clockwise direction due to the energization of the reverse solenoid 240 but is restrained from motion by the armature 253 in the deenergized condition engaging the reverse escape wheel 252. The forward escape magnet 249 is held energized disengaging armature 251 from the forward escape wheel 250. Relays R3, R4, R44, R52, R55 and R58 are energized and selector relays S1, S2, S3, S5, S7, S9, S10, S11, S12 and S31 are energized.

Step 8.—The functional operation now to be described is continuous and inseparable from the operation just completed but is treated as a separate step for the purposes of clarity.

(a) Circuits are now established to initiate the duplication of the part number in columns 23, 22, and 21 from the old to the new balance card. With finger 640 now connecting the emitter common 642 to the emitter hub E23, a circuit is completed to transmit an impulse from line L1 to this hub which circuit extends as before to conductor L4 and thence, in Fig. 41e, through contacts R55f transferred, R58h transferred, R19a, R9b and R65f (L22 to Fig. 41d), to the emitter common 642 and thence through finger 640 to the hub E23. This pulse available at hub E23 is transmitted through plugboard wiring, as indicated in the wiring diagram, to render tube T12 conductive and thus energize relay R28 in the plate circuit of the tube. This circuit extends from hub E23 to the transfer hub of selector contacts S10c, through the transferred contacts to the common hub and thence (L23 to Fig. 41h), to the duplicate hubs from which hubs the circuit is continued through contacts R61b, R64d, R24d and R2b (L25 to Fig. 41j), to the grid of tube T12. The transferring of contacts R28d complete a circuit to energize relay R10 which circuit extends (Fig. 41g) from line L3 through the coil and (L24 to Fig. 41f) through contacts R28d transferred, R27d, R22a and (L55 to Fig. 41e) cam contacts P2 to conductor L4. Relay R10 is held energized under control of the cam contacts P2 by a parallel circuit extending through the transferred R10b contacts (Fig. 41g) to and through the coil.

The transfer of the R10d contacts completes a circuit to render tube T7 conductive to effect energization of punch clutch magnet 419 and thus initiate a punch cycle during which the "2" punch in column 23 of the old balance card will be sensed. Tube T7 (Fig. 41g) is rendered conductive by a circuit extending from the grid of the tube (L16 to Fig. 41f) through contacts R10d transferred (L53 to Fig. 41e), to conductor L4. At zero degrees of this cycle cam contacts P1 (Fig. 41g), in the plate circuit of tube T7 are transferred to deenergize the punch clutch magnet 419. At 70 degrees the cam contacts P3 are transferred to energize relay R27 by a circuit extending in Fig. 41h from conductor L4 through contacts P3 transferred, relay contacts R10c transferred, to and through the hold coil of relay R27 to line L3. The pick coil of relay R27 is held energized in parallel with relay R28 in the plate circuit of tube T12 (Fig. 41f) through the transferred contacts R27a.

Figure 41H:
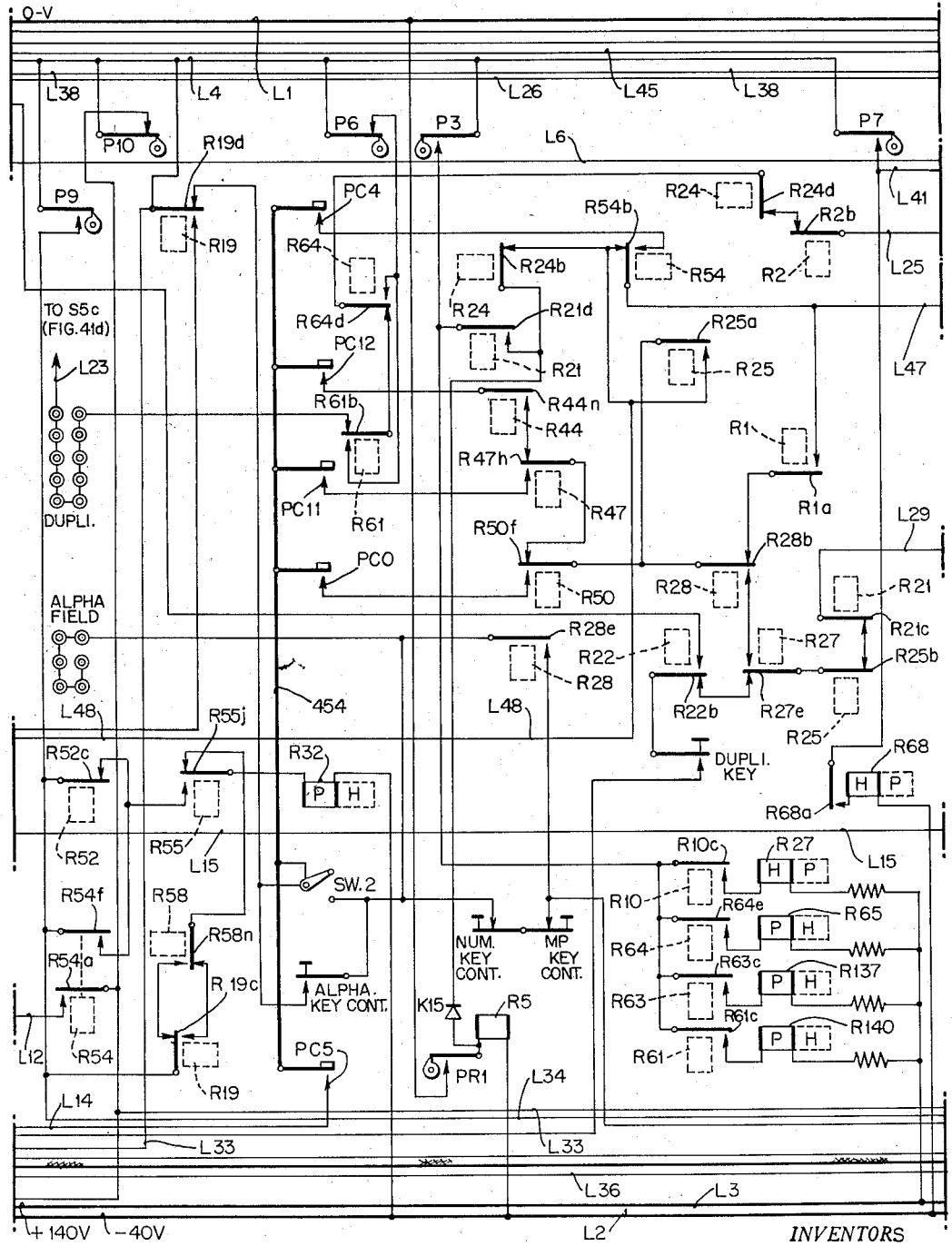
Figure 41J:
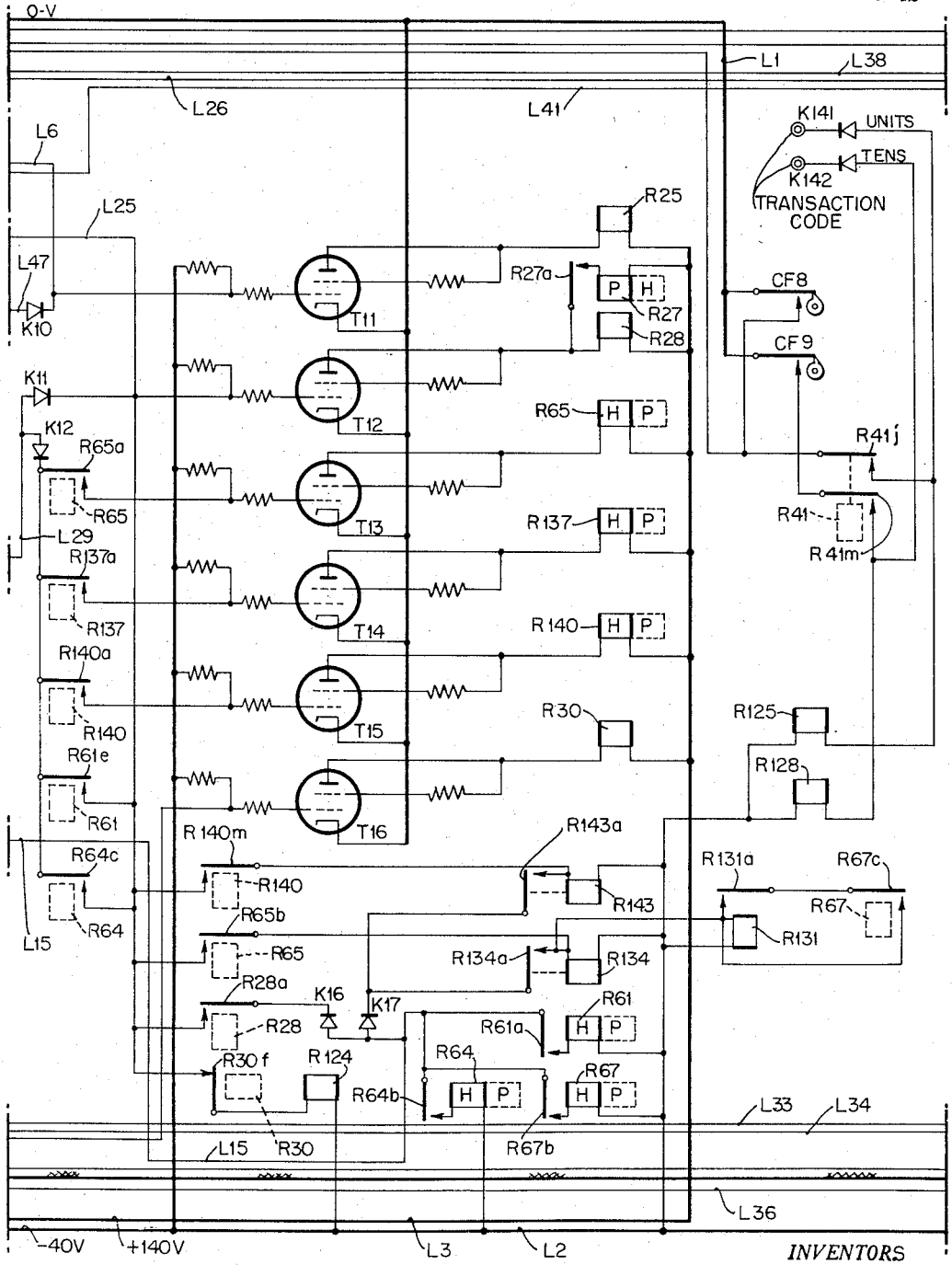
Figure 41K:
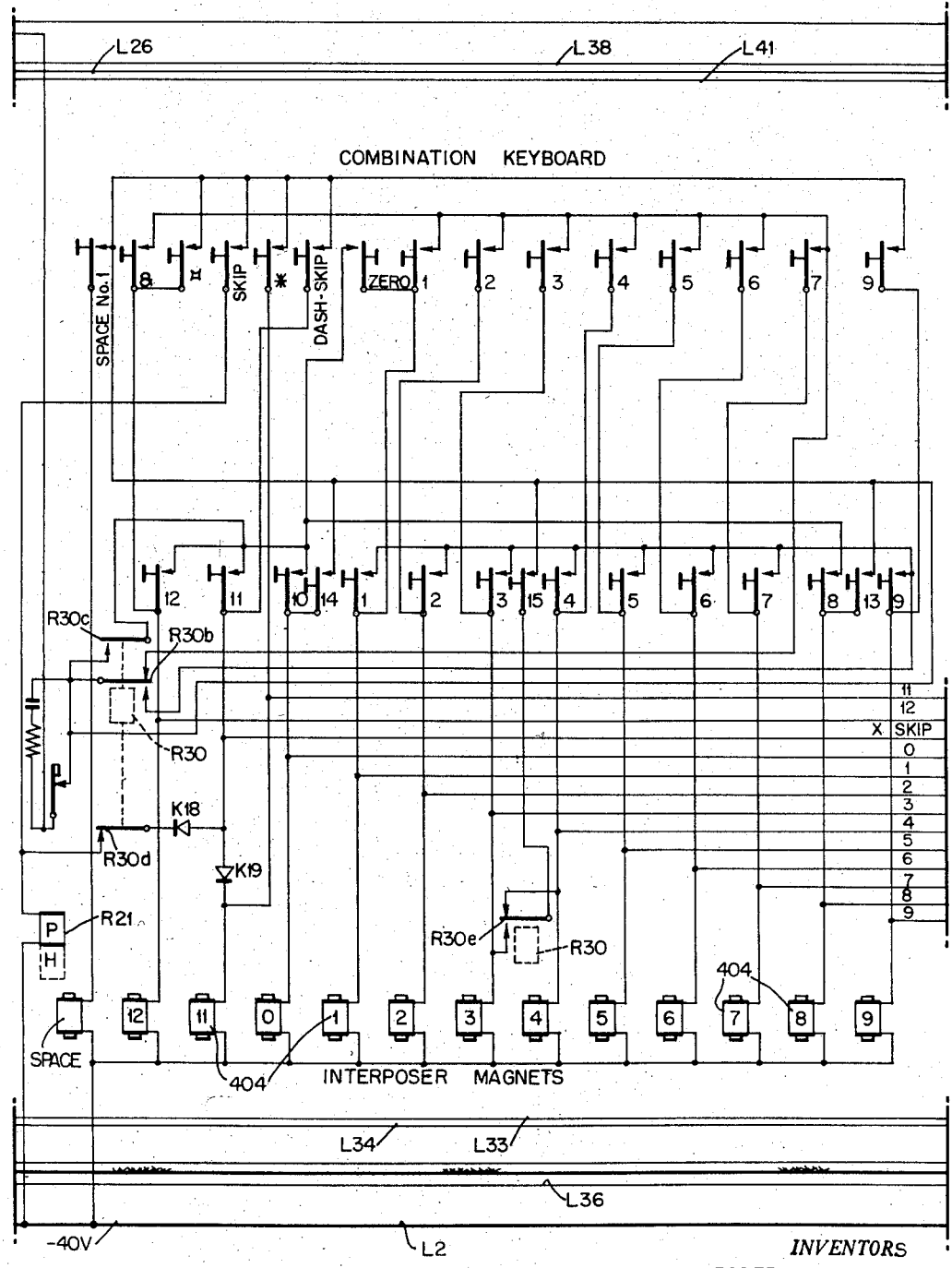
Figure 41M:
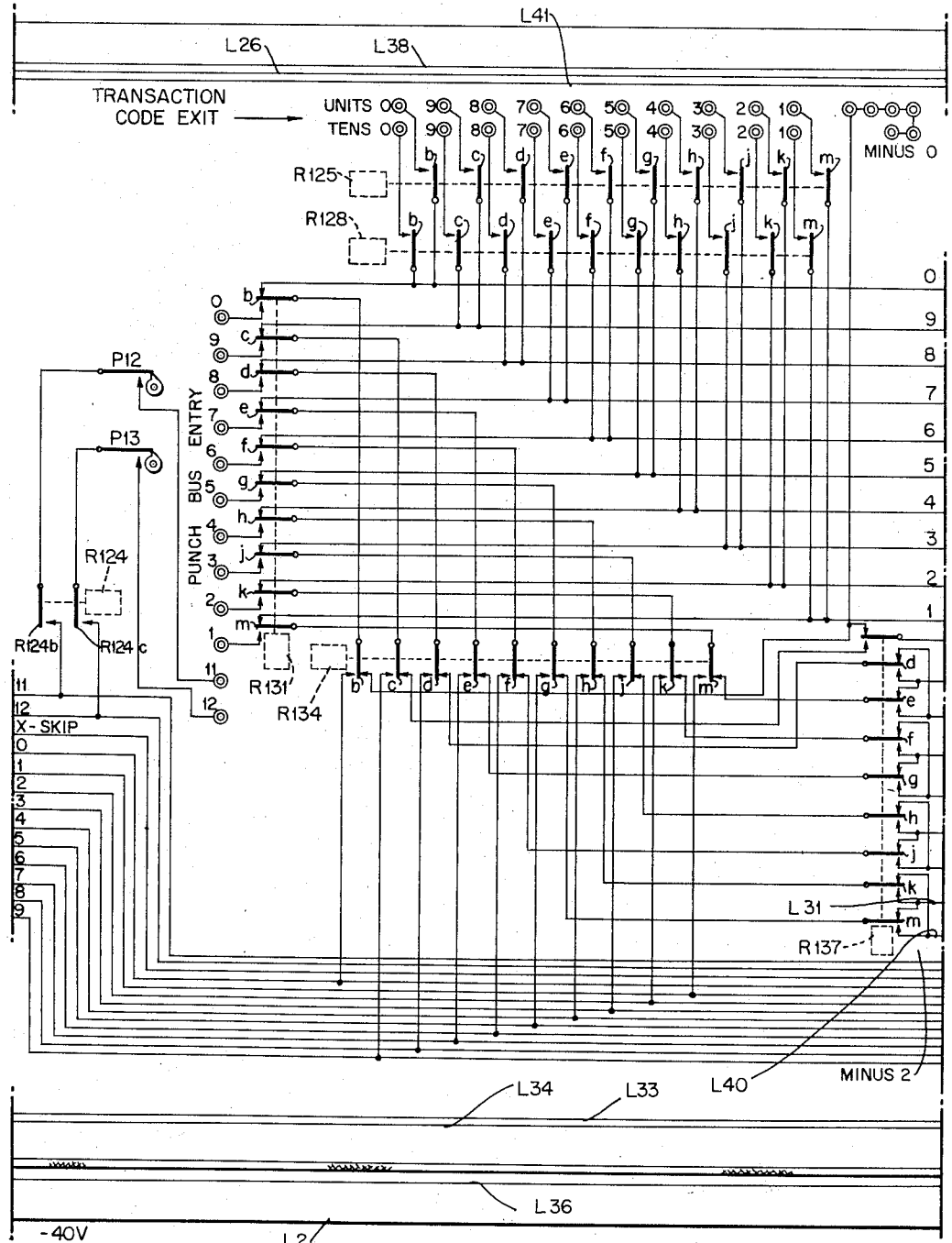
Figure 41N:
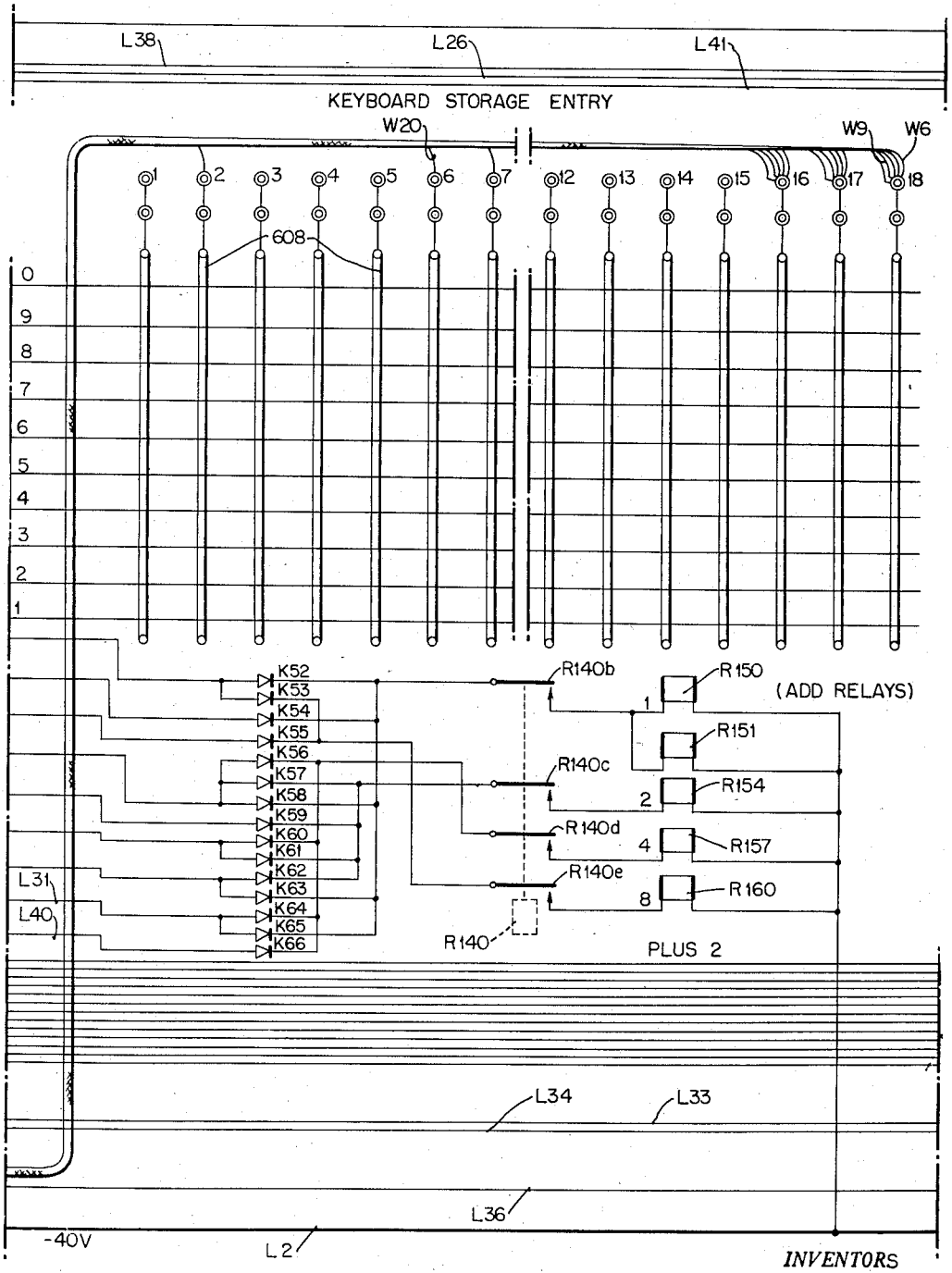

The sensing contacts 426 (see Fig. 20) corresponding to the "2" row of punches will have been transferred by 86 degrees (Fig. 35) of this punch cycle at which time cam contacts P5 are transferred and a circuit to energize the "2" punch interposer magnet 404 (see Fig. 20), extends in Fig. 41e from conductor L4 through contacts P5 transferred R27b transferred, R65e (L26 to Fig. 41p) to the sensing pin common 434, through the "2" contacts 426 transferred, contacts R143e and thence down and to the left to Fig. 41k to and through the "2" interposer magnet 404 to line L2. Referring to Fig. 20 it can be seen that energization of the interposer magnet at this time will not effect engagement of the interposer 393 and the punch bail 406 since the bail has already begun its downward movement (Fig. 35). The attraction of the associated armature 402 by the energized interposer magnet will effect closing of the interposer bail contacts 414 to render tube T4 conductive and again energize relay R9. The circuit extends in Fig. 41e from conductor L4 through the closed bail contacts 414 and (L27 to Fig. 41) contacts R25d, R24c, R22c and (L8 to Fig. 41g) conductor L17 to the grid of tube T4. The energization of relay R9 transfers the R9b contacts (Fig. 41e) and thus opens the circuit from line L1 through the emitter hub E23 to the grid of tube T12. However, before this circuit is opened tube T12 is maintained conductive and relays R27 and R28 are held energized by a circuit at this time available from the grid of the tube (Fig. 41j), through contacts R28a transferred, rectifier K16 and (L15 to Fig. 41e) cam contacts P4 to conductor L4. At 180 degrees of this punch cycle cam contacts P1 are again closed to allow the energization of the reverse escape magnet 255 since tube T3 is rendered conductive by a circuit extending from the grid of the tube (Fig. 41g) and through contacts R58d transferred, R32e (L8 to Fig. 41f), R22c, R24c, R25d (L27 to Fig. 41e) and the transferred bail contacts 414 to conductor L4.

Energization of the reverse escape magnet 255 will close the associated contacts 247 (Fig 11a), to render tube T6 (Fig. 41g), conductive and thus effect energization of relay R22 connected in the plate circuit of the tube through cam contacts P1 to line L3. This circuit extends from the grid of tube T6 (L28 to Fig. 41f) through contacts 247 closed, R58j transferred (L27 to Fig. 41c), and contacts 414 closed to conductor L4. Relay R22 opens its c contacts (Fig. 41f), thus breaking the circuits to the grids of tubes T2 and T4 and allowing the reverse escape magnet 255 and relay R9 to be deenergized. The timing of the above operation is such that a single step of escapement is accomplished stepping the program card, old balance card, and emitter finger to column 22, and the new balance card to column 23.

As the program card is advanced into column 22, the star wheel 450 associated with the "12" row of punches will enter the "12" punch in that column to effect closing of the associated PC contacts to further hold energized relays R27 and R28 as a result of a circuit extending from the grid of tube T12 (Fig. 41j) through rectifier K11 (L29 to Fig. 41h), contacts R21c, R25d, R27e transferred, R28b transferred, R50f, R47h, R44n transferred, PC12 transferred to the common terminal 454, and thence through contacts R19d to conductor L4. In this manner the relays R27 and R28 will be held energized and the machine conditioned for duplicating for the length of the field defined by the "12" punches in the program card. The energization of relay R22 to end the escape operation transfers the contacts R22d to effect energization of punch clutch magnet 419 and initiate another punch cycle. This is accomplished by rendering tube T7 (Fig. 41g) conductive by a circuit from its grid through (L16 to Fig. 41e) contacts R22d transferred to conductor L4. During the punch cycle thus initiated the "2" punch, read at column 23 of the old balance card during the previous punch cycle, will be punched in the new balance card now advanced to column 23, and the "2" in column 22 of the old balance card will be sensed at the read station. It should be noted that coincident with the punching, here as well as in subsequent operations, the print unit heretofore described will be effective to print the digit punched along the upper margin of the card (Figs. 37, 38 and 39). The operation will then proceed in the same manner as above. The closing of the "2" sensing pin contacts 426 causing reenergization of the "2" interposer magnet 404, and thus closing of the interposer bail contacts 414 to effect escapement and punch cycles until the new balance card has received "2" punches in columns 23, 22 and 21. As the new balance card is escaped into column 21 before the punching of the "2" in that column, the program card is advanced into column 20. Since there is no "12" punch in column 20 of the program card the associated star wheel 450 will now be raised to open the PC12 contacts and thus indicate the completion of machine operation for this particular field.

(b) The energization of relay R22 to end the last escapement of the duplicating operation will open the contacts R22c (Fig. 41f) to break the circuit to tube T4 (Fig. 41g) and thus effect deenergization of relay R9. Relay R9 will remain deenergized until 65 degrees of this last punch cycle of the duplicating operation, at which time cam contacts P2 will open to deenergize relay R22. Thus before the last punching cycle of duplicating operation the contacts R9b (Fig. 41e) will be closed to complete a circuit from conductor L4, as described above, to the emitter common 642 (Fig. 41d) and thence through finger 640 to column emitter hub E20, from which hub circuits are completed by plug wire to initiate the accumulating and punching operation to be performed on the "Accumulated Issue" field in columns 20, 19 and 18 of the cards.

The first of these circuits extends from hub E20 through a rectifier distributor D16, provided to eliminate back circuits, and thence through contacts S12b transferred (L30 to Fig. 41e) to the plus entry hubs and thence through contacts R78b and R55d transferred to energize relay R61. The hold coil of relay R61 is held energized by its transferred a contacts (Fig. 41j) completing a circuit (L15 to Fig. 41e), through cam contacts P4 to conductor L4. The closing of the b contacts of relay R61 completes a circuit to hold energized relays R27 and R28, which circuit extends in Fig. 41j from the grid of tube T12 (L25 to Fig. 41h), through contacts R2b, R24d, R64d, R61b transferred and cam contacts P6 to conductor L4. Relays R27 and R28 will be held energized since tube T12 will be maintained conductive during the punch cycle alternatively by this circuit through the transferred R61b contacts and contacts P6 and by the previously described circuit through the transferred R28a contacts (Fig. 41j) under the control of cam contacts P4. Previous to the next punch cycle an escapement step will be completed which will advance the program card into column 19, in which column is present a 12 punch which will effect closing of the associated contacts PC12 to complete a further holding circuit as previously described for relays R27 and R28. With relays R28, R27 and R61 energized at the initiation of this last punch cycle of duplicating operation, this cycle is also effective to initiate the accumulating of the amounts in the "Accumulated Issue" field and storage keyboard positions 18, 17 and 16 through circuitry now to be described.

At 10 degrees of the punch cycle relay R140 (Fig. 41h) is energized by a circuit from the coil through the transferred R61c contacts and cam contacts P3 to conductor L4. Closing of contacts 140a (Fig. 41j) will cause tube T15 to be conductive and thus effect energization of the hold coil of relay R140. This circuit proceeds, as above, from cam contacts P4 or P6 to the grid of tube T12, and thence in parallel through contacts R61e transferred and R140a transferred to the grid of tube T15. Subsequent to escapement of the program card into column 19 the circuit available through the transferred PC12 contacts to the grid of tube T12 also extends in parallel from the terminal of rectifier K11 through rectifier K12 and contacts R140a transferred to the grid of tube T15. A circuit to energize relay R143 extends in parallel from the grid of tube T12 and through contacts R140m transferred and the coil of relay R143 to line L2.

With relay R143 energized it is possible to complete a circuit to read the digit "5" present in the 18th position of keyboard storage and energize the proper add relays. There are five of these add relays (Fig. 41n) set up in a modified decimal binary system, which relays are R150 and R151 representative of a digit "1"; R154 of a digit "2"; R157 of a digit "4" and R160 of a digit "8." Relays R150, R151 and R157 are now energized by a circuit extending from the emitter hub E20 (Fig. 41d) through distributor D17, contacts S11d transferred and thence by plug wire W6 to the entry hub (Fig. 41n) for the 18th position of keyboard storage. The circuit is then continued through the contact fingers 604 and 606 (see also Fig. 33) in this position, the "5" wire of the network to Fig. 41m, through contacts R131g, R134g, R137m (L31 to Fig. 41n) and thence in parallel through rectifiers K64 and K65 and contacts R140b and R140d transferred to the coils of relays R150, R151 and R157. It should be noted that these circuits are completed immediately after cam contacts P3 are transferred at ten degrees of this last punch cycle of the duplicating operation during which a "2" is being punched in column 21 of the new balance card now present at the punch line C—C.

Figure 41P:
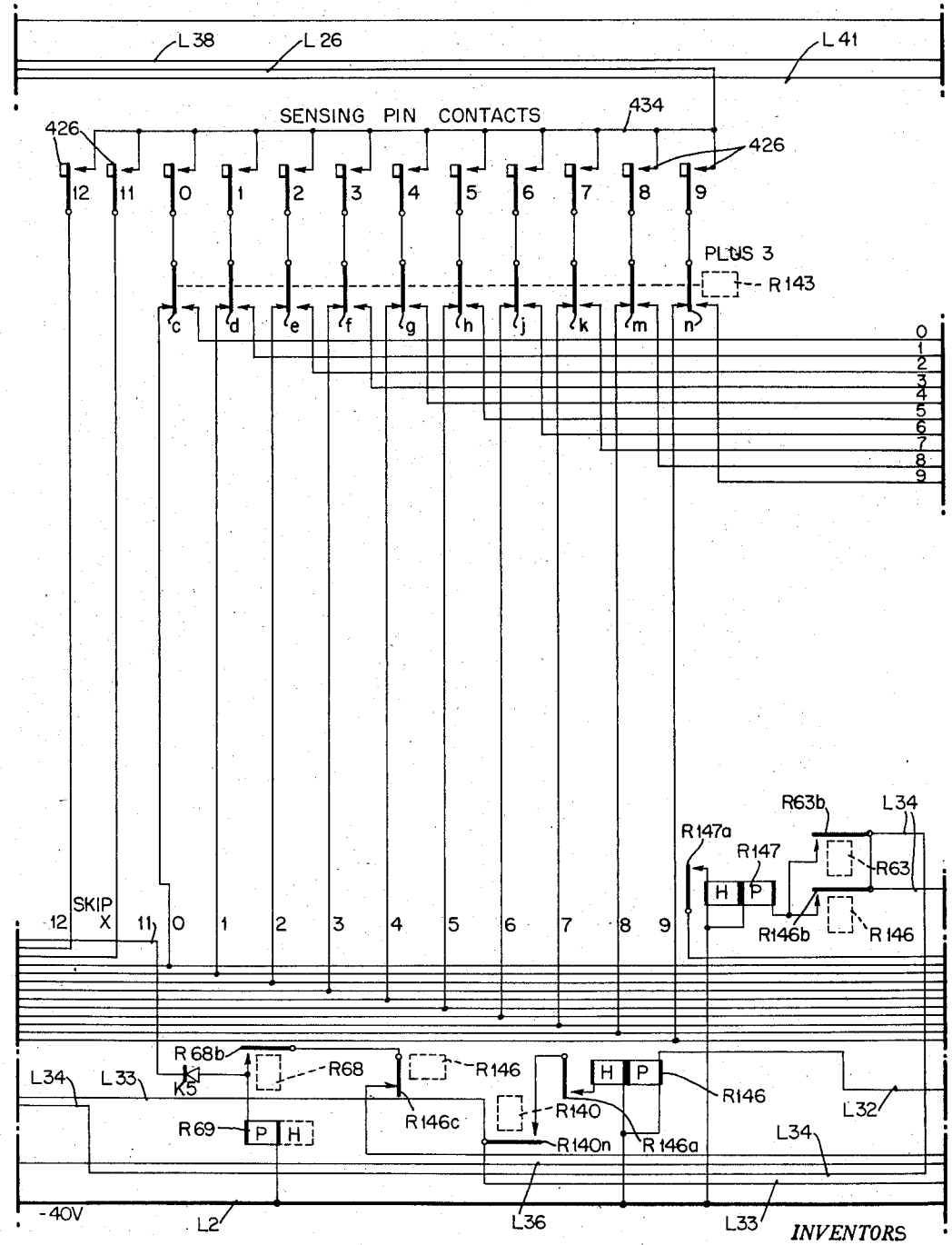
Figure 41R:
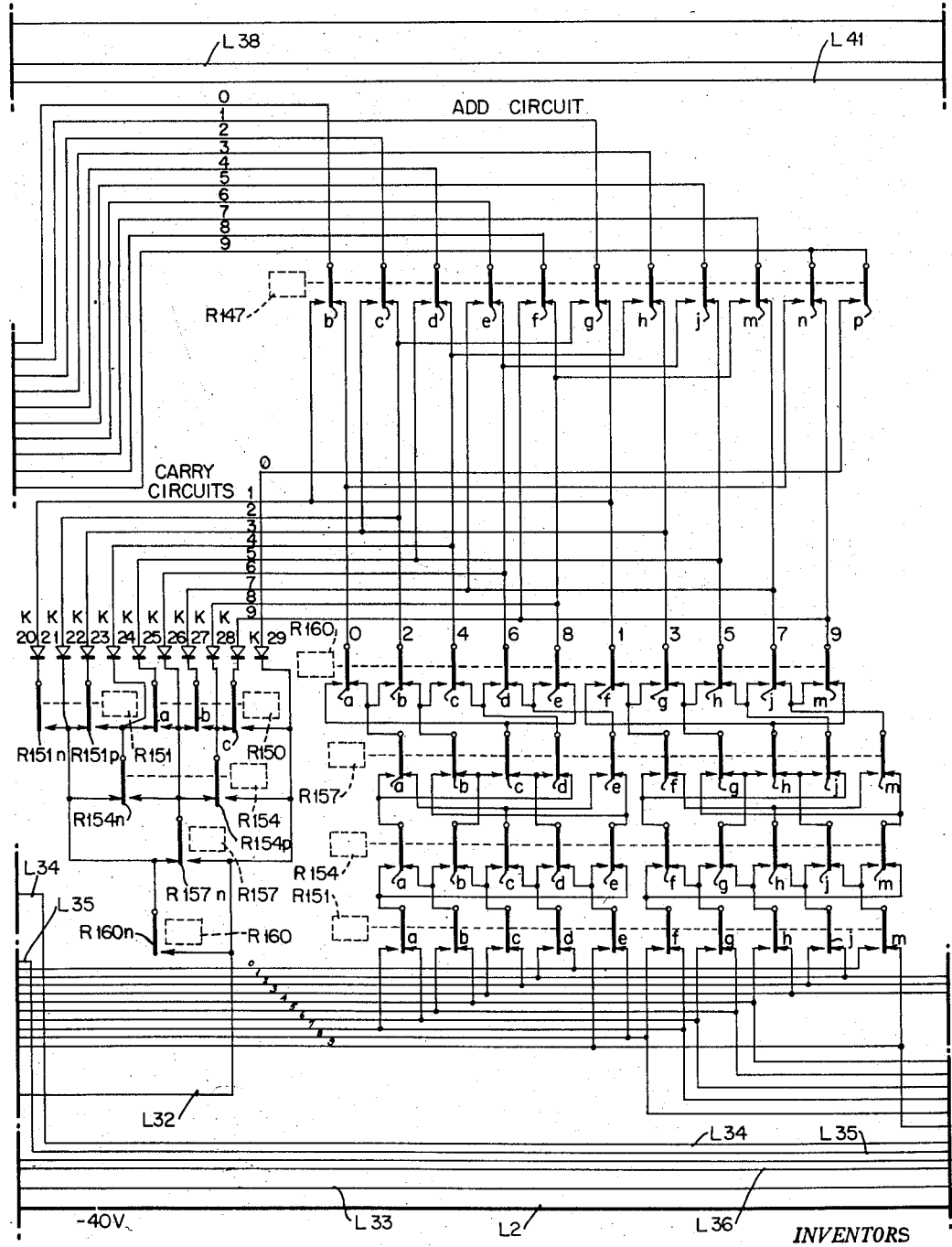

At 86 degrees of this cycle cam contacts P5 will be closed to complete a circuit, as previously described in the explanation of the duplicating operation, to the sensing pin contact common 434 (Fig. 41p). The "5" sensing contacts 426 will now be transferred due to the sensing of the "5" in column 20 of the old balance card now present at the read line E—E so that a circuit may be completed from that point through the adding network previously conditioned by the reading of the "5" out of the 18th position of storage keyboard to energize the interposer magnet representing the units digit of the sum of these two individual digits which in the present case will be zero. This circuit extends in Fig. 41p through the "5" sensing pin contacts 426 transferred, relay contacts R143h transferred, the "5" wire of the network to Fig. 41r and through contacts R147j, R160h, R157j transferred, R154j, R151m transferred, the "0" wire to Fig. 41k and thence through the zero interposer magnet 404. Since the addition of the digits "5" and "5" involves a carry, it is also necessary at this time to condition the add network to include this carry in the subsequent accumulation of the next order of this field. To this end a circuit is provided, which extends as above through the R147j contacts (Fig. 41r), and thence in parallel through rectifier K24 and contacts R150a transferred and R157n transferred to (L32 to Fig. 41p) and through relay R146 pick coil to energize this relay. Relay R146 is held energized until 65 degrees of the next following punch cycle by a circuit extending from the hold coil through contacts R146a transferred, R140n transferred (L33 to Fig. 41h), and cam contacts P10 to conductor L4. Energization of the zero interposer magnet 404 will close the interposer bail contacts 414 (Fig. 41e) so that upon completion of this punch cycle an escapement and subsequent punch cycle will be effected in the same manner as described for the duplicating operation. During the subsequent punch cycle zero will be punched in the new balance card in column 20, which column will then have been advanced by the escapement to the punch line C—C.

At the beginning of this subsequent punch cycle, a circuit will be completed in a manner similar to that described above from emitter hub E19 through the 17th position of keyboard storage to energize relay R154 indicative of the digit "2" stored in this position. At 10 degrees of this cycle, when cam contacts P9 are closed, a circuit will be completed to energize relay R147 (Fig. 41p), which circuit extends from the pick coil of the relay through contacts R146b transferred and (L34 to Fig. 41h) cam contacts P9 transferred to conductor L4. Relay R147 is held energized by a circuit extending from the hold coil through its transferred a contacts (L35 to Fig. 41s), rectifier K32 and (L36 to Fig. 41e) cotacts R9b, R19a, R58h transferred and R55f transferred to conductor L4. The digit desired to be punched in column 19 of the new balance card will comprise a summation of the digit "2" in the 17th position of keyboard storage, the digit "7" punched in column 19 of the old balance card and the "1" carry form the previous accumulation. Thus when cam contact P5 is transferred during this cycle to punch in column 20 of the new balance card the zero representative of the sum of the digits "5" and "5," a circuit will be completed to reenergize the zero interposer magnet to initiate escapement and subsequent punching of the digit zero in column 19 of the card. This circuit extends as before at 86 degrees from the sensing pin common 434 (Fig. 41p), through the "7" contacts 426, contacts R134k transferred, the "7" wire to Fig. 41r and contacts R147m transferred, R160e, R157c, R154d transferred, R151d to the "0" wire of the network shown and as before through the zero interposer magnet 404. A circuit similar to that previously described is also available to energize relay R146 to condition the machine to add in the "1" carry on the next accumulating cycle.

The above sequence of operations will be continued to escape the new balance card into column 18 and punch an accumulated digit "4" into this column. The advance of the new balance card into column 18 previous to the punching of this last column of the "Accumulated Issue" field will be accomplished in conjunction with the stepping of the column emitter, program card and old balance card into column 17. The hold circuit through the PC12 contacts to relays R27 and R28 will thus be open but coincident with this occurrence plug wiring provided to condition the machine for the duplication of the "Minimum Stock Level" field from one card into the other and also for the reading of the information in this field into a relay storage unit will prevent deenergization of relays R27 and R28.

(c) Previous to this last punch cycle of the accumulating and punching of the "Accumulated Issue" field, a circuit is completed (Fig. 41d) from the emitter hub E17, through distributor D13 and the transferred b contacts of selector relay S10 (E23 to Fig. 41h) to the duplicate entry hub which circuit will initiate the duplication of the minimum stock level field of columns 17, 16 and 15 from the old to the new balance card. This duplicating operation will proceed under control of the "12" punches in columns 16 and 15 of the program card in a manner similar to that outlined in subdivision (a) above of this step for the part number field. The completion of this circuit will prevent the deenergization of relays R27 and R28, which relays will now be held energized for the duplicating operation.

A second plug wire extends from hub E17 to complete a circuit to condition the machine to energize a storage relay in the comparing unit indicative of the digit sensed in column 17 of the old balance card. This circuit extends (Fig. 41d) from hub E17 through distributor D13 and the transferred d contacts of selector S9 (L7 to Fig. 41s) to the units position hub of stock entry control and thence through the pick coil relay R175. This circuit will be available to maintain relay R175 energized until cam contacts P1 are closed to again energize relay R9 to open contacts R9b (Fig. 41e) in the circuit to the emitter terminal 642. Previous to this time cam contacts P5 are again closed to complete a circuit through the "5" sensing pin contacts 426 (Fig. 41p), contacts R143h and the "5" wire to energize the five interposer magnet anticipatory of punching a "5" in column 17 of the new balance card during the next punching cycle. At the same time a second circuit extends from the "5" sensing pin contacts through contacts R143h down to the "5" wire in Fig. 41p and thence to the right to Fig. 41s to rectifiers K42 and K43. From these rectifiers parallel circuits are completed through contacts R140f and R175b transferred to energize relay R201, and through contacts R140h and R175d transferred to energize relay R201. The relays R201, R202, R203 and R204 are representative of the digits "1," "2," "4" and "8" respectively and comprise the units position of relay storage. Relays R201 and R203 now energized together representative of a digit "5" are held energized by a circuit extending from their hold coils through their transferred a contacts and (L38 to Fig. 41c) cam contacts CF7 to line L1. This circuit is maintained under control of cam contacts CF7 which remain closed until early in the next card feed cycle. This sequence of operation will be continued during the next two escapement and punching operations, relays R174 and R182 respectively being energized to condition the circuitry for the reading of the digits in columns 16 and 15 of the old balance card into tens and hundreds position of relay storage.

As a result upon completion of the punch cycle during which the "4" in column 15 of the old balance card is sensed, relay R195 (Fig. 41s) will have been energized to represent the "4" in the hundreds position of storage; none of the relays R197 through R200 will be energized since the tens position is representative of a digit zero, and relays R201 and R203 will have been energized representative of a digit "5" in the units position. The minimum stock level will thus be duplicated in the new balance card and also stored in this relay storage unit to be available for subsequent comparison with the amount to be left on hand after the present transaction is completed. After the escapement step which advances the new balance card to column 15 and the program card, old balance card and emitter to column 14, and previous to the subsequent punch cycle during which the "4" sensed in column 15 of the old balance card is to be punched into column 15 of the new balance card, circuits are completed to condition the machine for the accumulating and punching operation to be performed on the "Due Out" field in columns 14, 13 and 12 of the card.

(d) Since the transaction being considered in the present problem represents the shipping of a number of stock items under an order previously received, it is necessary to diminish the "Due Out" field by the amount of the transaction. Subtraction in the present machine is accomplished by the well known nines complement method, which method involves the translation of the digits of the subtrahend to their nines complements and the addition of these digits in the complement form to the true digits of the minuend. However, in order to obtain the correct difference in using such a method, it is necessary to make provision to add an additional "1" into the units position of the difference in all cases where the minuend is larger than the subtrahend. Thus in the present problem the nines complement "974" of the transaction amount "025" (subtrahend) will be combined digit by digit with the present balance of the "Due Out" field "075" (minuend) with provision being made to increase the result in the units position by 1 in order to reach the correct difference of "050."

The operation for this procedure is initiated by the completion of a circuit to energize the minus relay R63 which circuit extends in Fig. 41d from emitter hub E14 through distributor D11 and contacts S7d transferred (L39 to Fig. 41e) to the minus entry hub and thence through contacts R78c and R55e transferred to relay R63. A parallel circuit is also completed at this time to energize the plus relay R61 which circuit extends from the R78c contacts through the rectifier K8 which will pass current in this direction and thence through relay R61. Energization of relay R61 will effect energization of relays R140 and R143 and will prevent deenergization of relays R27 and R28 in the same manner as was described in subdivision (b) of this step with reference to the "Accumulated Issue" field. The closing of the contacts R63c will effect energization of relay R137 (Fig. 41h) at 10 degrees of this last punch cycle for the "Minimum Stock" level field through a circuit extending from conductor L4 through contacts P3 and R63c transferred to the pick coil of relay R137. The purpose of energizing relay R137 and transferring its contacts (Fig. 41m) is to set up the network to the add relays so that the nines complements of the digits read from the storage keyboard will be read into the add relays. Also at 10 degrees of this cycle relay R147 (Fig. 41p) will be energized by a circuit extending from the pick coil and through contacts R63b transferred and (L34 to Fig. 41h) cam contacts P9 transferred to conductor L4. Relay R147 is held energized until contacts R9b are opened at 80 degrees of this punch cycle, through a circuit described in reference to the addition of the "Accumulated Issue" field in subdivision (b) above. Relay R147 is energized and its contacts (Fig. 41r) transferred to condition the adding network to increase the result in the units position now being accumulated by "1" which is necessary for the correct computation of a difference using the present nines complement method of subtraction.

29 (45) WRIGHT 99164 Day Patents Wed., 18 March

The circuit to energize the add relays indicative of the nines complement "4" of the digit "5" of the transaction amount extends from the emitter hub E14 (Fig. 41d), through distributor D11, contacts S7c transferred (W9 to Fig. 41n), through the commutator for the 18th position of keyboard storage and thence along the "5" wire of the network shown to (Fig. 41m) and through contacts R131g, R134g, R137m transferred (L40 to Fig. 41n), rectifier K66 and contacts R140d transferred to relay R157, which relay is representative of the digit "4." It should here be reiterated that the above described circuits are available just previous to and in the early part of the last punch cycle of the operation for the "Minimum Stock Level" field during which cycle the digit "4" is punched and printed in column 15 of the new balance card. Thus at 86 degrees of this cycle, when cam contacts P5 are closed, a circuit will be completed through the "5" sensing pin contacts 426 (Fig. 41p), now transferred due to the presence of a 5 punch in column 14 of the old balance card. This circuit extends through contacts R143h transferred, the "5" wire of the network to Fig. 41r and thence through contacts R147j transferred, R160d, R157e transferred, R154c, R151 and the "0" wire of the network to the zero interposer magnet 404 (Fig. 41k). Energization of the zero interposer magnet will in a manner previously described initiate an escapement and subsequent punch style to effect printing and punching of the digit "0" in column 14 of the new balance card. Since the accumulation of this units position necessitates the carrying into the next order, a circuit is also completed to energize the carry relay R146 in conjunction with the energization of the zero interposer magnet, which circuit extends from the transferred j contacts of relay R147 (Fig. 41r), through rectifier K25 and contacts R157n transferred (L32 to Fig. 41p), to the pick coil of relay R146. Relay R146 will be held energized and relay R147 energized for the next accumulating operation in the same manner as was described in reference to the accumulating of the "Accumulated Issue" field in subdivision (b) of this step. The above described sequence will be repeated to combine the nines complements "7" and "9" of the digits "2" and "0" in storage keyboard positions 17 and 16 with the digits "7" and "0" in columns 13 and 12 of the old balance card to punch the resulting digits "5" and "0" in columns 13 and 12 of the new balance card. In this manner the "Due Out" field in the new balance card is adjusted to represent the proper amount for this classification after completion of the present transaction.

(e) Previous to the last punching cycle of this last described operation, at which time the emitter will have been advanced to column 11, a circuit will be completed from the emitter hub E11 to initiate the duplication of the "Due In" field in columns 9, 10 and 11, which duplication will be accomplished in the same manner as was the duplication of the "Part Number" field described above in sub-division (a) of this step.

(f) The next functional operation to be performed is with reference to the "On Hand" field in columns 6, 7 and 8, which field is to be adjusted by the subtraction of the amount of the present transaction. The amount of this field, as it is thus adjusted, is recorded by punching and printing on a new balance card and is also compared digit by digit with the minimum stock level previously stored in the storage relays of the comparing unit in order to ascertain whether the transaction will reduce the stock on hand below the desired minimum level. This comparison is accomplished in the present invention using a method which is based on the principles of direct subtraction. In the normal process of direct subtraction when an order digit of the minuend is less than the corresponding order digit of the subtrahend, it is necessary to borrow "1" from the next higher order digit of the minuend. The same result may be accomplished by adding a "1" to the next higher order digit of the subtrahend and then subtracting the thus increased subtrahend digit from the minuend digit in that order. When this function of borrowing from the next higher order is needed in the subtraction from the highest order digit of the minuend, it is apparent that the entire minuend amount is less than the subtrahend amount. The comparing circuitry in the present machine utilizes this borrowing principle to indicate which of the two amounts is greater. The adjusted on hand amount is treated as the minuend and the minimum stock level amount is treated as the subtrahend. Provision is made to compare the digits of these amounts order by order, and in orders where the on hand digit is less than the minimum stock level digit to so indicate by setting up borrowing circuitry which will be effective to add a "1" to the next order digit of the minimum stock level amount and to cause comparison of this increased digit with the on hand digit for that order. When the comparison of the highest digit of the on hand amount with the corresponding minimum stock level digit actuates the borrowing circuitry, other circuits may then be controlled to indicate that the transaction has resulted in decreasing the number of items on hand below the desired level. In the present problem the old balance on hand amount of "508" items is to be reduced by a transaction of "25" items to a new balance of "483" items which new balance is to be compared as it is developed digit by digit with a minimum desired stock level of "405" items. The circuits necessary to perform this operation will now be described.

After the escapement of the program card, old balance card and emitter to column 8 and of the new balance card to column 9 anticipatory of duplicating the high order position of the "Due In" field, plug wire connections similar to those previously described from the emitter hub E8 (Fig. 41d), through transferred selector contacts to the minus entry hub (Fig. 41e), and to the units position hub for stock level entry (Fig. 41s), complete circuits to energize relays R61, R63 and R175. The energization of relays R63 and R61 will, as has been previously described, prevent the deenergization of relays R27 and R28 and will also cause energization of relays R137, R140 and R143 to condition the machine for subtracting operations. Relay R147 will also be energized as before during the subtraction in the units order position. Relay R175 (Fig. 41s) is held energized by a circuit from hold coil through contacts R175a transferred, R137b transferred, and (L41 to Fig. 41h) P7, and conductor L4. With relay R175 held energized the circuitry is conditioned to compare the units order digit as adjusted by the above subtraction with the digit "5" previously stored in this position through the energization of relays R201 and R203. A third plug wire connection from the hub E8 extends through transferred selector points to the entry hub for the 18th position of keyboard storage (Fig. 41n), from which position the circuit extends through the 18th position fingers positioned to represent a digit "5" and thence through the network to the add relays, as has been described above, to energize the relay R157 representative of digit "4," the nines complement of the stored digit 5. As heretofore described, when cam contacts P5 are closed a circuit will be completed to energize the interposer magnet representative of the difference for this particular order. This circuit extends through the transferred "8" sensing pin contacts 426 (Fig. 41p) and contacts R143m transferred, R147f transferred (Fig. 41r), R160m, R157h transferred, R154g, R151h and the "3" wire of the network to the "3" interposer magnet 404 (Fig. 41k).

At the same time a parallel circuit is available to the comparing relay group (Fig. 41s), comprising relays R163, R165, R166 and R167 which relays are indicative of the digits "1," "2," "4" and "8," respectively. This circuit extends from the R151h contacts (Fig. 41r) to rectifiers K39 and K40 (Fig. 41s) and thence by parallel circuits through the transferred f and g contacts of relay R140 to and through the pick coils of relays R163 and R165 to energize these two relays. Relays R163 and R165 are held energized through their transferred a contacts and (L41 to Fig. 41h) cam contacts P7. The relay R177 (Fig. 41s) is utilized to indicate the result of the comparison between the digits being compared and, where the minuend or on hand digit in the particular order being compared is less than the corresponding subtrahend or stock level digit relay R177 will be energized to indicate this condition and also to set up the circuitry to, in effect, add a "1" to the next highest order digit of the subtrahend when it is being compared with its corresponding minuend digit. A testing circuit for relay R177 in the units order extends from conductor L4 (Fig. 41h) through cam contacts P7 and (L41 to Fig. 41s) relay contacts R137b transferred (L42 to Fig. 41t), R172f, R174f, R175f transferred, R204b, R201b transferred, R202b, R203b transferred to contacts R178g. The circuit to this point has been controlled by the condition of the storage relays R201 through R204, relays R201 and R203 now being energized to indicate a subtrahend digit of "5." The circuit from this point to relay R177 is dependent upon the condition of the comparing relays R161, R163, R164, R165 which indicate the minuend or in the present problem adjusted "On Hand" digit. Since relays R161 and R163 are energized representative of the digit "3," which digit is less than the digit "5" represented by the energization of relays R201 and R203, it is possible to complete a circuit from contacts R178g through the network of comparing relay contacts to energize relay R177. This circuit extends from the R178g contacts through contacts R163d transferred, R166b, R167b and (L43 to Fig. 41s), R68d to and through the pick coil of relay R177. Relay R177 is held energized through its transferred a contacts and (L33 to Fig. 41h) cam contacts P10 completing a circuit to conductor L4.

Figure 41S:
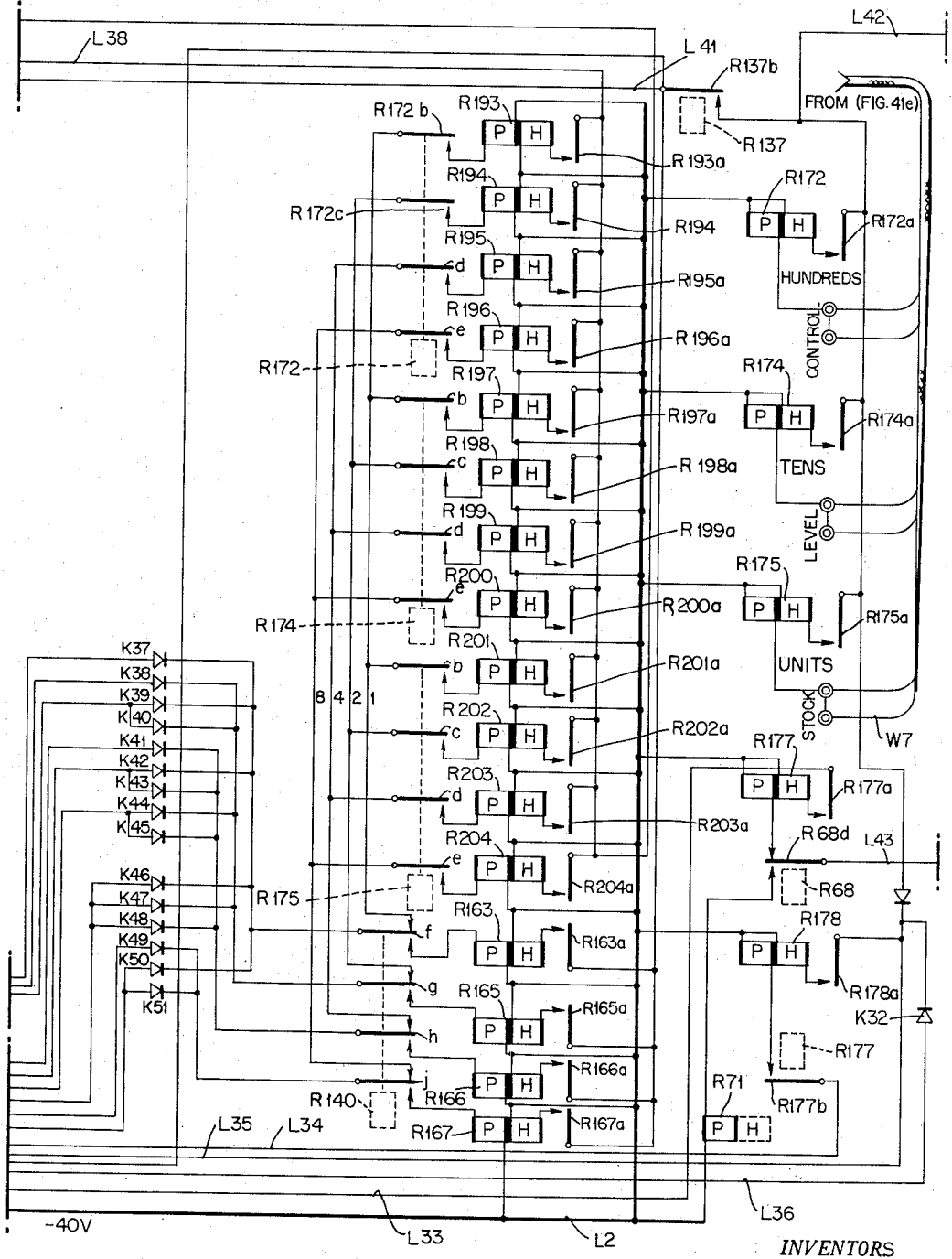
Figure 41T:
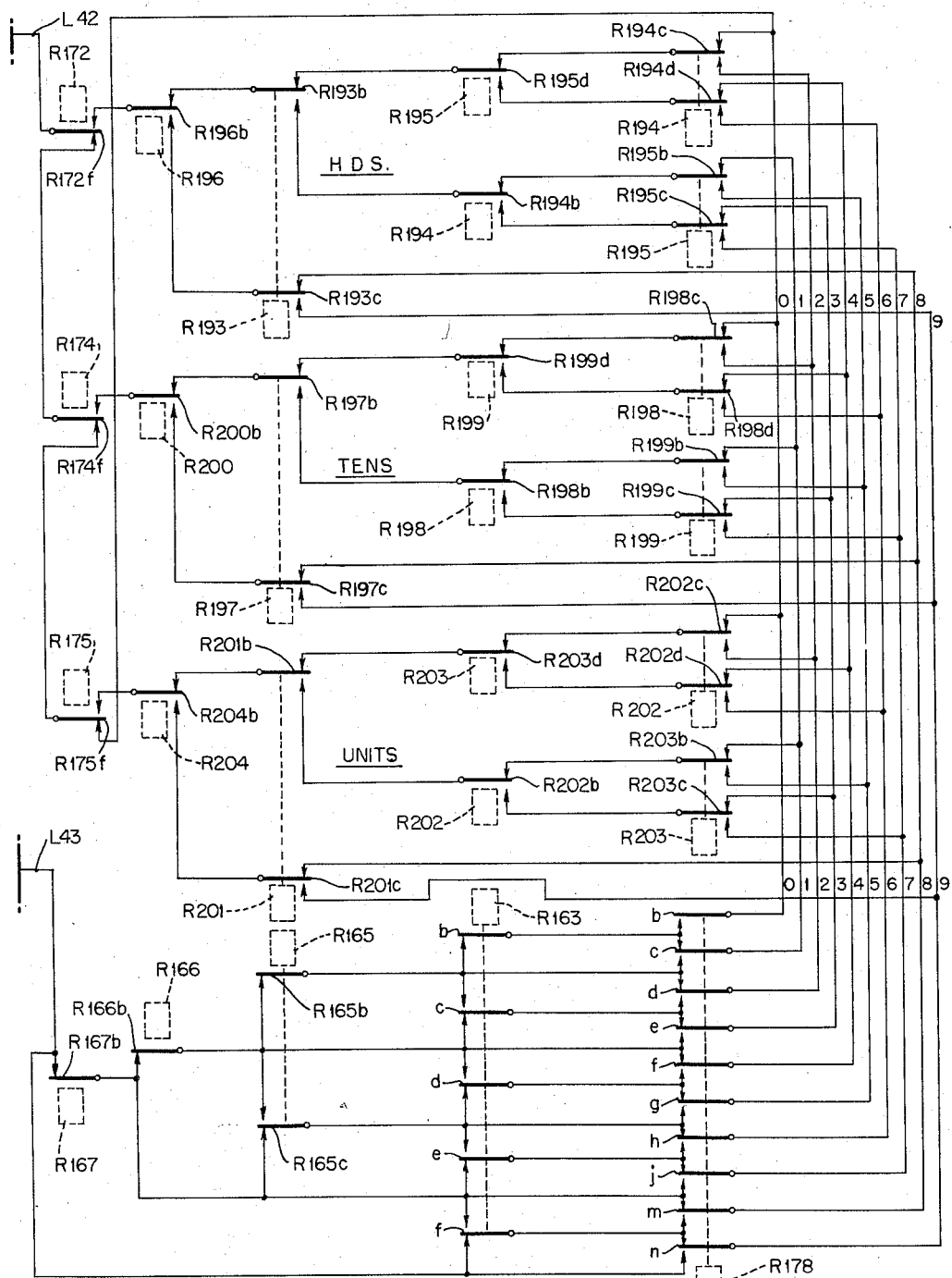

Upon completion of this punch cycle during which relay R177 was energized, the operation to subtract and record the adjusted "On Hand" amount will continue, the new balance card being escaped to column 8 and the old balance card, emitter and program card being escaped to column 7, at which time a punch cycle will be initiated to punch the digit "3" in column 8 of the new balance card and to adjust and compare the tens order of the "On Hand" field. At the beginning of this cycle, the tens order entry control relay R174 (Fig. 41s) will be energized by plug wire connections from hub E7 to transfer the R174f contacts (Fig. 41t) and direct the testing pulse from cam contacts P7 through the contacts of the tens order storage relays, which relays since they are now representing a digit "0" in this position of the stock level field are all in the deenergized condition. At ten degrees of this punch cycle, relay R178 (Fig. 41s) is energized by a circuit from the pick coil through the contacts R177b transferred and (L34 to Fig. 41h) cam contacts P9 to conductor L4. The transferring of the contacts of R178 (Fig. 41t) will in effect increase by "1" the minuend digit being compared on this cycle. The accumulation of the new balance digit "8" for the tens order of the "On Hand" field will effect energization of the comparing relay R167 (Fig. 41s). Since the digit "0" of the minimum stock level even when increased by "1" due to the energization of relay R178 is less than the digit "8," relay R177 will not be energized during this cycle. Tracing the testing circuit from the transferred f contacts of relay R174 (Fig. 41t) through the normally closed contacts of the tens order storage relays to the "0" wire, and thence through the transferred R178b contacts, it can be seen that the contacts R167b now being opened will prevent completion of a circuit to energize relay R177. At 240 degrees of this punch cycle, cam contacts P7 (Fig. 41h) will open to deenergize relays R167 and R174, the result of the above comparison being indicated only by the failure to energize relay R177 during the cycle.

The next following punch cycle will be effective to punch the digit "8" in column 7 of the new balance card and also to compare the digits "4" of the hundreds order of the "Minimum Stock Level" and adjusted "On Hand" field. Relay R195 (Fig. 41s) has been previously energized indicative of the "4" in the hundreds position of the "Minimum Stock Level" field and the accumulation of the digit 4, as a result of adjusting the hundreds order of the old balance "On Hand" amount during this cycle will cause energization of comparing relay R166 (Fig. 41s). A plug wire connection from emitter hub E6 (Fig. 41d) will at the beginning of this cycle complete a circuit through distributor D3, selector contacts S2b transferred, S1c transferred, wire W10 to the balance test hub in Fig. 41e and thence through contacts R137p transferred to energize relay R68. The energization of relay R68 and transferring of contacts R68d (Fig. 41s) is accomplished during this last cycle of comparing in order that the test impulse through the P7 contacts during the cycle will, if the stock level digit is greater than the corresponding "On Hand" digit, complete a circuit to energize relay R71 (Fig. 41s), instead of the borrow control relay R177. The necessity of borrowing during the subtraction from the high order position of the minuend or "On Hand" field as has been previously explained indicates that the stock has been reduced below the desired level. If such is the case and relay R71 is energized, circuits are then available to light a light or if desired to control subsequent machine operations. In the present problem, since the digits in the highest order compared are both "4" and thus relays R195 and R166 are energized, the test impulse through the transferred f contacts of the stock level control relays R172 (Fig. 41t) will not be effective to energize relay R71. If in fact the transaction in a given problem was sufficient to reduce the "On Hand" balance below the desired minimum stock level, relay R71 would be energized as a result of the comparison of the highest order digits. Once energized, relay R71 would be held energized by a circuit from the hold coil (Fig. 41c) through the contacts R71a (L44 to Fig. 41a), and R41f transferred to line L1. The closing of contacts R71d (Fig. 41a) completes a circuit from line L1 through the error light to the minus 40 volt line L2. It should also be noted that transferring of contacts R71b (Fig. 41b) would, during the subsequent feed cycles, make a pulse available at the low stock level exit hub, which pulse through proper plugboard connections, might be utilized to control further machine operations. This circuit extends from line L1 (Fig. 41j), through cam contacts CF8 when these contacts are closed at 20 degrees of a subsequent feed cycle and then (L45 to Fig. 41b) through contacts R41p transferred, R38e, R53c, and R71b transferred to the low stock level exit hub. In the present problem being considered, relay R71 not being energized, this circuit will extend through contacts R71b in the position shown and the pulse will be available on subsequent feed cycles at the high stock level hub.

Upon escapement of the program card, emitter, and old balance card, into column 5 and of the new balance card into column 6 anticipatory of punching the digit "4" in column 6 of the new balance card, the program cam contacts PC12 will open to deenergize the functional relays for this last operation and the PC5 contacts will open to end the reverse stepping operation and initiate the forward skipping of the cards completely past the punch and read lines.

(g) As a result of the opening of program contacts PC5 (Fig. 41h), as the program card is escaped into column 5, tube T3 (Fig. 41g) will be rendered nonconductive and relay R52 deenergized to condition the circuitry to deenergize the forward escape magnet 249 and reverse solenoid 240 and energize and hold the reverse escape magnet 255 anticipatory of the forward stepping operation to follow. When during the last punch cycle of the above-described operation, the cam contacts P9 are closed, a circuit will be completed to energize relay R32, which circuit extends in Fig. 41h from conductor L4 through the cam contacts P9 transferred and relay contacts R52c, and R55j transferred to the pick coil of relay R32. Relay R32 is held energized by a circuit extending from the hold coil (Fig. 41g) and thence through contacts R32a transferred (L17 to Fig. 41f), R52d and (L46 to Fig. 41e) through the transferred solenoid contacts 231a to conductor L4. Energization of relay R32 will transfer contacts R32d (Fig. 41f) to break the circuit to the grid of tube T2 and thus cause deenergization of the forward escape magnet 249. With contacts R52a and R52b (Fig. 41e) now open, relay R58 and the reverse solenoid 240 (Fig. 41f) will also be deenergized later in this punch cycle, when the cam contacts P11 are opened. The deenergization of the reverse solenoid will open the associated contacts 231a and thus break the circuit holding relay R32 energized. Tube T3 (Fig. 41g) will now be rendered conductive and the reverse escape magnet 255 held energized by a circuit from the grid of the tube through contacts R58d (L72 to Fig. 41f), R32d and (L5 to Fig. 41c) R8c to line L1. With the reverse solenoid 240 and forward escape magnet 249 deenergized, the drive to the escapement mechanism will now be urging the feed wheel 194 (Fig. 2) in a counterclockwise direction but engagement of the armature 251 (Fig. 11a) with the escape wheel 250 will prevent any rotation. Relay R25 (Fig. 41j) in the plate circuit of tube T11 can now be energized to initiate the skipping operation by a circuit extending from the grid of the tube through rectifier K10 and thence (L47 to Fig. 41e) through contacts R54b (L48 to Fig. 41e), R32f, R58h and R55f transferred to conductor L4. Parallel circuits heretofore described in Step 3a are available from the rectifier K10 (L6 to Fig. 41f), through the transferred R25d contacts to now energize relay R9 and the forward escape magnet 249 (Fig. 41g), relay R25 will, as before explained, be held under control of the program cam contacts PR2 (Fig. 41c) and PR1 (Fig. 41h), until the program drum has been advanced past column 88 to column 1 and the old and new balance cards have been advanced past the read and punch stations, respectively. Incidental to the above operation, the transferring of program cam contacts PP2 will also deenergize relay R4 (Fig. 41c).

Step 9.—When cam contacts PR2 are transferred as the program drum is being escaped past column 81 in the above-described operation, a circuit is completed to energize the card feed clutch and thus initiate a third card feed cycle. This circuit extends in Fig. 41c from line L1 through the transferred PR2 contacts and relay contacts R41e trasferred, R35d, R44e, R47e, R50d and R53b to and through the card feed clutch magnet 44. No circuit is available at this time to energize the card feed latch magnet 78 nor the select stacker solenoid 342, so that the following will be accomplished during this third card feed cycle.

(a) A second card will be fed from the magazine 10 to the pre-registration position A (Fig. 2), which card will be referred to as a transmittal card. Since on the previous card feed cycle (Step 7), no card was advanced to this punch pre-registration position, no card will now be advanced to the punch station during this feed cycle.

(b) As an integral part of this feed cycle, the roller 277 (Fig. 1) will be lowered against the new balance card to advance the card to the read station with column 1 coincident wtih the read line E—E.

(c) As this is occurring, rollers 275a and 277a will advance the old balance card to position F (Fig. 2), at which time the stacker pushers 362 and associated mechanism which, as has been before explained, operate during a card feed cycle will be effective to advance the old balance card into the stacker position 14.

During this third card feed cycle, the following circuitry is effective to condition the machine for subsequent operations. The closing of cam contacts CF8 will cause energization of relay R47 (Fig. 41b) by a circuit which extends from the pick coil of the relay through contacts R17b, R44b transferred, R53c, R38e, R41p transferred and (L45 to Fig. 41j) cam contacts CF8 to line L1. Relay R47 is held energized by a circuit from the hold coil (Fig. 41b) and (L49 to Fig. 41a), through contacts R47a transferred, R50a and R36b to line L1. Relay R44, which has been maintained energized by a circuit through the R47a contacts in the position shown, will now be held energized until late in this feed cycle under control of the cam contacts CF2 by a circuit extending in Fig. 41c from line L1 through the CF2 contacts as shown and (L10 to Fig. 41a) through rectifier K2 and (L50 to Fig. 41b) contacts R44a transferred and the hold coil of relay R44. At 70 degrees of this card feed cycle relay R53 (Fig. 41b) will have been energized by a circuit extending from the pick coil through contacts R44j transferred (L51 to Fig. 41c), R38c, R35c and cam contacts CF3 transferred to line L1. Relay R53 will be held energized by a circuit extending in Fig. 41b from the hold coil through contacts R53a transferred and (L52 to Fig. 41a) R4d to Line L1. Late in this third card feed cycle after the cam contacts CF2 are opened and relay R4 is deenergized, the card being fed from the magazine 10 will close the punch card lever contacts 107a (Fig. 41c), which closure will as before effect energization relay R3. Thus, as a result of the above described operation at the end of the present card feed cycle relay R44 will have been deenergized, and relays R3 and R53 will have been energized.

Another incident of this third card feed cycle is the conditioning of the machine circuitry to be effective to energize the select stacker solenoid 342 during the subsequent feed cycle when the new balance card is being stacked in order that that card will be stacked in the alternate stacking position 12 (Fig. 2). Referring to Fig. 40, there is provided a plug wire connection W12 from the high stock level hub to the "2" select stack entry hub. As has been explained in Step 8(f), the high stock level hub will receive an impulse through cam contacts CF8 on all subsequent card feed cycles, since the comparison therein accomplished indicated that the adjusted "On Hand" amount was greater than the minimum stock level desired and thus relay R71 was not energized. The circuitry to effect selective stacking of the new balance card will be operative only when the "On Hand" amount is not diminished below the prescribed minimum during a particular transaction. Upon closing of the contacts CF8 during this card feed cycle, a circuit will be completed from the high stock level hub (Fig. 41b) by plug wire W12 to the card "2" select stack entry hub (Fig. 41c) and thence through contacts R44h transferred to and through the pick coil of relay R7. A hold circuit from the hold coil of relay R7 (Fig. 41c) extends through contacts R7a transferred and (L11 to Fig. 41a), R53d transferred to line L1.

During this third card feed cycle, the machine circuits also are conditioned in anticipation of the functional operation to be performed with reference to the transmittal card now being advanced to the re-registration position A. After relay R47 is energized upon the closing of cam contacts CF8 and before relay R44 is deenergized upon opening of cam contacts CF2, a circuit is available to transmit an impulse to the control panel card cycle hub CC3, which circuit extends in Fig. 41c from line L1 through contacts CF5 transferred, R35b, R50c, R44d transferred and R47d transferred to hub CC3. Plug wire connections W14 and W15 (Fig. 40), from the hub will complete a circuit to energize selector relays S13 and S19 which selectors will be maintained energized until the next feed cycle by a circuit extending in Fig. 41a from the hold coils through their transferred a contacts and contacts R53d transferred to line L1.

Step 10.—Due to the above conditioned circuitry, a fourth card feed cycle will now take place which cycle is continuous with the preceding operation. When cam contacts CF2 are closed near the end of the last described card feed cycle, the card feed clutch will again be energized by a circuit extending, in Fig. 41c, from line L1 through contacts CF2 transferred R44f, and R53b transferred to the card feed clutch magnet 44.

(a) During this card feed cycle, since neither of the register magnets 147 nor 149 (Fig. 11a) are energized, the column zero pusher arm 136 (Fig. 10) will be effective to advance the transmittal card from the punch pre-registration position A to the punching station in position B of Fig. 2, with column 0 coincident with the punch line C—C.

(b) Since the card feed latch magnet 78 (Fig. 5) is deenergized, a third card which will be referred to as a transaction card will during this feed cycle be advanced from the magazine 10 to the punch pre-registration position A.

It should be noted that the new balance card having been previously advanced to the reading station (Step 9b) will not be affected by this present feed cycle, the card stop 320 (Fig. 15) being effective to prevent further advancing of the card by rollers 275 and 277.

Due to the transferring of contacts R3a upon energization of relay R3 late in the third card feed cycle, relay R4 will be reenergized at 70 degrees of this fourth card feed cycle by a circuit extending in Fig. 41c from line L1 through contacts CF3, R35c, R41b transferred and R3a transferred, to and through the pick coil of relay R4. Relay R4 is held energized by a circuit extending from the hold coil through contacts R4b transferred and PR2 in the position shown to line L1. The transfer of contacts R4c (Fig. 41c) will again complete a circuit from line L1 to conductor L4, so that the conducter will be at a potential of zero volts for the functional operation to follow.

The transferring of contacts R4d (Fig. 41a) will open the circuit to the hold coil of relay R53 (Fig. 41b), causing deenergization of that relay and opening of the R53d contacts in Fig. 41a. However, selector relays S13 and S19 and relay R7, which were heretofore maintained energized by a circuit through the transferred R53d contacts, will remain energized until early in the next or fifth card feed cycle under control of cam contacts CF6 and CF7. This circuit extends in Fig. 41c from line L1 through the contacts CF6 and CF7 and thence in parallel through contacts R7a to the hold coil of relay R7 and along conductor L11 and the transferred contacts S13a and S19a (Fig. 41a) to the hold coils of selector relays S13 and S19.

The opening of contacts R53b in Fig. 41c will prevent further energization of the card feed clutch at this time, so that as a result of the above described operation, column 0 of the transmittal card will now be coincident with the punch line C—C; column 1 of the new balance card will be coincident with the read line E—E; the program card and emitter will have been positioned in column 1; and the escapement mechanism is being urged in the forward direction but constrained from rotation by the engagement of the forward escape magnet armature 251 with its associated escape wheel 250 (Fig. 8).

Step 11.—Circuits are now conditioned during this fourth card feed cycle to initiate the skipping of the program drum, emitter and new balance card to column 6 and the transmittal card to column 5 anticipatory of the duplicating operation to follow.

After contacts R4c (Fig. 41c) have been closed at 70 degrees of the above described card feed cycle, by which time the transmittal and new balance cards have advanced to the read and punch lines (see Fig. 35), a circuit will be completed to transmit an impulse to the emitter hub E1 which circuit extends in Fig. 41e from conductor L4 through contacts R55f, R38d, R19a, R9b, R65f and conductor L22 to the emitter common 642 (Fig. 41d), and thence through the finger 640 to hub E1. Plug wire connections are provided to complete a circuit from this hub through selector contacts S19b transferred to the skip entry hub (Fig. 41e), and thence to and through hold coil of relay R21. A circuit under control of cam contacts P10 (Fig. 41h) is then available to hold relay R21 energized through its transferred a contacts. Relay R9 is now energized since a circuit is available from the grid of tube T4 (Fig. 41g), through (L8 to Fig. 41f) contacts R22c, R24c, R25d, R41g transferred and R21b transferred (L53 to Fig. 41e), to conductor L4. Opening of contacts R9b interrupts the impulsing circuit to the emitter hub E1. Closing of the R9a contacts in the plate circuit of tube T5 (Fig. 41g) will hold relay R9 energized, since tube T5 is now rendered conductive by a circuit extending from the grid of this tube and (L9 to Fig. 41f), through contacts R21f transferred

45 and (L5 to Fig. 41c), R8c to line L1. Another circuit in parallel to the circuit to the grid of tube T4 is also provided to effect energization of the forward escape magnet 249 which is in the plate circuit of tube T2. This circuit proceeds from the grid of tube T2 through contacts R58c and R32c to conductor L8, and thence to conductor L4 as above described. Energization of the forward escape magnet 249 will effect closing of the associated contacts 245 (Fig. 41f), to complete another parallel circuit to render tube T6 conductive and thus effect energization of relay R22. This circuit extends in Fig. 41g from the grid of tube T6 through (L28 to Fig. 41f) the forward escape magnet contacts 245 transferred and contacts R58j to the R25d contacts and thence to conductor L4 as above explained.

The hold coil of relay R22 is held energized by a circuit extending in Fig. 41g from the coil through (L54 to Fig. 41f) contacts R22a transferred and (L55 to Fig. 41e) cam contacts P2 to conductor L4.

The energization of the forward escape magnet and subsequent energization of relay R22 to open the R22c contacts in the circuit to the grid of tube T2 will in the same manner as described for reverse escapement effect a single stepping operation of the escapement mechanism. This single stepping operation will be effective to advance the program card emitter and new balance card to column 2 and the transmittal card at the punch station to column 1. In order to complete proper holding circuits so that skipping operation may proceed under control of field definition "11" punches in the program card, it is necessary at this time to initiate a punch cycle. A circuit is thus available through tube T7 to energize the punch clutch magnet 419 upon this tube being rendered conductive by a circuit extending from its grid through (L16 to Fig. 41e) contacts R22d transferred to conductor L4. During this punch cycle, relay R25 will be energized, since upon the closing of cam contacts P3 tube T11 in Fig. 41j will be rendered conductive by a circuit from the grid of the tube through rectifier K10 and (L47 to Fig. 41h), relay contacts R54b, R24b, R21d transferred and P3 to line L4. Relay R25 will be held energized under control of a circuit through the program contacts PC11 now closed due to the presence of an "11" punch in column 2 of the program card (see Fig. 30). This circuit extends as before from line L1 to the program contact common 454 (Fig. 41h) and thence through the PC11 contacts and relay contacts R47h transferred, R50f, R25a transferred, R54b and (L47 to Fig. 41h) rectifier K10 to the grid of tube T11. The punch clutch magnet 419 (Fig. 41g) will be deenergized upon opening of cam contacts P1 during the punch cycle, so that only a single punch cycle is completed. The transferring of the f contacts of relay R25 (Fig. 41f) completes a parallel hold circuit to the grid of tube T5, so that relay R9 will remain energized after the R21f contacts are opened. Relay R21 (Fig. 41e) is deenergized upon the opening of cam contacts P10 and relay R22 (Fig. 41g) is deenergized when cam contacts P3 are opened, allowing the R22c contacts (Fig. 41f) to close and thus effect energization of the forward escape magnet by rendering tube T2 again conductive. This circuit extends in Fig. 41g from the grid of this tube and through contacts R58c, R32e (L8 to Fig. 41f), R22c, R24c, R25d transferred and then by conductor L6 to the terminal of rectifier K10 (Fig. 41j), from which point the circuit is completed to and through contacts PC11 to line L1 as above described with reference to the hold circuit for relay R25.

Thus, relay R25 and the forward escape magnet 249 will remain energized under control of the "11" punches in the program card until column 6 is reached, at which time the PC11 contacts will be opened to end the skipping operation with the transmittal card in column 5 at the punch station and the new balance card, emitter and program card in column 6. Upon the deenergization of relay R25 and opening of the R25f contacts (Fig. 41f) relay

46

R9 will also be deenergized closing the R9b (Fig. 41e) contacts to complete an impulsing circuit as before explained to the emitter common 642 (Fig. 41d). Control panel wiring (Fig. 41d) is provided from the hub E6 through distributor D2, the transferred b contacts of selector S13 and conductor L23 to the duplicate entry hub (Fig. 41h). This circuitry will be effective to energize relay R28 in the same manner as was explained in reference to the reverse duplication of columns 23, 22, and 21 into the new balance card (Step 8(a)). As was explained in reference to that step, the first punch cycle is initiated to begin the duplicating operation after which escapement operations and punch cycles take place for the length of the field to be duplicated.

The operation here is similar to that described in Step 8(a) with the exception that with the reverse solenoid 240 (Fig. 41f) being deenergized, the cards will be escaped in a forward direction under control of the forward escape magnet 249. The circuitry is the same as previously described except that the duplicating relays R28 and R27 will now be held under control of the program contacts PC11, and also that for the forward escaping operation relay R58 remains deenergized and its c and d contacts are in position shown in Fig. 41g causing the reverse escape magnet 255 to remain energized to avoid chattering and the forward escape magnet 249 to be intermittently energized to effect required single step advances of the escapement mechanism. In this manner all of the fields of the new balance card in the columns 6 through 23 will be duplicated into the transmittal card, since the field definition 11 punches in the program card (Fig. 30) will sustain the operation until the transmittal card has been advanced to and punched in column 23 and the new balance program card and emitter have been advanced to column 24. With the emitter advanced to column 24, plug wire circuitry is available to transmit the impulse then available at the emitter hub E24 to the skip entry hub (Fig. 41c) to again energize relay R21 and initiate skipping operations similar to that described above with reference to the skipping from columns 1 to 6. Since the program card contains 11 punches in all of the succeeding columns, relay R25 will be held energized under control of the PC11 contacts until column 80 is reached, at which time relay R25 will be maintained in the energized condition in a manner previously explained under control of the program cam contacts PR1 (Fig. 41h) and PR2 (Fig. 41c), so that the new balance and transmittal cards will be skipped completely past the punch and read stations respectively, and the program card and emitter will be again positioned in column 1.

The closing of the program contacts PR1 as the above skipping is taking place will also cause circuitry previously conditioned during Step 9 to effect energization of the select stacker solenoid 342 in anticipation of the stacking of the new balance card in the alternate stacking position 12. The circuit is completed from line L1 through the transferred PR1 contacts (Fig. 41h) to and through relay R5 to energize this relay. A circuit is then available to energize relay R6 and the select stacker solenoid 342, which circuit proceeds in Fig. 41c from line L1 through the parallel cam contacts CF6 and CF7 and relay contacts R5c transferred, R7b transferred, R44c, rectifier K4 and through the parallel connected coils of relays R6, R8 and the select stacker solenoid 342. A parallel hold circuit for these three coils is provided through the transferred R6a contacts under control of cam contacts CF2 which will remain closed until 255 degrees of the following card feed cycle.

*Step 12.*—The transferring of the program contacts PR2 during the above-described skipping operation will be effective to complete circuits to energize the card feed clutch magnet 44 to thus initiate a fifth card feed cycle. This circuit extends in Fig. 41c from line L1 through the transferred PR2 contacts and thence through relay contacts R41*e* transferred, R35*d*, R44*e*, R47*e* transferred, R18*d* and R53*b* to and through clutch magnet 44.

(*a*) During this fifth card feed cycle, neither of the card registration magnets 147 nor 149 will be energized so that the column 0 pusher arm will be effective to advance the transaction card from the punch pre-registration position A (Fig. 2) to the punch station with column 0 coincident with the punch line C—C. Since no circuit is now available to energize the card feed latch magnet 78, another blank card will be advanced from the magazine 10 to the pre-registration position A.

(*b*) This card feed cycle will also be effective in the normal manner to actuate the roller 277 (Fig. 1) to advance the transmittal card to the read station with column 1 coincident with the read line E—E.

(*c*) The roller 277*a* will also be operated in the normal manner to advance the new balance card into the position F, and with the circuits previously described having been effective to energize the select stacker solenoid 342, the gate 340 (Fig. 17) will now be pivoted, so that the new balance card will be allowed to be advanced into the alternate stacker position 12. As the new balance card is thus advanced into the alternate stacker position, the card lever contacts 383 will be closed completing a circuit in Fig. 41*c* from line L1 through the transferred card lever contacts 383 and the transferred R8*a* contacts to and through the hold coil of relay R8. Relay R8 will thus remain energized as long as the new balance card remains in the alternate stacker position 12 and the R8*c* contacts (Fig. 41*c*) will be transferred and held in that position to open the circuit from line L1 to the machine control circuits and thus prevent any further operation until the new balance card is manually removed from the stacker.

Incidental to the above described card feed cycle, circuits are completed to condition the machine for the functional operation to be performed with reference to the transaction card then being advanced to the punch station. Relay R4 will have been deenergized upon the transferring of the program contacts PR2 (Fig. 41) as the card feed cycle is begun. Relay R50 will be energized by a circuit extending in Fig. 41*j* from line L1 through contacts CF8 transferred and (L45 to Fig. 41*b*) R41*p* transferred, R38*e*, R53*c*, R44*b*, R47*b* transferred and R18*b* to the pick coil of relay R50. The hold coil of this relay (Fig. 41*b*) is held energized through its transferred *a* contacts (Fig. 41*a*) and contacts R38*b* completing a circuit to line L1. The transferring of contacts R50*a* (Fig. 41*a*) upon energization of relay R50 will open the circuit previously holding relay R47 energized. However, a further holding circuit to hold this relay energized under control of cam contacts CF2 extends from the hold coil (Fig. 41*b*) and (L49 to Fig. 41*a*) through contacts R47*a* transferred, rectifier K1 and (L10 to Fig. 41*c*), cam contacts CF2 to line L1. Thus, a circuit is available at 50 degrees of this card feed cycle from line L1 through the transferred CF5 contacts (Fig. 41*c*), and thence through contacts R35*b* and R50*c* transferred to the card cycle hub CC4. This impulse is transmitted by plug wires W16 and W17 (Fig. 40) to effect energization of selectors S14, S15, S16, S17 and S18 which selectors are maintained energized in the manner previously described. The closing of the cam contacts CF3 at 70 degrees of this card feed cycle will as before effect the energization of relay R4 and transferring of the R4*c* contacts, so that upon the removal of the new balance card from the stacker and the deenergization of relay R8 conductor L4 will again be at a potential of zero volts.

*Step 13.*—Removal of the new balance card will as explained cause the deenergization of relay R8 and allow the R8*c* contacts (Fig. 41*c*) to again complete circuits from line L1 to the various machine controls. Referring to Fig. 41*d*, plug wire connections are available from the emitter hub E1 through the transferred selector contacts S19*b* to the skip entry hub (Fig. 41*e*), so that in a manner similar to that described in Step 11 the skipping operation will be initiated and continued under the control of the program contacts PCO (Fig. 41*h*), completing holding circuits through the now transferred R50*f* contacts in parallel with the holding circuits described in Step 11 above. Since the program card contains 0 punches in columns 1 through 20, the skipping will continue until the transaction card has been advanced to column 20, and the transmittal and program cards and the emitter have been advanced to column 21. At this time plugboard wire connections are available from emitter hub E21 through the now transferred S14*b* contacts to initiate the duplication of columns 21, 22 and 23 in the same manner as was explained in Step 11 with reference to the duplication performed during that operation.

After the program card, transmittal card and emitter have been advanced to column 24 and the transaction card has been advanced to column 23 prior to the last punching cycle of this duplicating operation, a circuit is available from emitter hub E24 to condition the machine for the subsequent functional operation which is to consist of reading out certain information stored in the storage keyboard unit and punching and printing that information column by column into the transaction card at the punch station. The storage read out relay R64 is thus energized at this time by a pulse from emitter hub E24, through distributor D20 and contacts S14*c* transferred to (W19 to Fig. 41*e*) the storage keyboard entry hub from which point the circuit is completed through the pick coil of relay R64 to line L2. As has been explained with reference to the previous duplicating operations, relays R27 and R28 are held energized under the control of field definition contacts, in this step the PCO contacts in Fig. 41*h* for the extent of the field to be duplicated. The transferring of the *d* contacts of relay R64 will prevent the deenergization of relays R27 and R28 by completing a circuit extending in Fig. 41*j* from the grid of tube T12 and (L25 to Fig. 41*h*) through contacts R2*b*, R24*d*, R64*d* transferred and cam contacts P6 to conductor L4. Closing of contacts R64*e* will at 10 degrees of the punch cycle cause energization of relay R65 by a circuit in Fig. 41*h* from conductor L4, through cam contacts P3 transferred and the transferred R64*e* contacts to and through relay R65 and a resistor to line L3.

The hold coil of relay R65 is in the plate circuit of tube T13 (Fig. 41*j*), which tube now holds the relay energized since the tube is made conductive in parallel with tube T12 by a circuit from its grid through contacts R65*a* transferred and R64*c* transferred to conductor L25, from which point the circuit is completed as above to conductor L4, through the cam contacts P6. Relay R134 (Fig. 41*j*) is also energized and held energized by a similar parallel circuit from its coil and through the transferred *b* contacts of relay R65.

As a result of the above completed circuitry, it is now possible during this punch cycle to read out of the storage keyboard and energize an interposer magnet 404 and close the bail contacts 414, so that the present functional operation continues without interruption upon the completion of the preceding duplicating operation. At 86 degrees of this punch cycle, the cam contacts P5 will be closed completing an impulsing circuit from conductor L4 (Fig. 41*e*), through contacts R27*b* transferred, R65*e* transferred, conductor L22 to the emitter common 642 (Fig. 41*d*), and finger 640 to hub E24. This impulse is then transmitted through distributor D19, the transferred S14*d* contacts and thence (W20 to Fig. 41*n*) to the entry hub for the sixth position of keyboard storage. Since a 5 has been keyed into this position, the impulse will be continued through the 5 segment and along the "5" wire of the network shown to Fig. 41*m* and through contacts R131*g* and R134*g* transferred, and as before through the "5" interposer magnet 404 (Fig. 41*k*). Energization of the interposer magnet will as before effect closing of the interposer bail contacts 414 (Fig. 41*e*) to thus set up the machine on this last punching cycle of the duplicating operation to escape and initiate punching of the information stored in the storage keyboard. It should be noted here that when, as before explained, relay R9 is energized due to the closing of the interposer bail contacts 414 (Fig. 41e), a circuit is non-available from the grid of tube T5 (Fig. 41g) and (L9 to Fig. 41f) through contacts R134p transferred to hold relay R9 energized for the remainder of the operation and thus cause all of the emitter pulses from the emitter hubs E24 through E33 to be transmitted under control of the cam contacts P5.

Relays R27, R28, R64, R65 and R134 are held energized under control of cam contacts P4 until the initiation of the next punch cycle following the escapement of the transaction card into column 24 and of the program and transmittal cards and emitter into column 25, at which time the holding circuit for these relays will be completed through the field definition PCO contacts for the remainder of this operation. The circuit under control of the cam contacts P4 extends in Fig. 41e from conductor L4 through the P4 contacts and (L15 to Fig. 41j) to the R64b contacts. From this point circuits can be completed through the transferred R64b contacts to relay R64; through rectifier K17 and the transferred R134a contacts to relay R134; and through rectifier K16 and contacts R28a transferred directly to the grid of tube T12, and by a parallel circuit through the transferred R64c and R65a contacts to the grid of tube T13. After escapement and closing of the program contacts PCO, a circuit is available in Fig. 41h from the program contact common 454, through the transferred PCO contacts and relay contacts R50f transferred, R28b transferred, R27e transferred, R25b, R21c and thence (L29 to Fig. 41j) in parallel to the grids of tubes T12 and T13 and the pick coil of relay R134. The rectifier K16 (Fig. 41j) will prevent relay R64 from being held energized.

The reading from the storage keyboard position by position and punching and printing of the information read into the card column by column will continue under control of the PCO contacts, which contacts will be opened as the program card is advanced into column 34. During this last punching cycle of the above operation, plug wire connection from hub E34 (Fig. 41d) will complete a circuit through contacts R18c transferred to the skip entry hub to energize relay R21 (Fig. 41e) as before explained and thus initiate skipping operations. The cards will thus be skipped as before under control of the zero punches in columns 35 to 80 until they have been advanced past the read and punch lines, respectively, at which time the program cam contacts PR1 and PR2 will cause continued skipping until the program card and emitter are again positioned in column 1 and the transmittal and transaction cards have been advanced completely past the read and punch stations.

*Step 14.*—The functional operation with reference to the particular transaction discussed being completed, it is now necessary to condition circuits to control the machine to stack the transmittal and transaction cards in the regular stacker position 14. Since it is desired to leave the machine in condition for further functional operations with respect to other transactions, the storage keyboard is also restored during this operation and the card present at the punch pre-registration position A will not be advanced, so that upon completion of the present step the machine will be in the same condition as described upon completion of Step 3 above. The circuitry to control these operations is initiated as transmittal and transaction cards are being skipped past the read and punch lines.

When program cam contacts PR2 (Fig. 41c) are transferred, relay R4 will as previously described be deenergized. Transferring of the PR2 cam contacts will also cause energization of the cam feed latch magnet 78 by a circuit extending in Fig. 41c from line L1 and through contacts PR2 transferred, R41e transferred, R35d, R44e, R47e and R50d transferred to latch magnet 78. A parallel circuit extends through the R38h contacts to energize the register latch magnet 149. The closing of the latch contacts 80 upon energization of the latch magnet completes another parallel circuit to energize the card feed clutch magnet 44 to initiate another (a sixth) card feed cycle, during which the transmittal card will be stacked in the normal stacking position 14, but due to the energization of latch magnets 78 and 149 no further card advance will be accomplished at the feeding stations, the record card at the punch pre-registration position A remaining in that position with no new card being fed from the magazine 10. The card feed latch magnet 78, clutch magnet 44 and register latch magnet 149 will be held energized by a circuit through the latch magnet contacts 80 under control of the cam contacts CF2. The run out relay R35 (Fig. 41b) may now be energized by a circuit from the pick coil through contacts R50e transferred, R47g, R44m, R53c, R38e, R41p transferred and (L45 to Fig. 41j) cam contacts CF8 to line L1. Relay R35 is held energized by a circuit in Fig. 41b from its hold coil, through contacts R35a transferred and (L71 to Fig. 41a) R36c to line L1.

The energization of relay R35 and closing of its b (Fig. 41c) contacts will upon the closing of cam contacts CF5 make available an impulse at the storage keyboard clear hub, which impulse is transmitted by plug wire W25 to the keyboard restore entry hub to energize the keyboard restore magnet 516a and thus rock bail 516 (Fig. 33) and restore all the keyboard positions to 0. The closing of cam contacts CF3 will as before explained effect energization of relay R4 (Fig. 41c), which relay will be held energized by a circuit extending from its hold coil through contacts R4b transferred and cam contacts CF2 to line L1. The closing of cam contacts CF3 will also cause energization of relay R36 in anticipation of the card feed cycle to follow. This circuit extends in Fig. 41c from line L1 through the transferred CF3 contacts, the transferred R35c contacts and rectifier K6 (L58 to Fig. 41b) to pick coil of relay R36. Relay R36 is held energized by a circuit from its hold coil, through contacts R36a transferred and (L59 to Fig. 41c) program contacts PR2 in the position shown to line L1. Relays R35 and R41 will be held energized after the R36c contacts (Fig. 41a) are opened by a circuit extending in Fig. 41c from line L1 through cam contacts CF3, rectifier K30 and (L60 to Fig. 41b), in parallel through the transferred contacts R35a and R41a to relays R35 and R41. The opening of the b contacts of relay R36 (Fig. 41a) will open the holding circuit to relay R50 (Fig. 41b).

Relays R1 and R2 (Fig. 41c) can now be energized to initiate a complete escapement of the transaction card past the read station. This circuit extends from line L1, through the contacts CF3 transferred, R35c transferred, and rectifier K3 to the coils of relays R1 and R2. Relays R1 and R2 will be held energized through the transferred R1b contacts and program cam contacts PR2, completing a circuit to line L1. The transferred R1a contacts (Fig. 41h) will cause energization of relay R25 (Fig. 41g) and the forward escape magnet 249 in the same manner as was described in Step 3. Thus, as the sixth card cycle is being completed, the card feed clutch 44 being deenergized when cam contacts CF2 are opened, the transmittal card will have been stacked in the normal stacker position 14, and relay R25 and the forward escape magnet 249 will be maintained energized, as before explained, until the program drum has completed another complete revolution and is again positioned in column 1, which escapement will advance the transaction card past the read station. Since during this time a card is present at the punch pre-registration position A, the punch card lever contacts 107a will remain closed holding relay R3 energized as before described. Transferring of the program cam contacts PR2 will again cause deenergization of relay R4 and also cause completion of a circuit to again energize the card feed latch magnet 78, register latch magnet 149, and card feed clutch magnet 44. This circuit extends in Fig. 41c from line L1, through contacts PR2 transferred, R41e and R3d transferred to latch magnet 78. The register latch magnet 149 is also energized as before through the R38h contacts and the card feed clutch magnet 44 as before through the latch magnet contacts 80. During this seventh card feed cycle thus initiated, the transaction card will be advanced to the normal stacking position 12 but no advancement will occur at the feed station, since both the card feed latch magnet 78 and register latch magnet 149 are held energized as before under control of cam contacts CF2. Relay R4 (Fig. 41c) will not be reenergized during this card feed cycle, contacts R41b now being open, so that no further control circuits are completed, and thus upon completion of this cycle the machine is in the same condition as it was upon completion of Step 3 above, ready for the recording of another transaction.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a record card machine, recording means, sensing means, means operable to concurrently feed in either a forward or reverse direction a record card past said recording means and a data card bearing indicia representative of a first multi order amount past said sensing means, means for storing a second multi order amount, means responsive to said sensing and storing means during feeding in one direction for serially combining said multi order amounts, and means actuable by said combining means for controlling said recording means to effect recordings representative of the combined amounts on said record card.

2. In a record card machine, a row of perforating devices, a row of sensing devices, a first feed wheel drivable to feed a record card in either direction past said row of perforating devices, a second feed wheel drivable in conjunction with said first feed wheel to feed a data card bearing indicia representative of a first multi order amount in either direction past said row of sensing devices, mechanism controllable to drive said feed wheels in a continuous or step by step manner in either direction, means for storing a second multi order amount, means for controlling said driving mechanism to drive said feed wheels to continuously feed said record card and data card a predetermined distance in one direction past said perforating and sensing devices respectively and then step said records back a predetermined distance in the other direction, means responsive to said sensing devices and storing means during the stepping in said other direction for serially combining said multi order amounts, and means actuable by said combining means for controlling said perforating devices to effect perforations representative of the combined amounts in said record card.

3. In a record card machine having a fixed card path from a feed hopper to a stacker, a row of perforating devices and a row of sensing devices at successive stations along said path, means for advancing a data card bearing indicia representative of a first multi order amount to said sensing station, means for advancing a record card to said perforating station, means for storing a second multi order amount, a feed wheel at each station drivable to feed the cards at the stations in a forward or reverse direction along said fixed path, mechanism controllable to concurrently drive said feed wheels in either a continuous or step by step manner in either direction, means for controlling said driving mechanism to drive said feed wheels to continuously feed said cards through the respective stations a predetermined distance in the forward direction and then to step said records back a predetermined distance in the reverse direction, means for initiating functional cycles intermediate said reverse stepping operations, means including carry means actuable during each of said functional cycles to combine single orders of said amounts, means actuable during each of a succession of said functional cycles for reading in ascending succession single orders of each of said amounts from said sensing devices and said storing means into said combining means, and means actuable by said combining means for controlling said perforating devices during each successive functional cycle to effect perforations representative of the order of the amounts combined during the previous functional cycle.

4. In a record card machine having a fixed path from a hopper to a stacker, a row of perforating devices and a row of sensing devices at successive card stations along said path, means for advancing a data card bearing indicia representative of a first multi order amount to said sensing station, means for advancing a record card to be perforated to said perforating station, means for storing a second multi order amount, means controllable to concurrently feed said record card through said punching station and said data card through said sensing station a predetermined distance in a forward direction and then back a predetermined distance in a reverse direction, means responsive to said sensing devices and storage means during said feeding in a reverse direction for combining said multi order amounts, and means actuable by said combining means for controlling said perforating devices to effect perforations representative of the combined amounts in said record card.

5. In a record card machine, means for storing a first multi order amount, devices for perforating a record card, devices for sensing a data card bearing indicia representative of a second multi order amount, mechanism operable to step said record card and data card column by column past said perforating devices and sensing devices respectively, means operable to initiate functional cycles, means including carry means actuable during each functional cycle to combine a single order of said first and second amounts, means for operating said cycle initiating means to initiate a first functional cycle, circuit means actuable during said first functional cycle for reading a first order of each of said multi order amounts from said storing means and said sensing devices into said combining means, and control means actuable by said combining means for operating said stepping mechanism and cycle initiating means to effect a stepping operation and second functional cycle in that order, said control means being effective during said second functional cycle to actuate said perforating devices to effect in said record card perforations representative of the order combined during said first functional cycle, said circuit means being actuable during said second functional cycle to read the next ascending order of said multi order amounts from said storing means and said sensing devices into said combining means.

6. In a record card machine having a fixed card path from a feed hopper to a stacker, a row of sensing devices transverse to said path, means for advancing a record card bearing indicia representative of a first and of a second multi order amount to said sensing station, first storage means for storing a third multi order amount, a feed wheel drivable to feed said record card in a forward or reverse direction along said path, mechanism controllable to drive said feed wheel in either direction continuously or in a step by step manner, means for controlling said feed wheel to continuously feed said record card past said sensing devices a predetermined distance in the forward direction along said path and then to step said record back a predetermined distance in the reverse direction, means for initiating functional cycles intermediate said reverse stepping operations, second storage means responsive to said sensing devices during each of a first succession of said functional cycles for storing said first multi order amount, means responsive to said sensing devices and first storage means during a subsequent succession of functional cycles for combining in ascending order single orders of said second and third multi order amounts, and means responsive to said combining means and said second storage means during each of said subsequent succession of functional cycles for comparing in ascending succession the order combined that cycle with a corresponding order of said first multi order amount.

7. In a record card machine first storage means for storing a first multi order amount, second storage means for storing a second multi order amount, sensing devices, means operable to step a record card bearing indicia representative of a third multi order amount column by column past said sensing devices, means responsive to said sensing devices and said second storage means during stepping of said record card to serially combine said second and third multi order amounts, means responsive to said combining means and said first storage means for serially comparing the combined amount with said first multi order amount, and means actuable by said comparing means to indicate whether said combined amount is larger or smaller than said first multi order amount.

8. In a record card machine, first storage means for storing a first multi order amount, second storage means for storing a second multi order amount, sensing devices, means operable to step a record card bearing indicia representative of a third multi order amount past said sensing devices, means for initiating functional cycles intermediate said stepping operations, means including carry means actuable during a functional cycle to combine single orders of said second and third multi order amounts, means including high-low indicating means actuable during a functional cycle to compare a single order of the combined amount with a corresponding order of said first multi order amount, means actuable during each of a succession of said functional cycles for reading in ascending order single orders of said second and third multi order amounts from said second storage means and said sensing devices into said combining means, means actuable during each of said succession of functional cycles for rendering said comparing means responsive to said combining means and said first storage means to effect comparison between the order combined that cycle by the combining means with a corresponding order of said first multi order amount.

9. In a record card machine, a plurality of groups of contacts each group settable to represent a single order of a first multi order amount, devices actuable to sense the columns of a record card bearing indicia representative of a second multi order amount, means for feeding said record card to present the columns in succession to said sensing devices, means for initiating a functional cycle as each column is presented, means for actuating said sensing devices during each functional cycle, a separate set of contacts settable during each functional cycle according to the sensed order of said second multi order amount, means actuable during each functional cycle to direct an impulse through one group of said plurality of groups of settable contacts, connecting means between each of said plurality of groups of contacts and said separate group of contacts, and control means coupled to said separate group of contacts and actuable by said impulse when the order represented by said separate group of contacts is larger than the order represented by the group of contacts impulsed.

10. In a record card machine, a plurality of groups of contacts each group settable to represent a single order of a first multi order amount, devices actuable to sense the columns or a record card bearing indicia representative of a second multi order amount to be compared with said first multi order amount, means for feeding said record card to present the columns in succession to said sensing devices, means for initiating a succession of functional cycles one as each column is presented, means for actuating said sensing devices during each of said functional cycles, a separate set of contacts settable during each of said functional cycles to represent the order of said second amount sensed by said sensing devices, means actuable during each of said functional cycles to direct an impulse through the group of said plurality of groups of contacts which is representative of a corresponding order of said first amount, settable connecting means having alternate paths between each of said groups of contacts and said separate group of contacts, and means actuable by said impulse when the order represented by said separate group of contacts is larger than the order represented by the group of contacts impulsed for setting said connecting means.

11. In a record card machine, a plurality of groups of contacts each group settable to represent a single order of a first multi order amount, devices actuable to sense the column of a record card bearing indicia representative of a second multi order amount, means for storing a third multi order amount, means for feeding a record card to present the columns in succession to said sensing devices, means for initiating a succession of functional cycles one as each column is presented, means for actuating said sensing devices during each of said functional cycles, means responsive during each functional cycle to said sensing devices and storing means for combining in ascending succession single orders of said second amount with corresponding orders of said third amount, a separate set of contacts responsive to said combining means and settable to represent the order combined each cycle, means actuable each cycle to direct an impulse through the group of said plurality of groups of contacts which is representative of the order combined that cycle, settable connecting means having alternate paths between each of said groups of contacts and said separate group of contacts, control means actuable by said impulse when the combined order of said second and third amounts is larger than the corresponding order of said first amount for setting said connecting means, and means actuable by said control means during the last of said succession of functional cycles to indicate whether the combined first and second amounts is larger or smaller than the third amount.

12. In a record card machine, perforating devices, data sensing devices, control sensing devices; means drivable to concurrently feed in either a forward or reverse direction a record card past said perforating devices, a data card bearing indicia past said data sensing devices and a program card bearing indicia past said control sensing devices; reversible mechanism for driving said feeding means, means actuable by said data sensing devices sensing indicia in said record card during concurrent feeding in either direction for controlling said perforating devices to perforate said record card, and means actuable by said control sensing devices sensing indicia in said program card during concurrent feeding in either direction for reversing said driving mechanism.

13. In a record card machine, a sensing station, a perforating station, a first feed wheel operable to step a first record card bearing indicia column by column in either a forward or reverse direction past said sensing station, a second feed wheel operable in conjunction with said first feed wheel to concurrently step a second record card column by column in either direction past said perforating station, means for sensing indicia in the columns of said first record card as it is stepped in either direction past said sensing station, and means controlled by said sensing means for perforating the columns of said second record as it is concurrently stepped in either direction past said perforating station.

14. In a record machine having a fixed card path between a hopper and a stacker, a row of perforating devices and a row of sensing devices at successive stations along said path, means for advancing a first record card bearing indicia to said sensing station, means for advancing a second record card to said perforating station, a feed wheel at each station drivable to feed said cards at said stations in either a forward or reverse direction, mechanism controllable to concurrently drive said feed wheels in either direction in either a continuous or step by step manner, means for controlling said driving mechanism to drive said feed wheels to continuously feed said cards through the respective stations a predetermined distance in a forward direction and then to step said records back a predetermined distance in a reverse direction, means for actuating said sensing devices to sense indicia in said first record card during said reverse stepping operation, and means controllable by said sensing devices for actuating said perforating devices to perforate the columns of said second record during said reverse stepping operation.

15. In a record card machine, a first sensing station, a second sensing station, a perforating station, a first feed wheel drivable to feed a first record card bearing indicia in either a forward or reverse direction past said first sensing station, a second feed wheel drivable in conjunction with said first feed wheel to concurrently feed a second record card in either a forward or reverse direction past said perforating station, further feeding means drivable in conjunction with said feed wheels for concurrently feeding a program card bearing control indicia in either a forward or reverse direction past said second sensing station, mechanism controllable to drive said feed wheels and said further feeding means to concurrently feed the three cards in either direction in either a step by step or continuous manner, sensing devices for sensing control indicia in said program card as it is fed step by step or continuously in either direction, and means actuated by said sensing devices for controlling said driving mechanism.

16. In a record card machine having a fixed card path between a hopper and a stacker, a row of perforating devices and a row of sensing devices at successive stations along said path, means for advancing a first record card bearing indicia to said sensing station, means for advancing a second record card to said perforating station, a feed wheel at each station drivable to feed said cards at said stations in either a forward or reverse direction, mechanism controllable to concurrently drive said feed wheels in either direction in either a continuous or step by step manner; means for controlling said driving mechanism to drive said feed wheels to either step the record cards completely past the respective stations in a forward direction or to feed said records first a predetermined distance in a continuous manner in a forward direction, then a predetermined distance in a reverse direction in a step by step manner and finally completely past the stations in a forward direction in a continuous manner; and means for actuating said sensing and perforating devices to sense and perforate the columns of the respective records as they are fed in a step by step manner in either direction.

17. In a record card machine, a row of perforating devices, a feed wheel operable to step a record column by column in either a forward or reverse direction past said row of perforating devices, means for maintaining said record in alignment as it is stepped in either direction past said row of perforating devices comprising a roller shiftable to either a first or second operating position in accordance with the direction the record is to be stepped and biased to press the record against said feed wheel in either position, and means operable to actuate said perforating devices to perforate the columns of said record as it is stepped in either direction past said row of perforating devices.

18. In a record card machine, a perforating station, a sensing station, means drivable to concurrently feed column by column in either a forward or reverse direction a record card past said perforating station and a program card bearing indicia past said sensing station, mechanism controllable to drive said feeding means in either direction, devices for perforating the columns of said record card as it is fed in either direction past said perforating station, devices for sensing indicia in said program card as it is concurrently fed in either direction past said sensing station, and means actuable by said sensing devices for controlling said driving mechanism.

19. In a record card machine, a row of sensing pins, a feed wheel operable to step a record bearing indicia column by column in either a forward or reverse direction to present the columns in ascending or descending succession to said row of sensing pins, means operable to actuate said sensing pins to sense indicia in the columns of the record as they are presented in ascending or descending succession, and control devices actuable by said sensing pins sensing indicia in the columns presented in ascending or descending succession.

20. In a record card machine, a first sensing station, a second sensing station, means drivable to concurrently feed in either a forward or reverse direction a record card bearing indicia past said first sensing station and a program card bearing indicia past said second sensing station, reversible mechanism for driving said feeding means, means at each of said sensing stations for sensing indicia in said records as they are concurrently fed in either direction, and means controlled by said sensing means at said second sensing station for reversing said driving mechanism.

21. In a record card machine, a punching station, a feed wheel for normally feeding a record in a forward direction but operable to feed a record in a reverse direction past said punching station, aligning means for aligning a record as it is fed, a shiftable roller having two operating positions and biased to press a record against said feed wheel in either position, said roller in its normal position being effective to urge a record being fed in a forward direction against said aligning means, and means for shifting said roller to its other position to urge a record being fed in the reverse direction against said aligning means.

22. In a record card machine, a punching station, a feed wheel normally operable to feed a record in a forward direction but operable to feed a record in a reverse direction past said punching station, a pair of record aligners for aligning a record as it is fed past said punching station, a shiftable roller associated with said feed wheel and having two operating positions each skew in a different direction with respect to said feed wheel, said roller in its normal position being effective to urge a record being advanced in a forward direction against one of said record aligners, and means operable to shift said roller to its other position to urge a record being fed in a reverse direction against the other of said record aligners.

23. In a record card machine, a punching station, a feed wheel for feeding a record past said punching station, a pair of record aligners one on either side of said punching station for aligning a record as it is fed, reversible mechanism for normally driving said feed wheel to feed a record in a forward direction past said punching station, a shiftable roller having two operating positions each skew in a different direction with respect to said feed wheel and biased to press a record against said feed wheel in either position, said roller in its normal position being effective to urge a record being fed in a forward direction against one of said record aligners, and control mechanism for reversing said driving means to cause said feed wheel to feed a record in a reverse direction past said punching station, said control means being also effective to shift said roller to its other position to urge a record being fed in the reverse direction against the other of said record aligners.

24. In a record card machine, a row of perforating devices, a feed wheel operable to step a record in either a forward or reverse direction past said row of perforating devices, a pair of record aligners for aligning a record as it is stepped past said row of perforating devices, a shiftable roller having two operating positions each skew in a different direction with respect to said feed wheel and biased to press a record against said feed wheel in either position, said roller being effective in its normal position to urge a record being fed in a forward direction against one of said record aligners but shiftable to its other position to urge a record being fed in the reverse direction against the other of said record aligners, and means operable to actuate said perforating devices as a record is stepped in either direction to effect perforations in the aligned columns of the record as they are presented to said row of perforating devices.

25. In a record processing machine, a sensing station, a recording station, first feed means operable to feed a first record bearing data in either a forward or reverse direction past said sensing station, second feed means operable in conjunction with said first feed means to concurrently feed a second record past said recording station, means for sensing data in said first record as it is fed in either direction past said sensing station, and means controlled by said sensing means for recording in said second record as it is concurrently fed past said recording station.

26. In a record processing machine, a plurality of groups of devices each group settable to represent an order of a first multi order amount, means for sensing in succession orders of a second multi order amount recorded on a record, means for initiating a succession of functional cycles corresponding to the sensing of each of said orders of said second multi order amount in succession, means actuable each functional cycle to direct a signal through one of said plurality of groups of settable devices, a separate group of devices settable each functional cycle according to the sensed order of said second multi order amount, means coupling each of said plurality of groups of devices and said separate group of devices, and control means coupled to said separate group of devices and responsive to said signal in accordance with a comparison between the order represented by said separate group of devices and the order represented by the one of said plurality of groups of devices to which said signal is applied.

References Cited in the file of this patent

UNITED STATES PATENTS

| | | |
|---|---|---|
| 2,012,317 | Muller | Aug. 27, 1935 |
| 2,453,932 | Pitman | Nov. 16, 1948 |
| 2,575,034 | Tyler et al. | Nov. 13, 1951 |